United States Patent
Devenney et al.

(10) Patent No.: US 9,902,652 B2
(45) Date of Patent: Feb. 27, 2018

(54) METHODS AND SYSTEMS FOR UTILIZING CARBIDE LIME OR SLAG

(71) Applicant: Calera Corporation, Los Gatos, CA (US)

(72) Inventors: Martin Devenney, Mountain View, CA (US); Miguel Fernandez, San Jose, CA (US); Irvin Chen, Santa Clara, CA (US); Guillaume Calas, Mountain View, CA (US); Michael Joseph Weiss, Los Gatos, CA (US); Chantel Cabrera Tester, San Jose, CA (US)

(73) Assignee: CALERA CORPORATION, Moss Landing, CA (US)

( * ) Notice: Subject to any disclaimer, the term of this patent is extended or adjusted under 35 U.S.C. 154(b) by 418 days.

(21) Appl. No.: 14/694,348

(22) Filed: Apr. 23, 2015

(65) Prior Publication Data
US 2015/0307400 A1    Oct. 29, 2015

Related U.S. Application Data

(60) Provisional application No. 61/983,110, filed on Apr. 23, 2014, provisional application No. 62/054,834, filed on Sep. 24, 2014.

(51) Int. Cl.
| | |
|---|---|
| *C04B 28/02* | (2006.01) |
| *C01F 11/18* | (2006.01) |
| *C04B 28/10* | (2006.01) |
| *C04B 14/28* | (2006.01) |
| *C01C 1/16* | (2006.01) |
| *C01C 1/24* | (2006.01) |

(52) U.S. Cl.
CPC .............. *C04B 28/02* (2013.01); *C01F 11/18* (2013.01); *C04B 14/28* (2013.01); *C04B 28/10* (2013.01); *C01C 1/164* (2013.01); *C01C 1/24* (2013.01); *Y02P 40/18* (2015.11)

(58) Field of Classification Search
CPC ......... C01F 11/18; C04B 28/02; C04B 28/10; C04B 14/28; C01C 1/164; C01C 1/24
See application file for complete search history.

(56) References Cited

U.S. PATENT DOCUMENTS

| | | | |
|---|---|---|---|
| 4,108,752 A | 8/1978 | Pohto et al. | |
| 4,111,779 A | 9/1978 | Seko et al. | |
| 4,623,433 A | 11/1986 | Streichenberger | |
| 4,643,818 A | 2/1987 | Seko et al. | |
| 5,275,651 A | 1/1994 | Minayoshi et al. | |
| 5,290,353 A | 3/1994 | Goffin et al. | |
| 5,376,343 A | 12/1994 | Fouche | |
| 5,494,651 A | 2/1996 | Minayoshi et al. | |
| 5,792,440 A | 8/1998 | Huege | |
| 5,846,500 A | 12/1998 | Bunger et al. | |
| 5,997,833 A | 12/1999 | Bunger et al. | |
| 6,132,696 A | 10/2000 | Porter et al. | |
| 6,251,356 B1 | 6/2001 | Mathur | |
| 6,310,129 B1 | 10/2001 | Lilly et al. | |
| 7,735,274 B2 | 6/2010 | Constantz et al. | |
| 7,744,761 B2 | 6/2010 | Constantz et al. | |
| 7,749,476 B2 | 7/2010 | Constantz et al. | |
| 7,753,618 B2 | 7/2010 | Constantz et al. | |
| 7,754,169 B2 | 7/2010 | Constantz et al. | |
| 7,771,684 B2 | 8/2010 | Constantz et al. | |
| 7,790,012 B2 | 9/2010 | Kirk et al. | |
| 7,815,880 B2 | 10/2010 | Constantz et al. | |
| 7,829,053 B2 | 11/2010 | Constantz et al. | |
| 7,875,163 B2 | 1/2011 | Gilliam et al. | |
| 7,887,694 B2 | 2/2011 | Constantz et al. | |
| 7,906,028 B2 | 3/2011 | Constantz et al. | |
| 7,914,685 B2 | 3/2011 | Constantz et al. | |
| 7,922,809 B1 | 4/2011 | Constantz et al. | |

(Continued)

FOREIGN PATENT DOCUMENTS

| | | |
|---|---|---|
| CN | 1053642 C | 6/2000 |
| CN | 1056591 C | 9/2000 |

(Continued)

OTHER PUBLICATIONS

Bensted. Developments with oilwell cements. In Structure and Performance of Cements. 2nd ed. Bensted and Barnes. 2002; 237-525.

Cardoso, et al. Carbide lime and industrial hydrated lime characterization. Powder Technology. 2009; 195:143-149.

Chen, et al. Calcium carbonate phase transformations during the carbonation reaction of calcium heavy alkylbenzene sulfonate overbased nanodetergents preparation. Journal of Colloid and Interface Science. 2011; 359:56-67.

Constantz, B. (2009) "The Risk of Implementing New Regulations on Game-Changing Technology: Sequestering CO2 in the Built Environment" AGU, 90(22), Jt. Assem, Suppl., Abstract.

(Continued)

*Primary Examiner* — Anthony J Green
(74) *Attorney, Agent, or Firm* — Wilson Sonsini Goodrich & Rosati

(57) ABSTRACT

Provided herein are methods comprising a) treating a slag solid or carbide lime suspension with an ammonium salt in water to produce an aqueous solution comprising calcium salt, ammonium salt, and solids; b) contacting the aqueous solution with carbon dioxide from an industrial process under one or more precipitation conditions to produce a precipitation material comprising calcium carbonate and a supernatant aqueous solution wherein the precipitation material and the supernatant aqueous solution comprise residual ammonium salt; and c) removing and optionally recovering ammonia and/or ammonium salt using one or more steps of (i) recovering a gas exhaust stream comprising ammonia during the treating and/or the contacting step; (ii) recovering the residual ammonium salt from the supernatant aqueous solution; and (iii) removing and optionally recovering the residual ammonium salt from the precipitation material.

21 Claims, 7 Drawing Sheets

(56) References Cited

U.S. PATENT DOCUMENTS

| | | |
|---|---|---|
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,114,214 B2 | 2/2012 | Constantz et al. |
| 8,137,455 B1 | 3/2012 | Constantz et al. |
| 2001/0033820 A1 | 10/2001 | Yaniv |
| 2005/0158226 A1 | 7/2005 | Misske et al. |
| 2006/0067869 A1 | 3/2006 | De Pauw Gerlings |
| 2008/0245012 A1 | 10/2008 | Boisvert et al. |
| 2009/0001020 A1 | 1/2009 | Constantz et al. |
| 2009/0020044 A1 | 1/2009 | Constantz et al. |
| 2009/0169452 A1 | 7/2009 | Constantz et al. |
| 2009/0202410 A1 | 8/2009 | Kawatra et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0051859 A1 | 3/2010 | House et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0093581 A1 | 4/2010 | Winston |
| 2010/0108537 A1 | 5/2010 | Perego et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0000633 A1 | 1/2011 | Kukkamaki et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0076587 A1 | 3/2011 | Wang et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0139628 A1* | 6/2011 | Teir .................. C01F 11/181 205/564 |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2012/0031303 A1 | 2/2012 | Constantz et al. |
| 2012/0082839 A1 | 4/2012 | Ha et al. |
| 2013/0036948 A1 | 2/2013 | Fernandez et al. |

FOREIGN PATENT DOCUMENTS

| | | |
|---|---|---|
| CN | 1058683 C | 11/2000 |
| CN | 1094900 C | 11/2002 |
| CN | 1112320 C | 6/2003 |
| CN | 1131172 C | 12/2003 |
| CN | 1165487 C | 9/2004 |
| CN | 1167620 C | 9/2004 |
| CN | 1172854 C | 10/2004 |
| CN | 1172855 C | 10/2004 |
| CN | 1195683 C | 4/2005 |
| CN | 1204052 C | 6/2005 |
| CN | 1238254 C | 1/2006 |
| CN | 1253373 C | 4/2006 |
| CN | 1854069 A | 11/2006 |
| CN | 1323947 C | 7/2007 |
| CN | 101020579 A * | 8/2007 |
| CN | 100340225 C | 10/2007 |
| CN | 100371249 C | 2/2008 |
| CN | 100390064 C | 5/2008 |
| CN | 100411992 C | 8/2008 |
| CN | 100424015 C | 10/2008 |
| CN | 100447087 C | 12/2008 |
| CN | 100450932 C | 1/2009 |
| CN | 100455515 C | 1/2009 |
| CN | 100545092 C | 9/2009 |
| CN | 100551826 C | 10/2009 |
| CN | 101302026 B | 8/2010 |
| CN | 1429772 B | 12/2010 |
| CN | 101362048 B | 1/2011 |
| CN | 101993104 A | 3/2011 |
| CN | 101293663 B | 5/2011 |
| CN | 101565198 B | 6/2011 |
| CN | 101314478 B | 7/2011 |
| CN | 101668703 B | 10/2011 |
| CN | 101914312 B | 11/2011 |
| CN | 101823744 B | 12/2011 |
| CN | 101823745 B | 12/2011 |
| CN | 101823746 B | 12/2011 |
| CN | 101823747 B | 1/2012 |
| CN | 101160262 B | 2/2012 |
| CN | 101838005 B | 2/2012 |
| CN | 102602973 A | 7/2012 |
| CN | 101331084 B | 8/2012 |
| CN | 101774623 B | 9/2012 |
| CN | 101920983 B | 11/2012 |
| CN | 101913640 B | 12/2012 |
| CN | 102092757 B | 12/2012 |
| CN | 102020878 B | 5/2013 |
| CN | 102295306 B | 5/2013 |
| CN | 103170226 A * | 6/2013 |
| CN | 103172100 A * | 6/2013 |
| CN | 102267713 B | 7/2013 |
| CN | 102531017 B | 8/2013 |
| CN | 101218308 B | 11/2013 |
| CN | 102583483 B | 11/2013 |
| CN | 102674425 B | 12/2013 |
| CN | 102124061 B | 4/2014 |
| CN | 102482111 B | 9/2014 |
| CN | 102923749 B | 11/2014 |
| CN | 103183370 B | 11/2014 |
| CN | 103466678 B | 11/2014 |
| EP | 0558275 A1 | 9/1993 |
| EP | 2253600 A1 | 11/2010 |

(56) References Cited

FOREIGN PATENT DOCUMENTS

| | | |
|---|---|---|
| JP | H 02302317 A | 12/1990 |
| JP | H 08217522 A | 8/1996 |
| WO | WO 97/13723 A1 | 4/1997 |
| WO | WO 99/18151 A1 | 4/1999 |
| WO | WO 00/34182 A1 | 6/2000 |
| WO | WO 2008/018928 A2 | 2/2008 |
| WO | WO 2008/148055 A1 | 12/2008 |
| WO | WO 2009/006295 A2 | 1/2009 |
| WO | WO 2008/018928 A3 | 3/2009 |
| WO | WO 2009/086460 A1 | 7/2009 |
| WO | WO 2009/006295 A3 | 12/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/055152 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/038936 A1 | 4/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |
| WO | WO 2011/121065 A1 | 10/2011 |

OTHER PUBLICATIONS

Eloneva, et al. Preliminary assessment of a method utilizing carbon dioxide and steelmaking slags to produce precipitated calcium carbonate. Applied Energy. 2012; 90:329-334.

Eloneva, et al. Reduction of $CO_2$ Emissions from Steel Plants by Using Steelmaking Slags for Production of Marketable Calcium Carbonate. Steel Research Int. 2009; 80(6):415-421.

Han, et al. Effect of flow rate and $CO_2$ content on the phase and morphology of $CaCO_3$ prepared by bubbling method. Journal of Crystal Growth. 2005; 276:541-548.

Han, et al. Influence of initial $CaCl_2$ concentration on the phase and morphology of $CaCO_3$ prepared by carbonation. J. Mater. Sci. 2006; 41:4663-4667.

Huan, et al. Study on pretreatment on the preparation of nanosized calcium carbonate with calcium carbide residue. Nanoscience and Nanotechnology. 2011; 8(1):70-73. (in Chinese with English abstract).

International search report and written opinion dated Jun. 3, 2013 for PCT/US2013/031670.

Kantiranis. Hydration of high-calcium quicklime with methanol-water mixtures. Construction and Building Materials. 2003; 17:91-96.

Kuntze. Gypsum: connecting science and technology. ASTM International. ASTM stock No. MNL67. Ch 7. 2009.

Matilla, et al. Production of precipitated calcium carbonate from steel converter slag and other calcium-containing industrial wastes and residues. Advances in inorganic chemistry. 2014; vol. 66, Ch. 10. 347-384.

Matilla, et al. Reduced Limestone Consumption in Steel Manufacturing Using a pseudo-catalytic calcium lixiviant. Energy Fuels. 2014; 28:4068-4074.

Mattila, et al. Chemical kinetics modeling and process parameter sensitivity for precipitated calcium carbonate production from steelmaking slags. Chemical Engineering Journal. 2012; 192:77-89.

Sun, et al. Indirect $CO_2$ mineral sequestration by steelmaking slag with $NH_4Cl$ as leaching solution. Chemical Engineering Journal. 2011; 173:437-445.

Vucak, et al. A study of carbon dioxide absorption into aqueous monoethanolamine solution containing calcium nitrate in the gas-liquid reactive precipitation of calium carbonate. Chemical Engineering Journal. 2002; 87:171-179.

Yamaguchi, et al. Formation of vaterite from Calcium Methoxide with aqueous sodium carbonate solution. Bulletin of the Chemical Society of Japan. 1979; 52(4):1217-1218.

Zhang, et al. Preparation of $CaCO_3$ superfine powder by calcium carbide residue. Energy Procedia. 2012; 17:1635-1640.

Zhao, et al. Post-combustion $CO_2$ capture by aqueous ammonia: A state-of-the-art review. International Journal of Greenhouse gas control. 2012; 9:355-371.

European search report and opinion dated Jul. 29, 2015 for EP Application No. 13769503.

Sarkar, et al. Synthesis of All Crystalline Phases of Anhydrous Calcium Carbonate. Crystal Growth and Design. May 5, 2010; 10(5):2129-2135.

Sunagawa, et al. Strontium and aragonite-calcite precipitation. Journal of Mineralogical and Petrological Sciences. Jan. 1, 2007; 102(3):174-181.

Andersson, et al. High power diode laser cladding. Fabricating and Metalworking. Mar. 2014; 24-26.

* cited by examiner

METHODS AND SYSTEMS FOR UTILIZING CARBIDE LIME OR SLAG

CROSS-REFERENCE TO RELATED APPLICATIONS

This application claims priority to U.S. Provisional Patent Application No. 61/983,110, filed Apr. 23, 2014 and U.S. Provisional Patent Application No. 62/054,834, filed Sep. 24, 2014, both of which are incorporated herein by reference in their entireties in the present disclosure.

GOVERNMENT SUPPORT

Work described herein was made in whole or in part with Government support under Award Number: DE-FE0002472 awarded by the Department of Energy. The Government has certain rights in this invention.

BACKGROUND

Carbon dioxide ($CO_2$) emissions have been identified as a major contributor to the phenomenon of global warming. $CO_2$ is a by-product of combustion and it creates operational, economic, and environmental problems. It may be expected that elevated atmospheric concentrations of $CO_2$ and other greenhouse gases will facilitate greater storage of heat within the atmosphere leading to enhanced surface temperatures and rapid climate change. In addition, elevated levels of $CO_2$ in the atmosphere may also further acidify the world's oceans due to the dissolution of $CO_2$ and formation of carbonic acid. The impact of climate change and ocean acidification may likely be economically expensive and environmentally hazardous if not timely handled. Reducing potential risks of climate change may require sequestration and avoidance of $CO_2$ from various anthropogenic processes.

SUMMARY

In one aspect, there is provided a method comprising a) treating a slag solid or carbide lime suspension with an ammonium salt in water to produce an aqueous solution comprising calcium salt, ammonium salt, and solids; b) contacting the aqueous solution with carbon dioxide from an industrial process under one or more precipitation conditions to produce a precipitation material comprising calcium carbonate and a supernatant aqueous solution wherein the precipitation material and the supernatant aqueous solution comprise residual ammonium salt; and c) removing and optionally recovering ammonia and/or ammonium salt using one or more steps of (i) recovering a gas exhaust stream comprising ammonia during the treating and/or the contacting step; (ii) recovering the residual ammonium salt from the supernatant aqueous solution; and (iii) removing and optionally recovering the residual ammonium salt from the precipitation material.

In some embodiments of the foregoing aspect, the slag solid comprises between 20-60 wt % calcium oxide. In some embodiments of the foregoing aspect and embodiments, the carbide lime comprises calcium hydroxide. In some embodiments of the foregoing aspect and embodiments, the ammonium salt is ammonium chloride, ammonium sulfate, ammonium nitrate, or combinations thereof. In some embodiments of the foregoing aspect and embodiments, molar ratio of the ammonium salt:slag solid or ammonium salt:carbide lime suspension is between about 0.5:1 to 4:1 or between about 0.5:1 to 2:1 or between about 1:1 to 1.5:1. In some embodiment, the ratio is a wt % ratio. In some embodiments of the foregoing aspect and embodiments, the treating step further comprises adding ammonia. In some embodiments of the foregoing aspect and embodiments, the ammonia is anhydrous ammonia or an aqueous solution of ammonia. In some embodiments of the foregoing aspect and embodiments, the ammonia supplements the ammonium ions in the treating step to make up for the depleted ammonium salt. In some embodiments of the foregoing aspect and embodiments, the added ammonia is the ammonia recovered in step (i). In some embodiments of the foregoing aspect and embodiments, the method further comprises dewatering the precipitation material to separate the precipitate from the supernatant aqueous solution. In some embodiments of the foregoing aspect and embodiments, the residual ammonium salt is ammonium chloride, ammonium sulfate, ammonium sulfite, ammonium hydrosulfide, ammonium thiosulfate, or combinations thereof. The residual ammonium salt can be any salt that may be formed by ammonium ions and anions present in the solution including, but not limited to halogen ions such as chloride ions, and sulfur ions such as, sulfate ions, sulfite ions, thiosulfate ions, hydrosulfide ions, and the like. In some embodiments of the foregoing aspect and embodiments, the method further comprises recovering the residual ammonium salt from the supernatant aqueous solution using recovery process selected from the group consisting of thermal decomposition, pH adjustment, reverse osmosis, multi-stage flash, multi-effect distillation, vapor recompression, distillation, and combinations thereof. These processes have been described further herein. In some embodiments of the foregoing aspect and embodiments, the method further comprises recycling the recovered residual ammonium salt back to the treating step of the process, the contacting step of the process, or combination thereof.

In some embodiments of the foregoing aspect and embodiments, the step of recovering the gas exhaust stream comprising ammonia comprises subjecting the gas exhaust stream comprising ammonia to a scrubbing process wherein the scrubbing process comprises scrubbing the gas exhaust stream comprising ammonia with the carbon dioxide from the industrial process and water to produce a solution of ammonia. In some embodiments of the foregoing aspect and embodiments, the solution of ammonia comprises carbamate. In some embodiments of the foregoing aspect and embodiments, the solution of ammonia is recycled back to the contacting step.

In some embodiments of the foregoing aspect and embodiments, the calcium carbonate is precipitated calcium carbonate (PCC). In some embodiments of the foregoing aspect and embodiments, the calcium carbonate comprises vaterite, aragonite, calcite, or combination thereof. In some embodiments of the foregoing aspect and embodiments, the calcium carbonate comprises reactive vaterite. In some embodiments of the foregoing aspect and embodiments, the step (iii) of removing and optionally recovering the residual ammonium salt from the precipitation material comprises heating the precipitation material between about 290-375° C. or between about 300-360° C. or between about 300-350° C. or between about 310-345° C. or between about 320-350° C. or between about 330-350° C., to evaporate the ammonium salt from the precipitation material with optional recovery by condensation of the ammonium salt. In some embodiments of the foregoing aspect and embodiments, the step (iii) of removing and optionally recovering the residual ammonium salt from the precipitation material comprises heating the precipitation material, is for a duration of more than about 10 min or of more than about 15 min or for than about 5 min or of between about 10 min to about 1 hour or of between about 10 min to about 1.5 hour or of between about 10 min to about 2 hours or of between about 10 min to about 5 hours or of between about 10 min to about 10 hours. In some embodiments of the foregoing aspect and embodiments, the step (iii) of removing and optionally recovering the residual ammonium salt from the precipitation material comprises heating the precipitation material further comprises heating while maintaining a pressure below atm pressure. In some embodiments of the foregoing aspect and embodiment, the precipitation material is dewatered (to remove the supernatant aqueous solution) and dried to remove water (e.g. by heating at about or above 100° C.) before subjecting the precipitation material to the heating step (iii) to remove and optionally recover the ammonium salt. In some embodiments of the foregoing aspect and embodiment, the precipitation material is partially dewatered (to remove bulk of the supernatant aqueous solution) and partially dried to remove water (or avoid the drying step) before subjecting the precipitation material to the heating step (iii) to remove and optionally recover the ammonium salt. In some embodiments of the foregoing aspect and embodiments, the calcium carbonate comprises reactive vaterite. In some embodiments of the foregoing aspect and embodiments, the reactive vaterite in the precipitation material stays as reactive vaterite after heating in step (iii). In some embodiments of the foregoing aspect and embodiments, the reactive vaterite in the precipitation material transforms to aragonite and/or calcite after heating. In some embodiments of the foregoing aspect and embodiments, the ammonium salt evaporates from the precipitation material in a form comprising ammonia gas, hydrogen sulfide gas, sulfur dioxide gas, hydrogen chloride gas, chlorine gas, or combinations thereof. In some embodiments of the foregoing aspect and embodiments, the aqueous solution, the supernatant solution, the precipitation material, or combinations thereof further comprise sulfur compound. In some embodiments of the foregoing aspect and embodiments, the step (iii) further comprises removing the sulfur compound in a form comprising hydrogen sulfide and/or sulfur dioxide gas from the precipitation material.

In some embodiments of the foregoing aspect and embodiments, it is desirable that the reactive vaterite in the precipitation material stays as reactive vaterite such that the cementitious properties of the material are conserved. In some embodiments of the foregoing aspect and embodiments, the method further comprises after step (iii) adding water to the precipitation material comprising reactive vaterite and transforming the vaterite to aragonite wherein the aragonite sets and hardens to form cement or cementitious product.

Applicants have found that in some embodiments, maintaining a combination of the amount of temperature and duration of heating may be desirable to remove ammonium salt and/or sulfur compounds from the precipitation material yet preserving the cementitious properties of the reactive vaterite material (as shown in the examples). In some embodiments of the foregoing aspect and embodiments, the reactive vaterite in the precipitation material, after removal of the ammonium salt and/or sulfur compounds, stays as reactive vaterite which when combined with water transforms to aragonite which sets and cements to form cementitious products. The cementitious products, thus formed, possess minimal or no chloride content and have no foul smell of ammonia or sulfur. In some embodiments, the chloride content is around or below acceptable ASTM standards for the cementitious products.

In some embodiments of the foregoing aspect and embodiments, the calcium carbonate is at least 50% w/w reactive vaterite or at least 50% w/w aragonite, or at least 50% w/w calcite. In some embodiments of the foregoing aspect and embodiments, the calcium carbonate or the stable vaterite or the reactive vaterite has an average particle size of between 0.5-20 microns. In some embodiments of the foregoing aspect and embodiments, the calcium carbonate comprising reactive vaterite is cementitious which after addition of water sets and hardens to cement. In some embodiments of the foregoing aspect and embodiments, the cement has a compressive strength of at least 3 MPa or at least 5 MPa or between about 3 MPa-20 MPa.

In some embodiments of the foregoing aspect and embodiments, the cementitious product is a formed building material selected from masonry unit, construction panel, conduit, basin, beam, column, slab, acoustic barrier, insulation material, and combinations thereof. In some embodiments of the foregoing aspect and embodiments, the cementitious product is an aerated block (lightweight). In some embodiments of the foregoing aspect and embodiments, the construction panel is selected from cement board, drywall, fiber cement siding, and combinations thereof. In some embodiments of the foregoing aspect and embodiments, the construction panel is for one or more applications selected from fiber-cement siding, roofing panel, soffit board, sheathing panel, cladding plank, decking panel, ceiling panel, shaft liner panel, wall board, backer board, underlayment panel, and combinations thereof.

In some embodiments of the foregoing aspect and embodiments, the carbide lime is obtained from acetylene production process, metallurgical process, calcium cyanamide production process, landfill, or combinations thereof. In some embodiments of the foregoing aspect and embodiments, the method further comprises adding an additive to the aqueous solution at the contacting step wherein the additive is a fatty acid ester. In some embodiments of the foregoing aspect and embodiments, the fatty acid ester is stearate, citrate, or combination thereof. In some embodiments of the foregoing aspect and embodiments, the addition of the additive produces precipitated calcium carbonate (PCC) comprising vaterite, aragonite, calcite, or combinations thereof.

In some embodiments of the foregoing aspect and embodiments, the method further comprises separating the solids from the aqueous solution before the contacting step. In some embodiments of the foregoing aspect and embodiments, the separating the solids from the aqueous solution is by filtration and/or centrifugation. In some embodiments of the foregoing aspect and embodiments, the separated solids are added to the precipitation material as a filler. In some embodiments of the foregoing aspect and embodiments, the solids are not separated from the aqueous solution and the aqueous solution is contacted with the carbon dioxide to produce the precipitation material further comprising the solids. In some embodiments of the foregoing aspect and embodiments, the solids comprise carbon, silica, or combination thereof. In some embodiments of the foregoing aspect and embodiments, the solids are between 1-40 wt % in the aqueous solution, in the precipitation material, or combination thereof.

In some embodiments of the foregoing aspect and embodiments, the carbon dioxide is flue gas. In some embodiments of the foregoing aspect and embodiments, the flue gas has a temperature between 25-60° C. and comprises SOx less than 500 ppm. In some embodiments of the foregoing aspect and embodiments, the one or more precipitation conditions are selected from temperature, pH, pressure, ion ratio, precipitation rate, presence of additive, presence of ionic species, concentration of additive and ionic species, stirring, residence time, mixing rate, forms of agitation, presence of seed crystal, catalyst, membrane, or substrate, dewatering, drying, ball milling, and combinations thereof. In some embodiments of the foregoing aspect and embodiments, the one or more precipitation conditions that favor formation of the calcium carbonate or that favor formation of reactive vaterite comprise a pH of between 7-8.5 of the aqueous solution, temperature of the solution between 20-45° C., residence time of between 15-60 minutes, or combinations thereof.

In one aspect, there is provided a product formed by the foregoing method aspect and embodiments.

DRAWINGS

The features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DESCRIPTION

Figure 1:
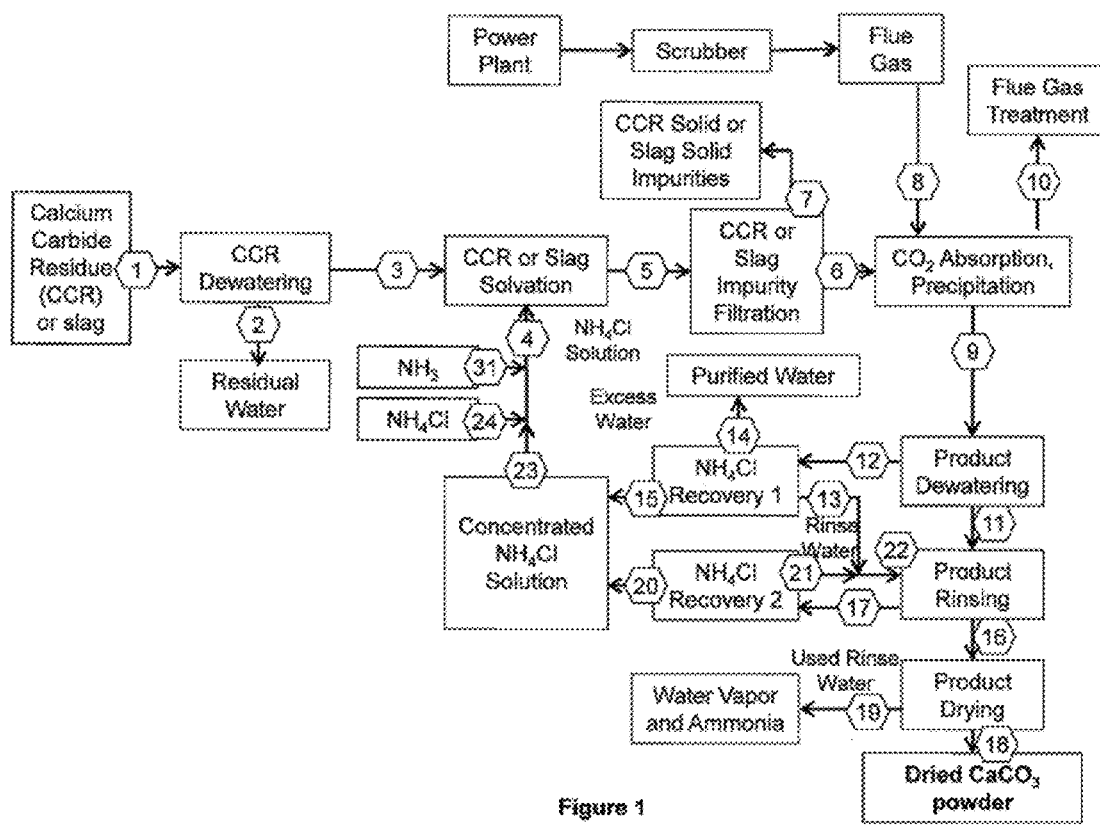
FIG. 1 illustrates some method and system embodiments provided herein.

Provided herein are methods and systems that produce calcium carbonate from feed stocks such as carbide lime or slag. In some embodiments, the carbide lime or the slag is treated with a weak base, such as an ammonium salt, to solubilize calcium in an aqueous solution which is treated with carbon dioxide gas to form composition or precipitation material comprising calcium carbonate.

In some embodiments, the calcium carbonate is in vaterite polymorphic form or in some embodiments, the calcium carbonate is precipitated calcium carbonate (PCC). The PCC can be in the form of vaterite, aragonite, calcite, or combinations thereof. In some embodiments, the calcium carbonate is in stable vaterite form or is in a reactive vaterite form, both of which have been described below. In some embodiments, the reactive vaterite containing material possesses unique properties, including, but not limited to, cementing properties by transforming to aragonite which sets and cements with high compressive strength. In some embodiments, the vaterite transformation to aragonite results in cement to form building materials and/or cementitious products such as, but not limited to, formed building materials such as construction panel etc. further described herein. In some embodiments, the vaterite in the product is stable (does not transform to aragonite) and may be used as a filler or supplementary cementitious material when mixed with other cement such as Ordinary Portland Cement (OPC). The vaterite containing material may also be used as an aggregate where the reactive vaterite containing precipitation material after contact with water transforms to aragonite which sets and cements and which is then chopped up after cementation to form the aggregate. In some embodiments, where the calcium carbonate is formed as PCC, the PCC material is cementitious or may be used as a filler in products such as paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such use of carbonate precipitation material as a filler in non-cementitious products is described in U.S. Pat. No. 7,829,053, issued Nov. 9, 2010, which is incorporated herein by reference in its entirety.

The ammonium salt, used to solubilize the calcium ions from the carbide lime or the slag, may result in residual ammonium salt remaining in the supernatant solution as well as in the precipitate itself after the formation of the precipitate. In some embodiments, the presence of the ammonium salt in the precipitate may not be desirable as the ammonium salt content such as, ammonium chloride, ammonium sulfate, ammonium sulfite, ammonium hydrosulfide, ammonium thiosulfate, or combinations thereof content, in the precipitate may be detrimental to the cementitious products thus formed from the precipitation material. For example, chloride in the cementitious product may be corrosive to metal structures that are used along with the cementitious products. Further, the residual ammonia and/or sulfur may add to the foul smell in the products. Furthermore, the non-recovered and wasted residual ammonium salt in the precipitate as well as the supernatant solution may be economically as well as environmentally not feasible. Various methods have been provided herein to remove and optionally recover the ammonium salt from the supernatant solution as well as the precipitate. Various methods have also been provided herein to remove the sulfur compounds from the supernatant solution as well as the precipitate.

Before the invention is described in greater detail, it is to be understood that this invention is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are described herein.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible.

I. Methods

There are provided methods and systems utilizing a source of $CO_2$ (e.g., from an industrial waste stream such as flue gas from power plant or cement plant comprising $CO_2$), a source of proton-removing agents (e.g., carbide lime providing $Ca(OH)_2$ or slag providing calcium oxide), and a source of divalent cations (e.g., carbide lime or slag also providing $Ca^{2+}$ and optionally $Mg^{2+}$) to form precipitation material comprising calcium carbonate such as stable or reactive vaterite or PCC, as described in more detail herein. The carbide lime or slag can act both as a source of divalent cations as well as proton-removing agents. The calcium hydroxide present in carbide lime provides calcium ions as a source of divalent cations and hydroxide as a source of proton-removing agent to form calcium carbonate precipitates of the invention. The calcium oxide present in slag provides calcium ions as a source of divalent cations and oxide (giving hydroxide after solvation) as a source of proton-removing agent to form calcium carbonate precipitates of the invention. The vaterite polymorph of the calcium carbonate precipitates may be a stable vaterite that may act as a filler in the products or the vaterite may be a reactive vaterite that may transform to aragonite during the dissolution-reprecipitation process, as described herein. Carbide lime, slag, carbon dioxide sources, solubilizer, and methods in which carbide lime or slag is used to produce compositions comprising vaterite or PCC, are described herein.

In some embodiments, the carbide lime or the slag is treated with a weak base, such as an ammonium salt, to solubilize calcium in an aqueous solution which is treated with carbon dioxide gas to form composition or precipitation material comprising calcium carbonate. The process may result in residual ammonium salt remaining in the supernatant solution as well as in the precipitate itself after the formation of the precipitate. The "residual ammonium salt" as used herein includes any salt that may be formed by ammonium ions and anions present in the solution including, but not limited to halogen ions such as chloride ions, and sulfur ions such as, sulfate ions, sulfite ions, thiosulfate ions, hydrosulfide ions, and the like. Various methods have been provided herein to remove and optionally recover the ammonium salt from the supernatant solution as well as the precipitate.

In some embodiments, the carbide lime or slag may contain sulfur depending on the source of the carbide lime or slag. For example, the sulfur in the carbide lime may originate from impurities in the coal and/or from the limestone, raw materials in the calcium carbide manufacturing process. The sulfur in the carbide lime or slag may get introduced into the aqueous solution after the solubilization of the carbide lime or the slag with ammonium salts. Further, the sulfur in flue gas (source of $CO_2$) may be in the form of sulfur dioxide gas ($SO_2(g)$). In an alkaline solution, various sulfur compounds containing various sulfur ionic species may be present in the solution including, but not limited to, sulfite ($SO_3^{2-}$), sulfate ($SO_4^{2-}$), hydrosulfide (HS), thiosulfate ($S_2O_3^{2-}$), polysulfides ($S_n^{2-}$), thiol (RSH), and the like. The "sulfur compound" as used herein, includes any sulfur ion containing compound. Examples of sulfur compounds have been provided herein. Various methods have been provided herein to remove and optionally recover the sulfur compound(s) from the supernatant solution as well as the precipitate.

In one aspect, there is provided a method comprising a) treating a slag solid or carbide lime suspension with an ammonium salt in water to produce an aqueous solution comprising calcium salt, ammonium salt, and solids; b) contacting the aqueous solution with carbon dioxide from an industrial process under one or more precipitation conditions to produce a precipitation material comprising calcium carbonate and a supernatant aqueous solution wherein the precipitation material and the supernatant aqueous solution comprise residual ammonium salt; and c) removing and optionally recovering ammonia and/or ammonium salt using one or more steps of (i) recovering a gas exhaust stream comprising ammonia during the treating and/or the contacting step; (ii) recovering the residual ammonium salt from the supernatant aqueous solution; and (iii) removing and optionally recovering the residual ammonium salt from the precipitation material. In some embodiments of the foregoing aspect, the calcium carbonate comprises reactive vaterite. In some embodiments of the foregoing aspect and embodiment, the calcium carbonate comprises more than 50 wt % reactive vaterite.

The foregoing aspect is illustrated in FIG. 1. It is to be understood that the steps illustrated in FIG. 1 may be modified or the order of the steps may be changed or more steps may be added or deleted depending on the desired outcome. As illustrated in FIG. 1, a slag solid or a carbide lime suspension is pretreated before contacting the carbon dioxide with the feedstock to form calcium carbonate.

"Carbide lime" as used herein, includes or comprises or consists essentially of calcium hydroxide. "Carbide lime suspension" as used herein is a suspension of solid in water. In some embodiments, the carbide lime suspension is more than 20 wt % solid suspended in water or between 30-60 wt % solid suspended in water in the form of a slurry. The solids comprise more than about 50 wt % calcium hydroxide or more than about 75 wt % calcium hydroxide. In some embodiments, the carbide lime may be damp solid containing about or more than 90 wt % solids. The carbide lime may be in a dry powder form coming from a dry gas generator and/or is a water slurry from wet generators. The carbide lime may further contain other impurities commonly found in carbide lime such as metal oxides, sulfur, carbon or some carbonates. Typically, carbide lime does not contain any calcium oxide, or any substantial amount of calcium oxide, if any. Other synonyms of carbide lime include calcium carbide residue, carbide sludge, generator slurry, lime slurry, lime sludge, lime hydrate, calcium hydrate, hydrated lime, lime water, and slaked lime etc. It is to be understood that all such synonyms of carbide lime fall within the scope of the invention. Carbide lime is a hydrated lime slurry that may be produced, for example, as a by-product of the generation of acetylene gas according to the following formula:

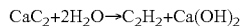

$CaC_2 + 2H_2O \rightarrow C_2H_2 + Ca(OH)_2$

The calcium carbide is typically produced by heating coke and low quality quicklime to very high temperature in an electric arc furnace. The end product may typically be 80% pure with some quantities of lime impurities and unreacted coke present. After the generation of acetylene gas, these calcium carbide impurities may end up in the carbide lime. The acetylene thus formed may be used in producing PVC. In some embodiments, the carbide lime is obtained from acetylene production process, metallurgical process, calcium cyanamide production process, landfill, or combination thereof.

Carbide lime may be a grey-black substance. Typically it consists of calcium hydroxide, the remainder being impurities which depend upon the method used to manufacture the acetylene or any other product and also upon the source of the materials used to manufacture the calcium carbide (normally made by roasting calcium oxide and coal). The impurities may include, but not limited to, the oxides of silicon, iron, aluminium, magnesium, and manganese combined with carbon, ferrosilicon and calcium sulphate. Since the carbide lime does not have a significant commercial use and has the impurities, it may render disposal of the carbide lime difficult. There are millions of tonnes of carbide lime stored in carbide lime pits all over the world. These pits are an ever increasing environmental problem.

One aspect relates to treating carbide lime optionally containing insoluble impurities, to obtain useful and solid calcium carbonate products containing vaterite. In some embodiments, the carbide lime provides divalent cations for producing the precipitation material. In some embodiments, the divalent cations comprise $Ca^{2+}$, $Mg^{2+}$, or a combination thereof. In some embodiments, the carbide lime also provides proton-removing agents for producing the precipitation material.

"Slag" as used herein, is a conventional commercial slag which includes or comprises or consists essentially of dicalcium silicate. X-ray fluorescence (XRF) is typically used to find out an equivalent concentration of calcium oxide (CaO) in slag. For example, basic oxygen furnace (BOF) slag may contain between about 30-60 wt % CaO; electric arc furnace (EAF) slag may contain between about 25-45 wt % CaO; granulated blast furnace (GBF) slag may contain between about 35-45 wt % CaO; and air cooled blast furnace (ACBF) slag may contain between about 35-45 wt % CaO. Any other slag known commercially is well within the scope of this application. Accordingly, slag used herein, may contain between about 25-60 wt % CaO. "Slag solid" as used herein is solid slag. Typically, slag is a large-grain solid which may be milled down to a smaller size. The size of the grain in slag may vary and may be between 1 micron-5 mm; or between 1 micron-1 mm; or between 1 micron-500 micron; or between 1 micron-100 micron. Slag and slag solid may be used interchangeably herein.

As illustrated in FIG. 1, the calcium carbide residue (CCR) or carbide lime obtained from the industrial processes is optionally subjected to dewatering (step 1) where the residual water may be removed (step 2) and the dewatered residue may be subjected to further treatment such as solvation with solubilizer such as a weak base (step 3), examples include without limitation, ammonium salts. Examples of ammonium salts include, without limitation, ammonium chloride, ammonium sulfate, ammonium nitrate, ammonium carbonate, or combinations thereof. The carbide lime slurry may be dewatered using any technique such as centrifugation. In some embodiments, the carbide lime may be treated with weak base to remove impurities that may result from the original calcium carbide and/or from the conditions under which the acetylene is produced.

In some embodiments, the carbide lime is simply purified by removing the solid impurities by conventional techniques, such as centrifugation, filtration, etc. In some embodiments, the carbide lime is purified by treatment with weak base.

Calcium hydroxide is sparingly soluble in water where the solubility may decrease with increase in temperature. In the methods and systems provided herein, the carbide lime's and slag's solubility is increased by its treatment with various chemicals. In some embodiments of the invention, the carbide lime or slag is purified by treating carbide lime or slag with a weak base. The "weak base" as used herein includes any base or conjugate base of the acid (such as, ammonia from N-containing salt, e.g. only, ammonia from ammonium chloride) with a pKb value of between 3-6.5. The "treatment" or "treating" or its grammatical equivalents include solubilizing of calcium hydroxide of carbide lime in aqueous medium or solubilizing of dicalcium silicate of slag in the aqueous medium. In some embodiments, the weak base is a solubilizing weak base that selectively solubilizes calcium hydroxide in the carbide lime or dicalcium silicate in slag and leaves the solid impurities. Such weak bases include without limitation, borate, N-containing salt, or N-containing aliphatic or aromatic compound, etc. Examples of N-containing salt include, but not limited to, ammonium chloride, ammonium sulfate, ammonium nitrate, and the like. Examples of N-containing compounds include, but not limited to, amines (monoethanolamine or ethylamine), amino acid, amino alcohol, amino ester, alicyclic amines and heterocyclic amines such as pyridine, pyrrolidene, etc. Such chemicals are well known in the art and are commercially available.

As illustrated in FIG. 1, the weak base is illustrated as ammonium chloride ($NH_4Cl$). It is to be understood that $NH_4Cl$ is for illustration purposes only and that any other weak base including any other ammonium salt can be used in the methods of the invention. One or more steps may be omitted or modified or the order of the steps may be changed in FIG. 1. The CCR or suspension or slag is solvated or solubilized by treatment with $NH_4Cl$ at step 4. In some embodiments, the dewatered carbide lime is treated with ammonium salt solution, such as, but not limited to, ammonium chloride solution (new and recycled) when the reaction that may occur is:

$$Ca(OH)_2(s)+2NH_4Cl(aq) \rightarrow 2NH_3(aq)+CaCl_2(aq)+2H_2O(l)$$

In some embodiments, the slag is treated with ammonium salt solution, such as, but not limited to, ammonium chloride solution (new and recycled) when the reaction that may occur is:

$$Ca_2SiO_4(s)+4NH_4Cl(aq) \rightarrow 2CaCl_2(aq)+4NH_3(aq)+SiO_2(s)+2H_2O$$

In some embodiments, the weak base such as, but not limited to, ammonium chloride solution may be supplemented with anhydrous ammonia or an aqueous solution of ammonia (step 31) to maintain an optimum level of ammonium chloride in the solution.

In some embodiments, the amount of the weak base such as, borate, N-containing salt, N-containing aliphatic compound, N-containing aromatic compound, or combinations thereof is in 30% excess to carbide lime or slag. In some embodiments, the weak base such as, borate, N-containing salt, N-containing aliphatic compound, N-containing aromatic compound, or combinations thereof is in a ratio of between 0.5:1 to 4:1 (weak base:carbide lime or weak base:slag) or 0.5:1 to 2:1 or 0.5:1 to 1.5:1 or 1:1 to 1.5:1 or 2:1 to 4:1 or 2:1 to 3:1 or 2.5:1 to 3:1 or 3:1 to 4:1, or 2:1, or 3:1, or 4:1 with carbide lime. In some embodiments, the weak base such as, N-containing salt, such as ammonium chloride, ammonium sulfate, ammonium nitrate etc. is in a ratio of between 0.5:1 to 4:1 (N-containing salt:carbide lime or N-containing salt:slag) or 0.5:1 to 2:1 or 0.5:1 to 1.5:1 or 1:1 to 1.5:1 or 2:1 to 4:1 or 2:1 to 3:1 or 2.5:1 to 3:1 or 3:1 to 4:1, or 2:1, or 3:1, or 4:1 with carbide lime.

In some embodiments, the above recited ratios or such ratios herein are molar ratios or wt % ratios.

In some embodiments of the methods described herein, no polyhydroxy compounds are used to form the precipitation material and/or the products of the invention.

Agitation may be used to effect treatment of carbide lime or slag, for example, by eliminating hot and cold spots. In some embodiments of the invention, the concentration of carbide lime in water may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, or 640 and 1280 g/L. To optimize the purification of carbide lime, high shear mixing, wet milling, and/or sonication may be used to break open carbide lime. During or after high shear mixing and/or wet milling, the carbide lime suspension may be treated with weak base and then further contacted with a source of carbon dioxide such as flue gas from a coal-fired power plant or exhaust from a cement kiln.

In some embodiments, the treatment of the carbide lime or the slag with the weak base (e.g. ammonium chloride) and ammonia results in the formation of an aqueous solution of calcium salt, ammonium salt, and solids. In some embodiments, the carbide lime or slag may contain sulfur depending on the source of the carbide lime or slag, as described above. In some embodiments, the presence of sulfur may result in the presence of one or more of sulfur compound in the aqueous solution such that the aqueous solution comprises calcium salt, ammonium salt, sulfur compound, and solids. In some embodiments, the solid impurities may be removed from the aqueous solution before the aqueous solution is treated with carbon dioxide in the process. The solids may optionally be removed from the aqueous solution by filtration and/or centrifugation techniques (optional steps 5 and 7).

In some embodiments, the solid impurity may not be removed from the aqueous solution and the aqueous solution containing calcium salts as well as the solids are contacted with the carbon dioxide in the flue gas (step 8) to form the precipitates of the invention. In such embodiments, the precipitation material further comprises solids. The precipitation material comprising reactive vaterite (as well as solids) when undergoes transformation to aragonite and sets and hardens into cementitious products, the solids get incorporated in the cementitious products. This provides an additional advantage of one less step of removal of the solids, minimizing $NH_4Cl$ loss as well as eliminating a potential waste stream thereby increasing the efficiency and improving the economics of the process. In some embodiments, the solid impurities do not adversely affect the transformation and/or reactivity of the vaterite to aragonite. In some embodiments, the solid impurities do not adversely affect the strength (such as compressive strength or flexural strength) of the cementitious products.

In some embodiments, the solids obtained from solvation of slag are calcium depleted solids and may be used as a cement substitute (such as a substitute for Portland cement). In some embodiments, the removal of calcium from steel slag may result in the solids that improve the cementitious and/or pozzolonic properties of the Portland cement leading to higher compressive strengths of the cement. An example of the use of the solid obtained after slag solvation and its use as a cement substitute has been described herein in Examples section.

In some embodiments, the solid impurities comprise carbon, silica, or combination thereof. Other components may also be present in the solids which have been described above. In some embodiments, the solids are between 1-40 wt %; or between 1-30 wt %; or between 1-20 wt %; or between 1-10 wt % in the aqueous solution, in the precipitation material, or combination thereof.

As illustrated in step 8 in FIG. 1, the following reaction takes place when an aqueous solution comprising calcium salt (and optionally solids) is contacted with carbon dioxide from an industrial process:

$$CaCl_2(aq) \text{ from treatment of carbide lime or slag}+2NH_3(aq)+CO_2(g)+H_2O \rightarrow CaCO_3(s)+2NH_4Cl(aq)$$

The dissolution of $CO_2$ into the solution produces $CO_2$-charged water containing carbonic acid, a species in equilibrium with both bicarbonate and carbonate. In order to produce carbonate precipitation material, protons are removed from various species (e.g. carbonic acid, bicarbonate, hydronium, etc.) by the proton removing agent (e.g., $Ca(OH)_2$) and the calcium salt shift the equilibrium toward carbonate. As protons are removed, more $CO_2$ goes into solution. In some embodiments, other proton-removing agents may be used (as described herein) while contacting a divalent cation-containing aqueous solution with $CO_2$ to increase $CO_2$ absorption in one phase of the precipitation reaction, where the pH may remain constant, increase, or decrease, followed by a rapid removal of protons (e.g., by addition of a base) to cause precipitation of carbonate precipitation material. The carbonate precipitation material is prepared under precipitation conditions (as described herein) suitable to form vaterite containing or PCC material.

An aqueous solution of calcium salt from treatment of carbide lime or slag is contacted with $CO_2$ from a source of $CO_2$ at any time before, during, or after the carbide lime or slag solution is subjected to precipitation conditions (i.e., conditions allowing for precipitation of one or more materials). Accordingly, in some embodiments, an aqueous solution of calcium salt solution is contacted with a source of $CO_2$ prior to subjecting the aqueous solution to precipitation conditions that favor formation of stable or reactive vaterite or PCC containing carbonate compounds. In some embodiments, an aqueous solution of calcium salt solution is contacted with a source of $CO_2$ while the aqueous solution is being subjected to precipitation conditions that favor formation of stable or reactive vaterite or PCC containing carbonate compounds. In some embodiments, an aqueous solution of calcium salt solution is contacted with a source of a $CO_2$ prior to and while subjecting the aqueous solution to precipitation conditions that favor formation of stable or reactive vaterite or PCC containing carbonate compounds. In some embodiments, an aqueous solution of calcium salt solution is contacted with a source of $CO_2$ after subjecting the aqueous solution to precipitation conditions that favor formation of stable or reactive vaterite or PCC containing carbonate compounds. In some embodiments, an aqueous solution of calcium salt solution is contacted with a source of $CO_2$ before, while, and after subjecting the aqueous solution to precipitation conditions that favor formation of stable or reactive vaterite or PCC containing carbonate compounds.

In some embodiments, the contacting of the aqueous solution comprising calcium salt with carbon dioxide from an industrial process is achieved by contacting the aqueous solution to achieve and maintain a desired pH range, a desired temperature range, and/or desired divalent cation concentration using a convenient protocol as described herein. In some embodiments, the systems of the invention include a precipitation reactor configured to contact the aqueous solution comprising calcium salt with carbon dioxide from an industrial process.

In some embodiments, flue gas from a coal-fired power plant is passed directly into a precipitation reactor without prior removal of the fly ash, obviating the use of electrostatic precipitators and the like. In some embodiments, the aqueous solution comprising calcium salt is provided to a precipitation reactor directly. In some embodiments, the aqueous solution comprising calcium salt may be placed in a precipitation reactor holding water, wherein the amount of aqueous solution comprising calcium salt added is sufficient to raise the pH to a desired level (e.g., a pH that induces precipitation of the precipitation material) such as pH 7-14, pH 8-14, pH 9-14, pH 10-14, pH 11-14, pH 12-14, or pH 13-14. In some embodiments, the pH of the aqueous solution, comprising calcium salt when contacted with carbon dioxide, is maintained at between 7-8.5 or between 7.5-8.5 or between 7-8, or between 7.6-8.5, or between 8-8.5, or between 7.5-9.5 in order to form the precipitation material comprising stable vaterite, reactive vaterite or PCC. In some embodiments, the aqueous solution is immobilized in a column or bed. In such embodiments, water is passed through or over an amount of the calcium salt solution sufficient to raise the pH of the water to a desired pH or to a particular divalent cation concentration. In some embodiments, the aqueous solution may be cycled more than once, wherein a first cycle of precipitation removes primarily calcium carbonate minerals and leaves an alkaline solution to which additional aqueous solution comprising calcium salt may be added. Carbon dioxide, when contacted with the recycled solution of the aqueous solution, allows for the precipitation of more carbonate and/or bicarbonate compounds. It will be appreciated that, in these embodiments, the aqueous solution following the first cycle of precipitation may be contacted with the $CO_2$ source before, during, and/or after aqueous solution comprising calcium salt has been added. In these embodiments, the water may be recycled or newly introduced. As such, the order of addition of $CO_2$ and the aqueous solution comprising calcium salt may vary. For example, the aqueous solution comprising calcium salt providing divalent cations and proton-removing agents may be added to, for example, brine, seawater, or freshwater, followed by the addition of $CO_2$. In another example, $CO_2$ may be added to, for example, brine, seawater, or freshwater, followed by the addition of the aqueous solution comprising calcium salt.

The aqueous solution comprising calcium salt may be contacted with a $CO_2$ using any convenient protocol. Where the $CO_2$ is a gas, contact protocols of interest include, but not limited to, direct contacting protocols (e.g., bubbling the $CO_2$ gas through the aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, in the precipitation reactor. In some embodiments, gas-liquid contact is accomplished by forming a liquid sheet of solution with a flat jet nozzle, wherein the $CO_2$ gas and the liquid sheet move in countercurrent, co-current, or crosscurrent directions, or in any other suitable manner. Further description in for example, U.S. Patent Application No. 61/158,992, filed 10 Mar. 2009, is hereby incorporated by reference in its entirety. In some embodiments, gas-liquid contact is accomplished by contacting liquid droplets of solution having an average diameter of 500 micrometers or less, such as 100 micrometers or less, with a $CO_2$ gas source.

The source of $CO_2$ may be any convenient $CO_2$ source. The $CO_2$ source may be a gas, a liquid, a solid (e.g., dry ice), a supercritical fluid, or $CO_2$ dissolved in a liquid. In some embodiments, the $CO_2$ source is a gaseous $CO_2$ source. The gaseous stream may be substantially pure $CO_2$ or comprise multiple components that include $CO_2$ and one or more additional gases and/or other substances such as ash and other particulates. In some embodiments, the gaseous $CO_2$ source is a waste feed (i.e., a by-product of an active process of the industrial plant) such as exhaust from an industrial plant. The nature of the industrial plant may vary, the industrial plants of interest including, but not limited to, power plants, chemical processing plants, mechanical processing plants, refineries, cement plants, steel plants, and other industrial plants that produce $CO_2$ as a by-product of fuel combustion or another processing step (such as calcination by a cement plant).

Waste gas streams comprising $CO_2$ include both reducing (e.g., syngas, shifted syngas, natural gas, hydrogen and the like) and oxidizing condition streams (e.g., flue gases from combustion). Particular waste gas streams that may be convenient for the invention include oxygen-containing combustion industrial plant flue gas (e.g., from coal or another carbon-based fuel with little or no pretreatment of the flue gas), turbo charged boiler product gas, coal gasification product gas, shifted coal gasification product gas, anaerobic digester product gas, wellhead natural gas stream, reformed natural gas or methane hydrates, and the like.

Combustion gas from any convenient source may be used in methods and systems of the invention. In some embodiments, combustion gases in post-combustion effluent stacks of industrial plants such as power plants, cement plants, and coal processing plants is used.

Thus, the waste streams may be produced from a variety of different types of industrial plants. Suitable waste streams for the invention include waste streams produced by industrial plants that combust fossil fuels (e.g., coal, oil, natural gas) and anthropogenic fuel products of naturally occurring organic fuel deposits (e.g., tar sands, heavy oil, oil shale, etc.). In some embodiments, waste streams suitable for systems and methods of the invention are sourced from a coal-fired power plant, such as a pulverized coal power plant, a supercritical coal power plant, a mass burn coal power plant, a fluidized bed coal power plant; in some embodiments the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce aggregate in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously.

Industrial waste gas streams may contain carbon dioxide as the primary non-air derived component, or may, especially in the case of coal-fired power plants, contain additional components such as nitrogen oxides (NOx), sulfur oxides (SOx), and one or more additional gases. Additional gases and other components may include CO, mercury and other heavy metals, and dust particles (e.g., from calcining and combustion processes). Additional components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, $CO_2$ present in amounts of 200 ppm to 1,000,000 ppm, such as 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm. The waste streams, particularly various waste streams of combustion gas, may include one or more additional components, for example, water, NOx (mononitrogen oxides: NO and NO2), SOx (monosulfur oxides: SO, $SO_2$ and $SO_3$), VOC (volatile organic compounds), heavy metals such as mercury, and particulate matter (particles of solid or liquid suspended in a gas). Flue gas temperature may also vary. In some embodiments, the temperature of the flue gas is from 0° C. to 2000° C., such as from 60° C. to 700° C., and including 100° C. to 400° C.

In various embodiments, one or more additional components are precipitated in precipitation material formed by contacting the waste gas stream comprising these additional components with an aqueous solution comprising calcium salt (optionally also solids). Sulfates and/or sulfites of calcium, ammonium and optionally magnesium may be precipitated in precipitation material produced from waste gas streams comprising SOx (e.g., $SO_2$). Magnesium and calcium may react to form $CaSO_4$, $MgSO_4$, as well as other calcium- and magnesium-containing compounds (e.g., sulfites), effectively removing sulfur from the flue gas stream without a desulfurization step such as flue gas desulfurization ("FGD"). In instances where the aqueous solution of divalent cations contains high levels of sulfur compounds (e.g., sulfate), the aqueous solution may be enriched with calcium and magnesium so that calcium and magnesium are available to form carbonate compounds after, or in addition to, formation of $CaSO_4$, $MgSO_4$, and related compounds. In some embodiments, a desulfurization step may be staged to coincide with precipitation of the precipitation material, or the desulfurization step may be staged to occur before precipitation. In some embodiments, multiple reaction products (e.g., precipitation material containing vaterite, $CaSO_4$, etc.) are collected at different stages, while in other embodiments a single reaction product (e.g., carbonate containing precipitation material comprising vaterite, sulfates, etc.) is collected. In step with these embodiments, other components, such as heavy metals (e.g., mercury, mercury salts, mercury-containing compounds), may be trapped in the precipitation material or may precipitate separately.

A portion of the gaseous waste stream (i.e., not the entire gaseous waste stream) from an industrial plant may be used to produce precipitation material. In these embodiments, the portion of the gaseous waste stream that is employed in precipitation of precipitation material may be 75% or less, such as 60% or less, and including 50% and less of the gaseous waste stream. In yet other embodiments, substantially (e.g., 80% or more) the entire gaseous waste stream produced by the industrial plant is employed in precipitation of precipitation material. In these embodiments, 80% or more, such as 90% or more, including 95% or more, up to 100% of the gaseous waste stream (e.g., flue gas) generated by the source may be employed for precipitation of precipitation material.

Although industrial waste gas offers a relatively concentrated source of combustion gases, methods and systems of the invention are also applicable to removing combustion gas components from less concentrated sources (e.g., atmospheric air), which contains a much lower concentration of pollutants than, for example, flue gas. Thus, in some embodiments, methods and systems encompass decreasing the concentration of pollutants in atmospheric air by producing a stable precipitation material. In these cases, the concentration of pollutants, e.g., $CO_2$, in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in atmospheric pollutants may be accomplished with yields as described herein, or with higher or lower yields, and may be accomplished in one precipitation step or in a series of precipitation steps.

Any of a number of the gas-liquid contacting protocols described herein may be utilized. Gas-liquid contact is continued until the pH of the precipitation reaction mixture is optimum (various optimum pH values have been described herein including Example to form reactive vaterite), after which the precipitation reaction mixture is allowed to stir. The rate at which the pH drops may be controlled by addition of more of the aqueous solution comprising calcium salt during gas-liquid contact. In addition, additional aqueous solution may be added after sparging to raise the pH back to basic levels for precipitation of a portion or all of the precipitation material. In any case, precipitation material may be formed upon removing protons from certain species (e.g., carbonic acid, bicarbonate, hydronium) in the precipitation reaction mixture. A precipitation material comprising carbonates may then be separated and, optionally, further processed.

In some embodiments, the carbon dioxide captured in the methods herein is from flue gas. In some embodiments, the flue gas may not require any additional treatment and the flue gas may directly be used to undergo the reaction with the aqueous solution of the calcium salt. In some embodiments, the flue gas has a temperature between 25-60° C. and comprises SOx less than 500 ppm. In some embodiments, the flue gas leaving the absorber or the reactor (gas exhaust stream 10 in FIG. 1) passes to a flue gas treatment unit for a scrubbing process. The mass balance and equipment design for the flue gas treatment unit may depend on the properties of the carbide residue or slag (stream 1) and flue gas (stream 8). In some embodiments, the flue gas treatment unit may incorporate an HCl scrubber for recovering the small amounts of $NH_3$ in the gas exhaust stream that may be carried from the $CO_2$ absorption (contacting step), precipitation step by the flue gas (stream 10). $NH_3$ may be captured by the HCl solution through:

$$NH_3(g) + HCl(aq) \rightarrow NH_4Cl(aq)$$

The $NH_4Cl$ (aq) from the HCl scrubber may be recycled to the recycle surge tank.

Figure 2:
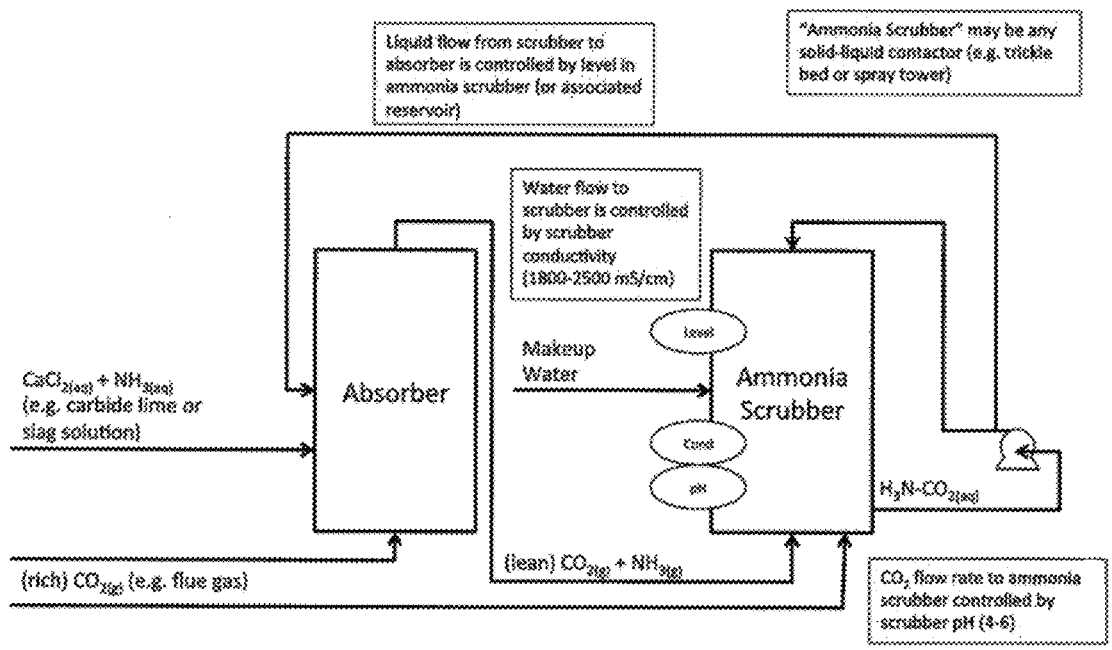
FIG. 2 illustrates some method and system embodiments provided herein.

In some embodiments, the gas exhaust stream comprising ammonia and optionally hydrogen sulfide may be subjected to a scrubbing process where the gas exhaust stream comprising ammonia and optionally hydrogen sulfide is scrubbed with the carbon dioxide from the industrial process and water to produce a solution of ammonia. This scrubbing process is being illustrated in FIG. 2. The inlets for the scrubber may be carbon dioxide ($CO_{2(g)}$) from flue gas, the reactor gas exhaust containing ammonia ($NH_{3(g)}$), and fresh makeup water (or some other dilute water stream). The outlet may be a slipstream of the scrubber's recirculating fluid (e.g. 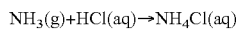 or carbamate), which may optionally be returned back to the main reactor for contacting with carbon dioxide and precipitation. The pH of the system may be controlled by regulating the flow rate of $CO_{2(g)}$ into the scrubber. The conductivity of the system may be controlled by addition of dilute makeup water to the scrubber. Volume may be maintained constant by using a level detector in the scrubber or it's reservoir. While ammonia is a basic gas, the hydrogen sulfide and carbon dioxide gases are acidic gases. In some embodiments, the acidic and basic gases may ionize each other to increase their solubilities. Without being limited by any theory, it is contemplated that the following reactions may take place:

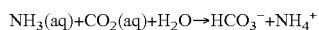

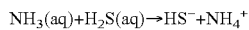

A second unit may be present comprising an activated carbon adsorption step for capturing $H_2S$. Carbide residue may typically contain small amounts of sulfur, some of which may be converted to $H_2S$ in CCR or slag solvation. The amount of $H_2S$ formed may depend on the amount and type of sulfur in the carbide residue or slag residue (stream 1). $H_2S$ may be stripped from the carbon adsorber and oxidized to sulfuric acid in a thermal oxidizer. The sulfuric acid may be a waste stream that may require treatment or disposal.

The aqueous solution comprising calcium salt when contacted with flue gas at step 8 results in the precipitation of calcium carbonate. The precipitation conditions that result in the formation of the stable or reactive vaterite or PCC in this process have been described herein below. The rate at which the pH drops may be controlled by addition of additional supernatant or the aqueous solution comprising calcium salt during gas-liquid contact. In addition, additional supernatant or the aqueous solution comprising calcium salt may be added after gas-liquid contact to raise the pH back to basic levels (e.g. between 7-9 or between 7-8.5 or between 7-8) for precipitation of a portion or all of the precipitation material. In any case, the carbonate precipitation material is formed upon removing protons from certain species (e.g., carbonic acid, bicarbonate, hydronium) in the precipitation reaction mixture.

The "stable vaterite" or its grammatical equivalent as used herein includes vaterite that does not transform to aragonite or calcite during and/or after dissolution-reprecipitation process. The "reactive vaterite" or "activated vaterite" or its grammatical equivalent as used herein, includes vaterite that results in aragonite formation during and/or after dissolution-re-precipitation process. The method for formation of such reactive vaterite has been described herein. The "precipitated calcium carbonate" or "PCC" as used herein includes conventional PCC with high purity and micron or lesser size particles. The PCC can be in any polymorphic form of calcium carbonate including but not limited to vaterite, aragonite, calcite, or combination thereof. In some embodiments, the PCC has a particle size in nanometers or between 0.001 micron to 5 micron.

In some embodiments, the above recited methods further include separating the precipitation material (e.g. dewatering) from the aqueous solution by dewatering, rinsing, and optionally drying (steps 11, 16, and 18). The precipitated material may then be used to make cementitious or non-cementitious products.

In some embodiments, the vaterite in the precipitation material may be formed under suitable conditions so that the vaterite is reactive and transforms to aragonite upon dissolution-precipitation process (during cementation). The aragonite may impart one or more unique characteristics to the product including, but not limited to, high compressive strength, complex microstructure network, neutral pH etc. In some embodiments, the vaterite in the precipitation material may be formed under suitable conditions so that the vaterite is stable and is used as filler in various applications. In some embodiments, the PCC in the precipitation material may be formed under suitable conditions so that the PCC is highly pure and is of a very small size particle.

In some embodiments, the calcium carbonate cake, as described above, may contain impurities (e.g., 1-2% by weight or more) of ammonium ($NH_4^+$) ions, sulfur ions (as described herein), and chloride ($Cl^-$) ions. While rinsing of the filter cake of the precipitated $CaCO_3$, as described above, may remove some or all of the ammonium salts and/or sulfur compounds, it may result in a dilute concentration of ammonium salts (in the supernatant) which may need concentrating before recycling it back to the process.

As illustrated in FIG. 1, the calcium carbonate slurry is subjected to dewatering (step 11) and optionally rinsed (step 16) to form calcium carbonate slurry (with reduced water) or cake and the water containing residual ammonium salt and/or sulfur compound solution. The residual ammonium chloride solution obtained from the dewatering ($NH_4Cl$ recovery 1) as well as the rinsing stream ($NH_4Cl$ recovery 2) may optionally be concentrated (step 15 and 20) before being recycled back for the treatment with carbide lime in step 4 or is treated as waste. Additional ammonium chloride and/or ammonia (anhydrous or aqueous solution) (step 24 and 31) may be added to the recycled solution to make up for the loss of the ammonium chloride during the process and bring the concentration of ammonium chloride to the optimum level.

In some embodiments, the residual ammonium salt such as the ammonium chloride solution illustrated in FIG. 1, may be recovered from the supernatant aqueous solution and concentrated using recovery process, such as, but not limited to, thermal decomposition, pH adjustment, reverse osmosis, multi-stage flash, multi-effect distillation, vapor recompression, distillation, or combinations thereof. The systems configured to carry out these processes are available commercially. For example, the pH of the solution may be raised (either with a strong base like NaOH, or using carbide lime filtrate containing soluble $Ca(OH)_2$). This may shift the equilibrium towards volatile ammonia ($NH_3(aq)/NH_3(g)$). Rates and total removal could both be improved by heating the solution.

In some embodiments, the residual ammonium salts and/or sulfur compounds may be separated and recovered from the calcium carbonate precipitate by thermal decomposition process. This process may be incorporated in the process illustrated in FIG. 1 at the separation of the $CaCO_3$ precipitate step 16 and/or after the step 18 of the dried $CaCO_3$ precipitate or powder.

Typically, at 338° C., solid $NH_4Cl$ may decompose into ammonia ($NH_3$) and hydrogen chloride (HCl) gases. While at 840° C., solid $CaCO_3$ decomposes to calcium oxide (CaO) solid and carbon dioxide ($CO_2$) gas.

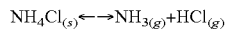

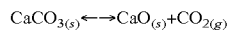

In some embodiments, the residual ammonium salt in the $CaCO_3$ precipitate and/or dried $CaCO_3$ precipitate such as, but not limited to, ammonium chloride, ammonium sulfate, ammonium sulfite, ammonium hydrosulfide, ammonium thiosulfate, or combinations thereof may be removed by thermal decomposition at a temperature between 338-840° C. This may be done either during the normal filter cake drying process and/or as a second post-drying heat treatment. Applicants found a temperature range that decomposes residual ammonium salts in the precipitation while preserving the cementitious properties of the reactive vaterite in the precipitation material such that the reactive vaterite stayed as reactive vaterite after heating, and after combination with water, successfully transformed to aragonite to form cementitious products. In some embodiments of the foregoing aspect and embodiments, the step (iii) of removing and optionally recovering the residual ammonium salt from the precipitation material comprises heating the precipitation material between about 290-375° C. or between about 300-360° C. or between about 300-350° C. or between about 310-345° C. or between about 320-345° C. or between about 330-345° C. or between about 300-345° C., to evaporate the ammonium salt from the precipitation material with optional recovery by condensation of the ammonium salt. In some embodiments of the foregoing aspect and embodiments, the step (iii) of removing and optionally recovering the residual ammonium salt from the precipitation material comprises heating the precipitation material, is for a duration of more than about 10 min or of more than about 15 min or for than about 5 min or of between about 10 min to about 1 hour or of between about 10 min to about 1.5 hour or of between about 10 min to about 2 hours or of between about 10 min to about 5 hours or of between about 10 min to about 10 hours.

In some embodiments, the precipitation material is dewatered (to remove the supernatant aqueous solution) and dried to remove water (e.g. by heating at about or above 100° C.) before subjecting the precipitation material to the heating step (iii) to remove and optionally recover the ammonium salt. In some embodiments, the precipitation material is partially dewatered (to remove bulk of the supernatant aqueous solution) and partially dried to remove water (or avoid the drying step) before subjecting the precipitation material to the heating step (iii) to remove and optionally recover the ammonium salt. In some embodiments, the reactive vaterite in the precipitation material stays as reactive vaterite after heating. In some embodiments, the reactive vaterite in the precipitation material stays as reactive vaterite after heating may transform to aragonite and/or calcite after heating. In some embodiments of the foregoing embodiments, it is desirable that the reactive vaterite in the precipitation material stays as reactive vaterite such that the cementitious properties of the material are conserved. In some embodiments, the ammonium salt evaporates from the precipitation material in a form comprising ammonia gas, hydrogen sulfide gas, sulfur dioxide gas, hydrogen chloride gas, chlorine gas, or combinations thereof. In some embodiments, the aqueous solution, the supernatant solution, the precipitation material, or combinations thereof further comprise sulfur compound and the step (iii) further comprises removing the sulfur compound in a form comprising hydrogen sulfide and/or sulfur dioxide gas from the precipitation material.

Applicants have found that in some embodiments, maintaining a combination of the amount of temperature and duration of heating may be critical to removing ammonium salt and sulfur compound(s) from the precipitation material yet preserving the cementitious properties of the reactive vaterite material (see Examples 10 and 11). Traditionally, reactive vaterite is highly unstable and transforms readily to aragonite/calcite. However, Applicants have found temperature ranges coupled optionally with duration of heating that minimizes the transformation of the reactive vaterite yet removes residual ammonium salts from the material. In some embodiments of the foregoing embodiments, the vaterite in the precipitation material, after removal of the ammonium salt, stays as reactive vaterite which when combined with water transforms to aragonite which sets and cements to form cementitious products. The cementitious products, thus formed, possess minimal or no chloride content and have no foul smell of ammonia or sulfur. In some embodiments, the chloride content is around or below acceptable ASTM standards for the cementitious products.

In some embodiments, the above recited temperature conditions optionally coupled with duration of heating, may be combined with pressure conditions that provide a driving force to improve the thermodynamics of the decomposition of the residual ammonium salt. For example, the heating of the precipitation material may be carried out in a system in which the headspace is at a pressure lower than atmospheric pressure. The pressure lower than the atm pressure may create a driving force for heating reaction that involves gas phase products (such as, but not limited to, ammonia gas, hydrogen sulfide gas, sulfur dioxide gas, hydrogen chloride gas, chlorine gas, or combinations thereof), by reducing the partial pressure of the reactant in the vapor phase. Another advantage of operating under reduced pressure or vacuum may be that at lower pressure some sublimation reactions may occur at lower temperatures thereby improving the energy requirements of the heating reaction.

Accordingly, in some embodiments of the foregoing aspect and embodiments, the step (iii) of removing and optionally recovering the residual ammonium salt from the precipitation material comprises heating the precipitation material between about 290-375° C. or between about 300-360° C. or between about 300-350° C. or between about 310-345° C. or between about 320-345° C. or between about 330-345° C. or between about 300-345° C., while maintaining a pressure below atm pressure, to evaporate the ammonium salt from the precipitation material with optional recovery by condensation of the ammonium salt. In some embodiments of the foregoing embodiments, the step (iii) of removing and optionally recovering the residual ammonium salt from the precipitation material comprises heating the precipitation material, is for a duration of more than about 10 min or of more than about 15 min or for than about 5 min or of between about 10 min to about 1 hour or of between about 10 min to about 1.5 hour or of between about 10 min to about 2 hours or of between about 10 min to about 5 hours or of between about 10 min to about 10 hours.

In some embodiments of the above described thermal decomposition process, the separated ammonium chloride in the form of ammonia and HCl gases, may be recovered for reuse by either recrystallization of the combined thermally evolved gases or by absorbing the gases into an aqueous medium. Both mechanisms may result in the NH$_4$Cl product that may be concentrated enough for reuse in the process described in FIG. 1.

In some embodiments, the ammonium salt may be separated and recovered in the above described process (or as illustrated in FIG. 1) by pH adjusted evolution of NH$_3$ gas from the ammonium salt. This process may be incorporated in the process illustrated in FIG. 1 at the separation of the CaCO$_3$ cake step 11 or 16. The final pH of the water in the filter cake may typically be about 7.5. At this pH, NH$_4^+$ (pKa=9.25) may be the predominant species. Increasing the pH of this water may drive the acid base equilibrium toward NH$_3$ gas, as described in the following equation:

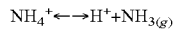

$$NH_4^+ \leftarrow\!\!\rightarrow H^+ + NH_{3(g)}$$

Any source of alkalinity may be used to increase the pH of the filter cake water. Various examples of alkalinity have been described herein that may be used to increase the pH of the water containing the filter cake. In some embodiments, the aqueous solution of carbide lime may provide the source of high alkalinity. The aqueous fraction of the carbide lime contains calcium hydroxide (Ca(OH)$_2$), which may result in a solution of pH about 12.5.

In some embodiments, this aqueous fraction of the carbide lime may be integrated into the rinsing stage of the dewatering process (e.g. filter cake step 16) to raise the pH of the system, and drive the evolution of NH$_3$ gas. As ammonia has substantial solubility in water, heat and/or vacuum pressure may be applied to drive the equilibrium further toward the gaseous phase. The ammonia may be recovered for reuse by either recrystallization of ammonia with chloride or by absorbing the ammonia into an aqueous medium. Both mechanisms may result in the ammonia solution or NH$_4$Cl product that may be concentrated enough for reuse in the process described in FIG. 1.

The calcium carbonate cake (vaterite or PCC) may be sent to the dryer before, during, and/or after step (ii) to form calcium carbonate powder containing stable or reactive vaterite or PCC. The powder form of the precipitation material comprising stable or reactive vaterite or PCC may be used further in applications to form products, as described herein. The cake may be dried using any drying techniques known in the art such as, but not limited to fluid bed dryer or swirl fluidizer. The resulting solid powder is then mixed with additives to make different products described herein. In some embodiments, the slurry form with reduced water or the cake form of the precipitation material is directly used to form products, such as construction panel, as described herein.

Optionally the solids separated at step 7, may be dried and used as a pozzolan. In some embodiments, the solids separated at step 7 may be added to the powder form of the precipitation material comprising vaterite as a filler or supplementary cementitious material.

In methods provided herein, an aqueous solution comprising CO$_2$ charged water, produced by contacting the aqueous solution comprising calcium salt with CO$_2$, is subjected to one or more of carbonate compound precipitation conditions sufficient to produce a precipitation material comprising stable or reactive vaterite and a supernatant (i.e., the part of the precipitation reaction mixture that is left over after precipitation of the precipitation material). The one or more precipitation conditions favor production of a precipitation material comprising stable or reactive vaterite.

The precipitation conditions include those that modulate the environment of the CO$_2$ charged precipitation reaction mixture to produce the desired precipitation material comprising stable or reactive vaterite or PCC. Such one or more precipitation conditions, that can be used in the foregoing method embodiments or the method embodiments described herein, suitable to form stable or reactive vaterite or PCC containing carbonate precipitation material include, but are not limited to, temperature, pH, pressure, ion ratio, precipitation rate, presence of additive, presence of ionic species, concentration of additive and ionic species, stirring, residence time, mixing rate, forms of agitation such as ultrasonics, presence of seed crystals, catalysts, membranes, or substrates, dewatering, drying, ball milling, etc. In some embodiments, the average particle size of the stable or the reactive vaterite or PCC may also depend on the one or more precipitation conditions used in the precipitation of the carbonate precipitation material. In some embodiments, the percentage of the stable or the reactive vaterite in the carbonate precipitation material may also depend on the one or more precipitation conditions used in the precipitation process.

For example, the temperature of the CO$_2$-charged precipitation reaction mixture may be raised to a point at which an amount suitable for precipitation of the desired precipitation material occurs. In such embodiments, the temperature of the CO$_2$ charged precipitation reaction mixture may be raised to a value, such as from 20° C. to 50° C., and including from 25° C. to 45° C. While a given set of precipitation conditions may have a temperature ranging from 0° C. to 100° C., the temperature may be raised in certain embodiments to produce the desired precipitation material. In certain embodiments, the temperature of the precipitation reaction mixture is raised using energy generated from low or zero carbon dioxide emission sources (e.g., solar energy source, wind energy source, hydroelectric energy source, waste heat from the flue gases of the carbon emitter, etc). In some embodiments, the temperature of the precipitation reaction mixture may be raised utilizing heat from flue gases from coal or other fuel combustion.

The pH of the $CO_2$-charged precipitation reaction mixture may also be raised to an amount suitable for precipitation of the desired precipitation material. In such embodiments, the pH of the $CO_2$-charged precipitation reaction mixture is raised to alkaline levels for precipitation, wherein carbonate is favored over bicarbonate. In some embodiments, the pH of the aqueous solution comprising calcium salt that is contacted with the carbon dioxide gas has an effect on the formation of the reactive vaterite or PCC. In some embodiments, the precipitation conditions required to form the precipitation material comprising reactive vaterite or PCC include conducting the contacting step of the carbon dioxide with the aqueous solution comprising calcium salt at pH higher than 7 or pH of 8 or pH of between 7.1-8.5 or pH of between 7.5-8 or between 7.5-8.5 or between 8-8.5 or between 7.6-8.4, in order to form the reactive vaterite or PCC. The pH may be raised to pH 9 or higher, such as pH 10 or higher, including pH 11 or higher. For example, when carbide lime is used to raise the pH of the precipitation reaction mixture or precursor of the precipitation reaction mixture, the pH may be about pH 12.5 or higher.

Adjusting major ion ratios during precipitation may influence the nature of the precipitation material. Major ion ratios may have considerable influence on polymorph formation. For example, as the magnesium:calcium ratio in the water increases, aragonite may become the major polymorph of calcium carbonate in the precipitation material over low-magnesium vaterite. At low magnesium:calcium ratios, low-magnesium calcite may become the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}:Ca^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

Precipitation rate may also have an effect on compound phase formation, with the most rapid precipitation rate achieved by seeding the solution with a desired phase. Without seeding, rapid precipitation may be achieved by rapidly increasing the pH of the precipitation reaction mixture, which may result in more amorphous constituents. The higher the pH, the more rapid is the precipitation, which may result in a more amorphous precipitation material.

Residence time of the reaction mixture after contacting the aqueous solution with the $CO_2$ may also have an effect on compound phase formation. For example, in some embodiments, a longer residence time may result in transformation of the reactive vaterite to aragonite/calcite within the reaction mixture. In some embodiments, too short residence time may result in an incomplete formation of the reactive vaterite in the reaction mixture. Therefore, the residence time may be critical to the precipitation of the reactive vaterite. Further, the residence time may also affect the particle size of the precipitate. For example, too long residence time may result in the agglomeration of the particles forming large size particles which is undesirable for PCC formation. Therefore, in some embodiments, the residence time of the reaction is between about 10 min to 1 hour, or between about 15 min-60 min, or between about 15 min-45 min, or between about 15 min-30 min, or between about 30 min-60 min.

In some embodiments, a set of precipitation conditions to produce a desired precipitation material from a precipitation reaction mixture may include, as above, the temperature and pH, as well as, in some instances, the concentrations of additives and ionic species in the water. The additives have been described herein below. The presence of the additives and the concentration of the additives may also favor formation of stable or reactive vaterite or PCC. In some embodiments, a middle chain or long chain fatty acid ester may be added to the aqueous solution during the precipitation to form PCC. Examples of fatty acid esters include, without limitation, cellulose such as carboxymethyl cellulose, sorbitol, citrate such as sodium or potassium citrate, stearate such as sodium or potassium stearate, phosphate such as sodium or potassium phosphate, sodium tripolyphosphate, hexametaphosphate, EDTA, or combinations thereof. In some embodiments, a combination of stearate and citrate may be added during the contacting step of the process to from PCC. An example has been described herein showing the use of stearate and citrate for the precipitation of PCC.

Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare precipitation material according to the invention may be batch, semi-batch, or continuous protocols. The precipitation conditions may be different to produce a given precipitation material in a continuous flow system compared to a semi-batch or batch system.

The precipitation material, following production from a precipitation reaction mixture, is separated from the reaction mixture to produce separated precipitation material (e.g., wet cake) and a supernatant as illustrated in FIG. 1. In the systems of the invention, the separation step may be carried out on the separation station. The precipitation material may be stored in the supernatant for a period of time following precipitation and prior to separation (e.g., by drying). For example, the precipitation material may be stored in the supernatant for a period of time ranging from few min to hours to 1 to 1000 days or longer, such as 1 to 10 days or longer, at a temperature ranging from 1° C. to 40° C., such as 20° C. to 25° C. Separation of the precipitation material from the precipitation reaction mixture is achieved using any of a number of convenient approaches, including draining (e.g., gravitational sedimentation of the precipitation material followed by draining), decanting, filtering (e.g., gravity filtration, vacuum filtration, filtration using forced air), centrifuging, pressing, or any combination thereof. Separation of bulk water from the precipitation material produces a wet cake of precipitation material, or a dewatered precipitation material. Some examples of the separation are described in U.S. patent application Ser. No. 13/409,856, filed Mar. 1, 2012, which is herein incorporate by reference. Liquid-solid separator such as Epuramat's Extrem-Separator ("ExSep") liquid-solid separator, Xerox PARC's spiral concentrator, or a modification of either of Epuramat's ExSep or Xerox PARC's spiral concentrator, may be useful for the separation of the precipitation material from the precipitation reaction mixture.

In some embodiments, the resultant dewatered precipitation material such as the wet cake material (after thermally removing the ammonium salt) is directly used to make the products described herein. For example, the wet cake of the dewatered precipitation material is mixed with one or more additives, described herein, and is spread out on the conveyer belt where the reactive vaterite or PCC in the precipitation material transforms to aragonite and sets and hardens (and ammonium salt gets thermally removed). The hardened material is then cut into desired shapes such as boards or panels described herein. In some embodiments, the wet cake is poured onto a sheet of paper on top of the conveyor belt. Another sheet of paper may be put on top of the wet cake which is then pressed to remove excess water. After the setting and hardening of the precipitation material (vaterite transformation to aragonite), the material is cut into desired shapes, such as, cement siding boards and drywall etc. In some embodiments, the amount of the one or more additives may be optimized depending on the desired time required for the transformation of the vaterite to aragonite (described below). For example, for some applications, it may be desired that the material transform rapidly and in certain other instance, a slow transformation may be desired. In some embodiments, the wet cake may be heated on the conveyer belt to hasten the transformation of the vaterite to aragonite. In some embodiments, the wet cake may be poured in the molds of desired shape and the molds are then heated in the autoclave to hasten the transformation of the vaterite to aragonite (and to remove residual ammonium salt). Accordingly, the continuous flow process, batch process or semi-batch process, all are well within the scope of the invention.

In some embodiments, the precipitation material, once separated from the precipitation reaction mixture, is washed with fresh water, then placed into a filter press to produce a filter cake with 30-60% solids. This filter cake is then mechanically pressed in a mold, using any convenient means, e.g., a hydraulic press, at adequate pressures, e.g., ranging from 5 to 5000 psi, such as 1000 to 5000 psi, to produce a formed solid, e.g., a rectangular brick. These resultant solids are then cured, e.g., by placing outside and storing, by placing in a chamber wherein they are subjected to high levels of humidity and heat, etc. These resultant cured solids are then used as building materials themselves or crushed to produce aggregate. Methods of producing such aggregate are further described in U.S. patent application Ser. No. 12/475,378, filed 29 May 2009, the disclosure of which is herein incorporated by reference.

In processes involving the use of temperature and pressure, the dewatered precipitate cake may be dried. The cake is then exposed to a combination of rewatering, and elevated temperature and/or pressure for a certain time. The combination of the amount of water added back, the temperature, the pressure, and the time of exposure, as well as the thickness of the cake, can be varied according to composition of the starting material and the desired results.

A number of different ways of exposing the material to temperature and pressure are described herein; it will be appreciated that any convenient method may be used. Thickness and size of the cake may be adjusted as desired; the thickness can vary in some embodiment from 0.05 inch to 5 inches, e.g. 0.1-2 inches, or 0.3-1 inch. In some embodiments the cake may be 0.5 inch to 6 feet or even thicker. The cake is then exposed to elevated temperature and/or pressure for a given time, by any convenient method, for example, in a platen press using heated platens. The heat to elevate the temperature, e.g., for the platens, may be provided, e.g., by heat from an industrial waste gas stream such as a flue gas stream. The temperature may be any suitable temperature; in general, for a thicker cake a higher temperature is desired; examples of temperature ranges are 40-150° C., e.g., 60-120° C., such as 70-110° C., or 80-100° C. Similarly, the pressure may be any suitable pressure to produce the desired results; exemplary pressures include 1000-100,000 pounds per square inch (psi), including 2000-50,000 psi, or 2000-25,000 psi, or 2000-20,000 psi, or 3000-5000 psi. Finally, the time that the cake is pressed may be any suitable time, e.g., 1-100 seconds, or 1-100 minute, or 1-50 minutes, or 2-25 minutes, or 1-10,000 days. The resultant hard tablet may optionally then cured, e.g., by placing outside and storing, by placing in a chamber wherein they are subjected to high levels of humidity and heat, etc. These hard tablets, optionally cured, are then used as building materials themselves or crushed to produce aggregate.

Another method of providing temperature and pressure is the use of a press, as described more fully in U.S. patent application Ser. No. 12/475,378, filed 29 May 2009. A suitable press, e.g., a platen press, may be used to provide pressure at the desired temperature (using heat supplied, e.g., by a flue gas or by other steps of the process to produce a precipitate, e.g., from an electrochemical process) for a desired time. A set of rollers may be used in similar fashion.

Another way to expose the cake to elevated temperature and pressure is by means of an extruder, e.g., a screw-type extruder, also described further in U.S. patent application Ser. No. 12/475,378, filed 29 May 2009. The barrel of the extruder can be outfitted to achieve an elevated temperature, e.g., by jacketing; this elevated temperature can be supplied by, e.g., flue gases or the like. Extrusion may be used as a means of pre-heating and drying the feedstock prior to a pressing operation. Such pressing can be performed by means of a compression mold, via rollers, via rollers with shaped indentations (which can provide virtually any shape of aggregate desired), between a belt which provides compression as it travels, or any other convenient method. Alternatively, the extruder may be used to extrude material through a die, exposing the material to pressure as it is forced through the die, and giving any desired shape. In some embodiments, the carbonate precipitate is mixed with fresh water and then placed into the feed section of a rotating screw extruder. The extruder and/or the exit die may be heated to further assist in the process. The turning of the screw conveys the material along its length and compresses it as the flite depth of the screw decreases. The screw and barrel of the extruder may further include vents in the barrel with decompression zones in the screw coincident with the barrel vent openings. Particularly in the case of a heated extruder, these vented areas allow for the release of steam from the conveyed mass, removing water from the material.

The screw conveyed material is then forced through a die section which further compresses the material and shapes it. Typical openings in the die can be circular, oval, square, rectangular, trapezoidal, etc., although any shape which the final aggregate is desired in could be made by adjusting the shape of the opening. The material exiting the die may be cut to any convenient length by any convenient method, such as by a fly knife. A typical length can be from 0.05 inches to 6 inches, although lengths outside those ranges are possible. Typical diameters can be 0.05 inches to 1.0 inches, though diameters outside of these ranges are possible.

Use of a heated die section may further assist in the formation of the product by accelerating the transition of the carbonate mineral to a hard, stable form. Heated dies may also be used in the case of binders to harden or set the binder.

Temperatures of 100° C. to 600° C. are commonly used in the heated die section. Heat for the heated die may come in whole or in part from the flue gas or other industrial gas used in the process of producing the precipitate, where the flue gas is first routed to the die to transfer heat from the hot flue gas to the die.

In yet other embodiments, the precipitate may be employed for in situ or form-in-place structure fabrication. For example, roads, paved areas, or other structures may be fabricated from the precipitate by applying a layer of precipitate, e.g., as described above, to a substrate, e.g., ground, roadbed, etc., and then hydrating the precipitate, e.g., by allowing it to be exposed to naturally applied water, such as in the form of rain, or by irrigation. Hydration solidifies the precipitate into a desired in situ or form-in-place structure, e.g., road, paved over area, etc. The process may be repeated, e.g., where thicker layers of in-situ formed structures are desired.

In some embodiments, the production of the precipitation material and the products is carried out in the same facility. In some embodiments, the precipitation material is produced in one facility and is transported to another facility to make the end product. The precipitation material may be transported in the slurry form, wet cake form, or dry powder form.

In some embodiments, the resultant dewatered precipitation material obtained from the separation station is dried at the drying station to produce a powder form of the carbonate precipitation material comprising stable or reactive vaterite or PCC. Drying may be achieved by air-drying the precipitation material. In certain embodiments, drying is achieved by freeze-drying (i.e., lyophilization), wherein the precipitation material is frozen, the surrounding pressure is reduced, and enough heat is added to allow the frozen water in the precipitation material to sublime directly into gas. In yet another embodiment, the precipitation material is spray-dried to dry the precipitation material, wherein the liquid containing the precipitation material is dried by feeding it through a hot gas (such as the gaseous waste stream from the power plant), and wherein the liquid feed is pumped through an atomizer into a main drying chamber and a hot gas is passed as a co-current or countercurrent to the atomizer direction. Depending on the particular drying protocol of the system, the drying station may include a filtration element, freeze-drying structure, spray-drying structure, etc. In some embodiments, the precipitate may be dried by fluid bed dryer. In certain embodiments, waste heat from a power plant or similar operation may be used to perform the drying step when appropriate. For example, in some embodiments, dry product is produced by the use of elevated temperature (e.g., from power plant waste heat), pressure, or a combination thereof. Following the drying of the precipitation material, the material may be then subjected to heating at elevated temperatures to remove ammonium salts as described herein.

The resultant supernatant of the precipitation process, or a slurry of precipitation material may also be processed as desired. For example, the supernatant or slurry may be returned to the carbide lime-containing aqueous solution, or to another location. In some embodiments, the supernatant may be contacted with a source of $CO_2$, as described above, to sequester additional $CO_2$. For example, in embodiments in which the supernatant is to be returned to the precipitation reactor, the supernatant may be contacted with a gaseous waste source of $CO_2$ in a manner sufficient to increase the concentration of carbonate ion present in the supernatant. As described above, contact may be conducted using any convenient protocol. In some embodiments, the supernatant has an alkaline pH, and contact with the $CO_2$ source is carried out in a manner sufficient to reduce the pH to a range between pH 5 and 9, pH 6 and 8.5, or pH 7.5 to 8.2.

In some embodiments, the composition of the invention containing precipitation material are in a storage-stable form (which may simply be dried precipitation material) may be stored above ground under exposed conditions (i.e., open to the atmosphere) without significant, if any, degradation for extended durations, e.g., 1 year or longer. As the storage-stable form of the precipitation material undergoes little if any degradation, the amount of degradation if any as measured in terms of $CO_2$ gas release from the product may not exceed 5%/year, and in certain embodiments will not exceed 1%/year. The aboveground storage-stable forms of the precipitation material are stable under a variety of different environment conditions, e.g., from temperatures ranging from −100° C. to 600° C. and humidity ranging from 0 to 100% where the conditions may be calm, windy or stormy. For example, in some embodiments, the precipitation material produced by methods of the invention is employed as a building material (e.g., a construction material for some type of man-made structure such as buildings, roads, bridges, dams, and the like), such that $CO_2$ is effectively sequestered in the built environment. Any man made structure, such as foundations, parking structures, houses, office buildings, commercial offices, governmental buildings, infrastructures (e.g., pavements; roads; bridges; overpasses; walls; footings for gates, fences and poles; and the like) is considered a part of the built environment. Mortars of the invention find use in binding construction blocks (e.g., bricks) together and filling gaps between construction blocks. Mortars can also be used to fix existing structure (e.g., to replace sections where the original mortar has become compromised or eroded), among other uses.

In certain embodiments, the powder form of the precipitation material comprising reactive vaterite is employed as cement, which transforms to aragonite and sets and hardens after combining with water.

In some embodiments, an aggregate is produced from the resultant precipitation material. In such embodiments, where the drying process produces particles of the desired size, little if any additional processing is required to produce the aggregate. In yet other embodiments, further processing of the precipitation material is performed in order to produce the desired aggregate. For example, the precipitation material may be combined with fresh water in a manner sufficient to cause the precipitate to form a solid product, where the reactive vaterite converts to aragonite. By controlling the water content of the wet material, the porosity, and eventual strength and density of the final aggregate may be controlled. Typically a wet cake may be 40-60 volume % water. For denser aggregates, the wet cake may be <50% water, for less dense cakes, the wet cake may be >50% water. After hardening, the resultant solid product may then be mechanically processed, e.g., crushed or otherwise broken up and sorted to produce aggregate of the desired characteristics, e.g., size, particular shape, etc. In these processes the setting and mechanical processing steps may be performed in a substantially continuous fashion or at separate times. In certain embodiments, large volumes of precipitate may be stored in the open environment where the precipitate is exposed to the atmosphere. For the setting step, the precipitate may be irrigated in a convenient fashion with fresh water, or allowed to be rained on naturally in order to produce the set product. The set product may then be mechanically processed as described above. Following production of the precipitate, the precipitate is processed to produce the desired aggregate. In some embodiment the precipitate may be left outdoors, where rainwater can be used as the freshwater source, to cause the meteoric water stabilization reaction to occur, hardening the precipitate to form aggregate.

In some embodiments, the carbide lime may be supplemented with divalent cations such as calcium chloride that can be obtained commercially and proton removing agents such as sodium hydroxide that may also be obtained commercially or obtained by electrochemical methods.

In some embodiments, proton-removing agents (and methods for effecting proton removal) are combined such that 1-30% of the proton-removing agent is sourced from carbide lime, 20-80% of the proton-removing agent is sourced from waste (e.g. red mud), minerals such as serpentine, or a combination thereof, and 10-50% of proton removal is effected through electrochemical methods.

As illustrated in FIG. 1, the methods of the invention produce precipitation material (in wet, slurry or dry form) comprising stable or reactive vaterite or PCC. The "compositions," "precipitation material," "carbonate precipitation material," "carbonate containing precipitation material," and "carbonate containing compositions" are used interchangeably herein. The precipitation material formed in the methods and systems of the invention after the removal of the residual ammonium salt, as described herein, comprises vaterite or PCC. The stable vaterite includes vaterite that does not transform to aragonite or calcite during and/or after dissolution-re-precipitation process. The reactive vaterite or activated vaterite includes vaterite that results in aragonite formation during and/or after dissolution-re-precipitation process. In some embodiments, the PCC formed is in vaterite form. In some embodiments, the methods described herein further include contacting the precipitation material (in dried or wet form) with water and transforming the reactive vaterite to aragonite. In some embodiments, the stable vaterite when contacted with water does not transform to aragonite and stays either in the vaterite form or transforms over a long period of time to calcite.

Figure 3:
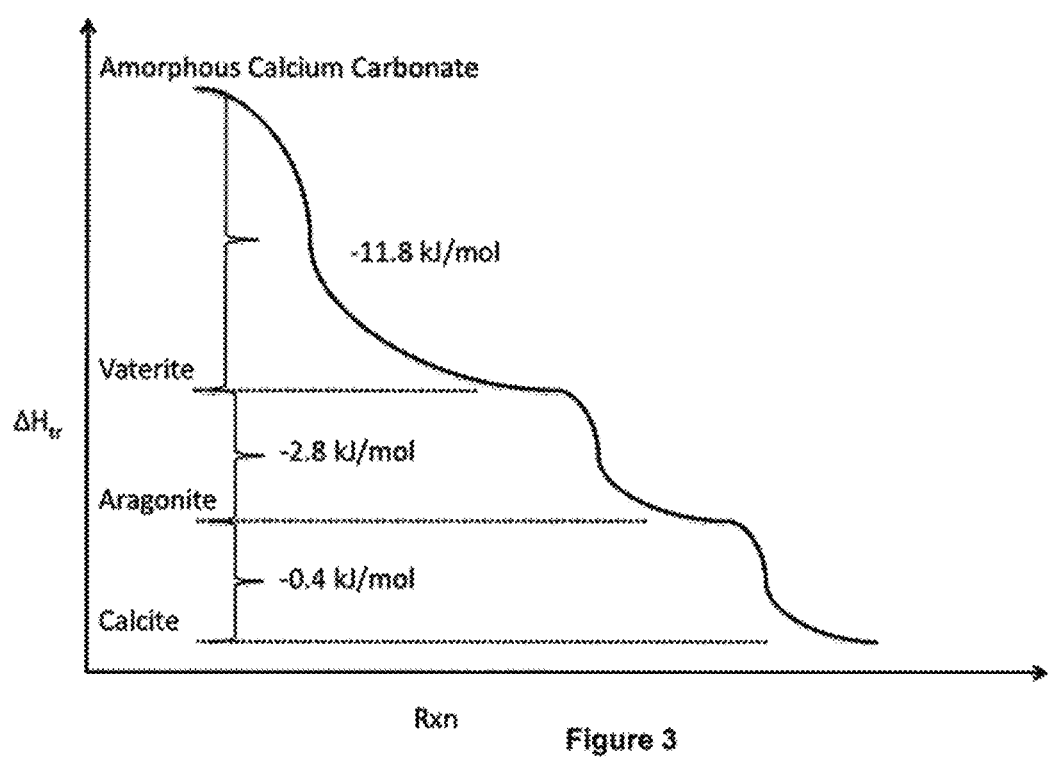
FIG. 3 illustrates a Gibbs free energy diagram of the transition from vaterite to aragonite.

Typically, upon precipitation of calcium carbonate, amorphous calcium carbonate (ACC) may initially precipitate and transform into one or more of its three more stable phases (vaterite, aragonite, or calcite). A thermodynamic driving force may exist for the transformation from unstable phases to more stable phases, as described by Ostwald in his Step Rule (Ostwald, W. *Zeitschrift fur Physikalische Chemie* 289 (1897)). For this reason, calcium carbonate phases transform in the order: ACC to vaterite, aragonite, and calcite where intermediate phases may or may not be present. During this transformation, excesses of energy are released, as exhibited by FIG. 3. This intrinsic energy may be harnessed to create a strong aggregation tendency and surface interactions that may lead to agglomeration and setting or cementing. It is to be understood that the values reported in FIG. 3 are well known in the art and may vary.

The methods of the invention produce or isolate the precipitation material in the vaterite form or in the form of PCC which may be present in vaterite, aragonite, or calcite form. The precipitation material may be in a wet form, slurry form, or a dry powder form. This precipitation material may have a stable vaterite form that does not transform readily to any other polymorph or may have a reactive vaterite form that transforms to aragonite form. The aragonite form does not convert further to more stable calcite form. The product containing the aragonite form of the precipitate shows one or more unexpected properties, including but not limited to, high compressive strength, high porosity (low density or light weight), neutral pH (useful as artificial reef described below), microstructure network, etc.

Other minor polymorph forms of calcium carbonate that may be present in the carbonate containing precipitation material in addition to vaterite include, but not limited to, amorphous calcium carbonate, aragonite, calcite, a precursor phase of vaterite, a precursor phase of aragonite, an intermediary phase that is less stable than calcite, polymorphic forms in between these polymorphs or combination thereof.

Vaterite may be present in monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite comprises nanoclusters of vaterite and the precursor form of aragonite comprises sub-micron to nanoclusters of aragonite needles. Aragonite, if present in the composition along with vaterite, may be needle shaped, columnar, or crystals of the rhombic system. Calcite, if present in the composition along with vaterite, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

The transformation between calcium carbonate polymorphs may occur via solid-state transition, may be solution mediated, or both. In some embodiments, the transformation is solution-mediated as it may require less energy than the thermally activated solid-state transition. Vaterite is metastable and the difference in thermodynamic stability of calcium carbonate polymorphs may be manifested as a difference in solubility, where the least stable phases are the most soluble (Ostwald, supra). Therefore, vaterite may dissolve readily in solution and transform favorably towards a more stable polymorph, such as aragonite. In a polymorphic system like calcium carbonate, two kinetic processes may exist simultaneously in solution: dissolution of the metastable phase and growth of the stable phase. In some embodiments, the aragonite crystals may be growing while vaterite is undergoing dissolution in the aqueous medium.

In one aspect, the reactive vaterite may be activated such that the reactive vaterite leads to aragonitic pathway and not calcite pathway during dissolution-reprecipitation process. In some embodiments, the reactive vaterite containing composition is activated in such a way that after the dissolution-reprecipitation process, aragonite formation is enhanced and calcite formation is suppressed. The activation of the reactive vaterite containing composition may result in control over the aragonite formation and crystal growth. The activation of the vaterite containing composition may be achieved by various processes. Various examples of the activation of vaterite, such as, but not limited to, nuclei activation, thermal activation, mechanical activation, chemical activation, or combination thereof, are described herein. In some embodiments, the vaterite is activated through various processes such that aragonite formation and its morphology and/or crystal growth can be controlled upon reaction of vaterite containing composition with water. The aragonite formed results in higher tensile strength and fracture tolerance to the products formed from the reactive vaterite.

In some embodiments, the reactive vaterite may be activated by mechanical means, as described herein. For example, the reactive vaterite containing compositions may be activated by creating surface defects on the vaterite composition such that aragonite formation is accelerated. In some embodiments, the activated vaterite is a ball-milled reactive vaterite or is a reactive vaterite with surface defects such that aragonite formation pathway is facilitated.

The reactive vaterite containing compositions may also be activated by providing chemical or nuclei activation to the vaterite composition. Such chemical or nuclei activation may be provided by one or more of aragonite seeds, inorganic additive, or organic additive. The aragonite seed present in the compositions provided herein may be obtained from natural or synthetic sources. The natural sources include, but not limited to, reef sand, limestone, hard skeletal material of certain fresh-water and marine invertebrate organisms, including pelecypods, gastropods, mollusk shell, and calcareous endoskeleton of warm- and cold-water corals, pearls, rocks, sediments, ore minerals (e.g., serpentine), and the like. The synthetic sources include, but not limited to, precipitated aragonite, such as formed from sodium carbonate and calcium chloride; or aragonite formed by the transformation of vaterite to aragonite, such as transformed vaterite described herein.

In some embodiments, the inorganic additive or the organic additive in the compositions provided herein can be any additive that activates reactive vaterite. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, or combination thereof. Such activation of the vaterite to form activated or reactive vaterite, are described in U.S. patent application Ser. No. 13/457,156, filed Apr. 26, 2012, which is incorporated herein by reference in its entirety.

Without being limited by any theory, it is contemplated that the activation of vaterite by ball-milling or by addition of aragonite seed, inorganic additive or organic additive or combination thereof may result in control of formation of aragonite during dissolution-reprecipitation process of the activated reactive vaterite including control of properties, such as, but not limited to, polymorph, morphology, particle size, cross-linking, agglomeration, coagulation, aggregation, sedimentation, crystallography, inhibiting growth along a certain face of a crystal, allowing growth along a certain face of a crystal, or combination thereof. For example, the aragonite seed, inorganic additive or organic additive may selectively target the morphology of aragonite, inhibit calcite growth and promote the formation of aragonite that may generally not be favorable kinetically.

In some embodiments, one or more inorganic additives may be added to facilitate transformation of vaterite to aragonite. The one or more additives may be added during any step of the process. For example, the one or more additives may be added during purification of carbide lime solution or slag, during contact of the purified carbide lime solution or slag with carbon dioxide, after contact of the purified carbide lime or slag solution with carbon dioxide, during precipitation of the precipitation material, after precipitation of the precipitation material in the slurry, in the slurry after the dewatering of the precipitation material, in the powder after the drying of the slurry, in the aqueous solution to be mixed with the powder precipitation material, or in the slurry made from the powdered precipitation material with water, or any combination thereof. In some embodiments, the water used in the process of making the carbonate precipitation material may already contain the one or more additives or the one or more additive ions. For example, if sea water is used in the process, then the additive ion may already be present in the sea water.

In some embodiments, in the foregoing methods, the amount of the one or more additives added during the process is more than 0.1% by weight, or more than 0.5% by weight, or more than 1% by weight, or more than 1.5% by weight, or more than 1.6% by weight, or more than 1.7% by weight, or more than 1.8% by weight, or more than 1.9% by weight, or more than 2% by weight, or more than 2.1% by weight, or more than 2.2% by weight, or more than 2.3% by weight, or more than 2.4% by weight, or more than 2.5% by weight, or more than 2.6% by weight, or more than 2.7% by weight, or more than 2.8% by weight, or more than 2.9% by weight, or more than 3% by weight, or more than 3.5% by weight, or more than 4% by weight, or more than 4.5% by weight, or more than 5% by weight, or between 0.5-5% by weight, or between 0.5-4% by weight, or between 0.5-3% by weight, or 0.5-2% by weight, or 0.5-1% by weight, or 1-3% by weight, or 1-2.5% by weight, or 1-2% by weight, or 1.5-2.5% by weight, or 2-3% by weight, or 2.5-3% by weight, or 0.5% by weight, or 1% by weight, or 1.5% by weight, or 2% by weight, or 2.5% by weight, or 3% by weight, or 3.5% by weight, or 4% by weight, or 4.5% by weight, or 5% by weight. In some embodiments, in the foregoing methods, the amount of the one or more additives added during the process is between 0.5-3% by weight or between 1.5-2.5% by weight.

In some embodiments, the compositions of the invention are synthetic compositions and are not naturally occurring. In some embodiments, the composition of the invention is in a powder form. In some embodiments, the composition of the invention is in a dry powder form. In some embodiments, the composition of the invention is disordered or is not in an ordered array or is in the powdered form. In still some embodiments, the composition of the invention is in a partially or wholly hydrated form. In still some embodiments, the composition of the invention is in saltwater or fresh water. In still some embodiments, the composition of the invention is in water containing sodium chloride. In still some embodiments, the composition of the invention is in water containing alkaline earth metal ions, such as, but are not limited to, calcium, magnesium, etc. In some embodiments, the compositions of the invention are non-medical or are not for medical procedures.

The products made from the compositions provided herein show one or more properties, such as, high compressive strength, high durability, high porosity (light weight), high flexural strength, and less maintenance costs. In some embodiments, the compositions or the precipitation material upon combination with water, setting, and hardening, have a compressive strength of at least 3 MPa (megapascal), or at least 7 MPa, or at least 10 MPa or in some embodiments, between 3-30 MPa, or between 14-80 MPa or 14-35 MPa.

In some embodiments of the foregoing aspects and embodiments, the composition or the precipitation material includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 20% w/w to 99% w/w vaterite; or from 20% w/w to 95% w/w vaterite; or from 20% w/w to 90% w/w vaterite; or from 20% w/w to 75% w/w vaterite; or from 20% w/w to 50% w/w vaterite; or from 30% w/w to 99% w/w vaterite; or from 30% w/w to 95% w/w vaterite; or from 30% w/w to 90% w/w vaterite; or from 30% w/w to 75% w/w vaterite; or from 30% w/w to 50% w/w vaterite; or from 40% w/w to 99% w/w vaterite; or from 40% w/w to 95% w/w vaterite; or from 40% w/w to 90% w/w vaterite; or from 40% w/w to 75% w/w vaterite; or from 50% w/w to 99% w/w vaterite; or from 50% w/w to 95% w/w vaterite; or from 50% w/w to 90% w/w vaterite; or from 50% w/w to 75% w/w vaterite; or from 60% w/w to 99% w/w vaterite; or from 60% w/w to 95% w/w vaterite; or from 60% w/w to 90% w/w vaterite; or from 70% w/w to 99% w/w vaterite; or from 70% w/w to 95% w/w vaterite; or from 70% w/w to 90% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite. The vatreite may be stable vaterite or reactive vaterite or PCC.

In some embodiments of the foregoing aspects and the foregoing embodiments, the precipitation material comprising vaterite after combination with water, setting, and hardening (i.e. transformation to aragonite) or the stable vaterite mixed with cement and water and after setting and hardening, has a compressive strength of at least 3 MPa; at least 7 MPa; at least 14 MPa; or at least 16 MPa; or at least 18 MPa; or at least 20 MPa; or at least 25 MPa; or at least 30 MPa; or at least 35 MPa; or at least 40 MPa; or at least 45 MPa; or at least 50 MPa; or at least 55 MPa; or at least 60 MPa; or at least 65 MPa; or at least 70 MPa; or at least 75 MPa; or at least 80 MPa; or at least 85 MPa; or at least 90 MPa; or at least 95 MPa; or at least 100 MPa; or from 3-50 MPa; or from 3-25 MPa; or from 3-15 MPa; or from 3-10 MPa; or from 14-25 MPa; or from 14-100 MPa; or from 14-80 MPa; or from 14-75 MPa; or from 14-50 MPa; or from 14-25 MPa; or from 17-35 MPa; or from 17-25 MPa; or from 20-100 MPa; or from 20-75 MPa; or from 20-50 MPa; or from 20-40 MPa; or from 30-90 MPa; or from 30-75 MPa; or from 30-60 MPa; or from 40-90 MPa; or from 40-75 MPa; or from 50-90 MPa; or from 50-75 MPa; or from 60-90 MPa; or from 60-75 MPa; or from 70-90 MPa; or from 70-80 MPa; or from 70-75 MPa; or from 80-100 MPa; or from 90-100 MPa; or from 90-95 MPa; or 14 MPa; or 3 MPa; or 7 MPa; or 16 MPa; or 18 MPa; or 20 MPa; or 25 MPa; or 30 MPa; or 35 MPa; or 40 MPa; or 45 MPa. For example, in some embodiments of the foregoing aspects and the foregoing embodiments, the composition after setting, and hardening has a compressive strength of 3 MPa to 25 MPa; or 14 MPa to 40 MPa; or 17 MPa to 40 MPa; or 20 MPa to 40 MPa; or 30 MPa to 40 MPa; or 35 MPa to 40 MPa. In some embodiments, the compressive strengths described herein are the compressive strengths after 1 day, or 3 days, or 7 days, or 28 days, or 56 days, or longer.

The calcium carbonate in the compositions of the invention contains carbon dioxide from any number of sources including, but not limited to, an industrial waste stream including flue gas from combustion; a flue gas from a chemical processing plant; a flue gas from a plant that produces $CO_2$ as a byproduct; or combination thereof. In some embodiments, the carbon dioxide sequestered into the calcium carbonate in the compositions of the invention, originates from the burning of fossil fuel, and thus some (e.g., at least 10, 50, 60, 70, 80, 90, 95%) or substantially all (e.g., at least 99, 99.5, or 99.9%) of the carbon in the carbonates is of fossil fuel origin, i.e., of plant origin.

Typically, carbon of plant origin has a different ratio of stable isotopes ($^{13}C$ and $^{12}C$) than carbon of inorganic origin. The plants from which fossil fuels are derived preferentially utilize $^{12}C$ over $^{13}C$, thus fractionating the carbon isotopes so that the value of their ratio differs from that in the atmosphere in general. This value, when compared to a standard value (PeeDee Belemnite, or PDB, standard), is termed the carbon isotopic fractionation ($\delta^{13}C$) value. Typically, $\delta^{13}C$ values for coal are in the range −30 to −20‰; $\delta^{13}C$ values for methane may be as low as −20‰ to −40‰ or even −40‰ to −80‰; $\delta^{13}C$ values for atmospheric $CO_2$ are −10‰ to −7‰; for limestone +3‰ to −3‰; and for marine bicarbonate, 0‰.

In some embodiments, the carbon in the vaterite and/or other polymorphs in the composition of the invention, has a $\delta^{13}C$ of less than −12‰, −13‰, −14‰, −15‰, −20‰, or less than −25‰, or less than −30‰, or less than −35‰, or less than −45‰, or less than −50‰, as described in further detail herein. In some embodiments, the composition of the invention includes a $CO_2$-sequestering additive including carbonates, such as, vaterite, bicarbonates, or a combination thereof, in which the carbonates, bicarbonates, or a combination thereof have a carbon isotopic fractionation ($\delta^{13}C$) value less than −12‰.

In some embodiments of the foregoing aspects and the foregoing embodiments, the composition has a $\delta^{13}C$ of less than −12‰; or less than −15‰; or less than −20‰; or less than −25‰; or less than −30‰; or from −12‰ to −50‰; or from −15‰ to −70‰; or from −20‰ to −60‰; or from −30‰ to −80‰; or −12‰; or −13‰; or −14‰; or −15‰; or −16‰; or −17‰; or −18‰; or −19‰; or −20‰; or −21‰; or −22‰; or −25‰; or −30‰; or −40‰; or −50‰; or −60‰; or −70‰; or −80‰; or −90‰; or −100‰.

In some embodiments, the precipitation material comprising vaterite is a particulate composition with an average particle size of 0.1-100 microns. The average particle size (or average particle diameter) may be determined using any conventional particle size determination method, such as, but not limited to, multi-detector laser scattering or laser diffraction or sieving. In certain embodiments, unimodel or multimodal, e.g., bimodal or other, distributions are present. Bimodal distributions may allow the surface area to be minimized, thus allowing a lower liquids/solids mass ratio when composition is mixed with water yet providing smaller reactive particles for early reaction. In some embodiments, the composition provided herein is a particulate composition with an average particle size of 0.1-1000 microns; or 0.1-

500 microns; or 0.1-100 microns; or 0.1-50 microns; or 0.1-20 microns; or 0.1-10 microns; or 0.1-5 microns; or 1-50 microns; or 1-25 microns; or 1-20 microns; or 1-10 microns; or 1-5 microns; or 5-70 microns; or 5-50 microns; or 5-20 microns; or 5-10 microns; or 10-100 microns; or 10-50 microns; or 10-20 microns; or 10-15 microns; or 15-50 microns; or 15-30 microns; or 15-20 microns; or 20-50 microns; or 20-30 microns; or 30-50 microns; or 40-50 microns; or 50-100 microns; or 50-60 microns; or 60-100 microns; or 60-70 microns; or 70-100 microns; or 70-80 microns; or 80-100 microns; or 80-90 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition provided herein is a particulate composition with an average particle size of 0.1-20 micron; or 0.1-15 micron; or 0.1-10 micron; or 0.1-8 micron; or 0.1-5 micron; or 1-25 micron; or 1-20 micron; or 1-15 micron; or 1-10 micron; or 1-5 micron; or 5-20 micron; or 5-10 micron. In some embodiments, the carbonate additive or carbonate composition includes one or more different sizes of the particles in the composition. In some embodiments, the composition includes two or more, or three or more, or four or more, or five or more, or ten or more, or 20 or more, or 3-20, or 4-10 different sizes of the particles in the composition. For example, the composition may include two or more, or three or more, or between 3-20 particles ranging from 0.1-10 micron, 10-50 micron, 50-100 micron, 100-200 micron, 200-500 micron, 500-1000 micron, and/or submicron sizes of the particles. In some embodiments, the PCC in the precipitation material may have average particle size below 0.1 micron, such as between 0.001 micron to 1 micron or more. In some embodiments, the PCC may be in nanometer particle size.

In some embodiments, the composition of the invention may further include Ordinary Portland Cement (OPC) or Portland cement clinker. The amount of Portland cement component may vary and range from 10 to 95% w/w; or 10 to 90% w/w; or 10 to 80% w/w; or 10 to 70% w/w; or 10 to 60% w/w; or 10 to 50% w/w; or 10 to 40% w/w; or 10 to 30% w/w; or 10 to 20% w/w; or 20 to 90% w/w; or 20 to 80% w/w; or 20 to 70% w/w; or 20 to 60% w/w; or 20 to 50% w/w; or 20 to 40% w/w; or 20 to 30% w/w; or 30 to 90% w/w; or 30 to 80% w/w; or 30 to 70% w/w; or 30 to 60% w/w; or 30 to 50% w/w; or 30 to 40% w/w; or 40 to 90% w/w; or 40 to 80% w/w; or 40 to 70% w/w; or 40 to 60% w/w; or 40 to 50% w/w; or 50 to 90% w/w; or 50 to 80% w/w; or 50 to 70% w/w; or 50 to 60% w/w; or 60 to 90% w/w; or 60 to 80% w/w; or 60 to 70% w/w; or 70 to 90% w/w; or 70 to 80% w/w. For example, the composition may include a blend of 75% OPC and 25% composition of the invention; or 80% OPC and 20% composition of the invention; or 85% OPC and 15% composition of the invention; or 90% OPC and 10% composition of the invention; or 95% OPC and 5% composition of the invention.

In certain embodiments, the composition may further include an aggregate. Aggregate may be included in the composition to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof. As such, the term "aggregate" is used broadly to refer to a number of different types of both coarse and fine particulate material, including, but are not limited to, sand, gravel, crushed stone, slag, and recycled concrete. The amount and nature of the aggregate may vary widely. In some embodiments, the amount of aggregate may range from 25 to 80%, such as 40 to 70% and including 50 to 70% w/w of the total composition made up of both the composition and the aggregate.

In some embodiments, the composition of the invention, as prepared by the methods described above, sets and hardens after treatment with the aqueous medium under one or more suitable conditions. The aqueous medium includes, but is not limited to, fresh water optionally containing additives or brine. In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-80° C.; or 0-60° C.; or 0-40° C.; or 25-100° C.; or 25-75° C.; or 25-50° C.; or 37-100° C.; or 37-60° C.; or 40-100° C.; or 40-60° C.; or 50-100° C.; or 50-80° C.; or 60-100° C.; or 60-80° C.; or 80-100° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

In some embodiments, the ratio of the aqueous medium to the dry components or to the composition of the invention (aqueous medium:dry components or aqueous medium:precipitation material of the invention) is 0.1-10; or 0.1-8; or 0.1-6; or 0.1-4; or 0.1-2; or 0.1-1; or 0.2-10; or 0.2-8; or 0.2-6; or 0.2-4; or 0.2-2; or 0.2-1; or 0.3-10; or 0.3-8; or 0.3-6; or 0.3-4; or 0.3-2; or 0.3-1; or 0.4-10; or 0.4-8; or 0.4-6; or 0.4-4; or 0.4-2; or 0.4-1; or 0.5-10; or 0.5-8; or 0.5-6; or 0.5-4; or 0.5-2; or 0.5-1; or 0.6-10; or 0.6-8; or 0.6-6; or 0.6-4; or 0.6-2; or 0.6-1; or 0.8-10; or 0.8-8; or 0.8-6; or 0.8-4; or 0.8-2; or 0.8-1; or 1-10; or 1-8; or 1-6; or 1-4; or 1-2; or 1:1; or 2:1; or 3:1.

During the mixing of the composition with the aqueous medium, the precipitate may be subjected to high shear mixer. After mixing, the precipitate may be dewatered again and placed in pre-formed molds to make formed building materials or may be used to make formed building materials using the processes well known in the art or as described herein. Alternatively, the precipitate may be mixed with water and may be allowed to set. The precipitate may set over a period of days and may be then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The precipitate may be subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 30%, or 40%, or 50%, or 60% humidity.

The product produced by the methods described herein may be an aggregate or building material or a pre-cast material or a formed building material. In some embodiments, the product produced by the methods described herein includes non-cementitous materials such as paper, paint, PVC etc. In some embodiments, the product produced by the methods described herein includes artificial reefs. These products have been described herein.

In some embodiments, the precipitation material in wet or dried form, may be mixed with one or more admixtures to impart one or more properties to the product including, but not limited to, strength, flexural strength, compressive strength, porosity, thermal conductivity, etc. The amount of admixture that is employed may vary depending on the nature of the admixture. In some embodiments, the amount of the one or more admixtures range from 1 to 50% w/w, such as 1-30% w/w, or 1-25% w/w, or 1-20% w/w, or 2 to 10% w/w. Examples of the admixtures include, but not limited to, set accelerators, set retarders, air-entraining agents, foaming agents, defoamers, alkali-reactivity reducers, bonding admixtures, dispersants, coloring admixtures, corrosion inhibitors, damp-proofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, reinforced material such as fibers, and any other admixture. When using an admixture, the composition or the carbonate precipitation material, to which the admixture raw materials are introduced, is mixed for sufficient time to cause the admixture raw materials to be dispersed relatively uniformly throughout the composition.

Set accelerators may be used to accelerate the setting and early strength development of cement. Examples of set accelerators that may be used include, but are not limited to, POZZOLITH® NC534, non-chloride type set accelerator and/or RHEOCRETE®CNI calcium nitrite-based corrosion inhibitor, both sold under the above trademarks by BASF Admixtures Inc. of Cleveland, Ohio. Set retarding, also known as delayed-setting or hydration control, admixtures are used to retard, delay, or slow the rate of setting of cement. Most set retarders may also act as low level water reducers and can also be used to entrain some air into product. An example of a retarder is DELVO® by BASF Admixtures Inc. of Cleveland, Ohio. The air entrainer includes any substance that will entrain air in the compositions. Some air entrainers can also reduce the surface tension of a composition at low concentration. Air-entraining admixtures are used to purposely entrain microscopic air bubbles into cement. Air entrainment may increase the workability of the mix while eliminating or reducing segregation and bleeding. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Examples of air entrainers that can be utilized in the admixture system include, but are not limited to MB AE 90, MB VR and MICRO AIR®, all available from BASF Admixtures Inc. of Cleveland, Ohio.

In some embodiments, the precipitation material is mixed with foaming agent. The foaming agents incorporate large quantities of air voids/porosity and facilitate reduction of the material's density. Examples of foaming agents include, but not limited to, soap, detergent (alkyl ether sulfate), Milli-foam™ (alkyl ether sulfate), Cedepal™ (ammonium alkyl ethoxy sulfate), Witcolate™ 12760, and the like.

Also of interest as admixtures are defoamers. Defoamers are used to decrease the air content in the cementitious composition. Also of interest as admixtures are dispersants. The dispersant includes, but is not limited to, polycarboxylate dispersants, with or without polyether units. The term dispersant is also meant to include those chemicals that also function as a plasticizer, water reducer such as a high range water reducer, fluidizer, antiflocculating agent, or superplasticizer for compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant (Cognis Inc., Cincinnati, Ohio), polyaspartates, or oligomeric dispersants. Polycarboxylate dispersants can be used, by which is meant a dispersant having a carbon backbone with pendant side chains, wherein at least a portion of the side chains are attached to the backbone through a carboxyl group or an ether group.

Natural and synthetic admixtures may be used to color the product for aesthetic and safety reasons. These coloring admixtures may be composed of pigments and include carbon black, iron oxide, phthalocyanine, umber, chromium oxide, titanium oxide, cobalt blue, and organic coloring agents. Also of interest as admixtures are corrosion inhibitors. Corrosion inhibitors may serve to protect embedded reinforcing steel from corrosion. The materials commonly used to inhibit corrosion are calcium nitrite, sodium nitrite, sodium benzoate, certain phosphates or fluorosilicates, fluoroaluminites, amines and related chemicals. Also of interest are damp-proofing admixtures. Damp-proofing admixtures reduce the permeability of the product that has low cement contents, high water-cement ratios, or a deficiency of fines in the aggregate. These admixtures retard moisture penetration into dry products and include certain soaps, stearates, and petroleum products. Also of interest are gas former admixtures. Gas formers, or gas-forming agents, are sometimes added to the mix to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers. Also of interest are permeability reducers. Permeability reducers may be used to reduce the rate at which water under pressure is transmitted through the mix. Silica fume, fly ash, ground slag, natural pozzolans, water reducers, and latex may be employed to decrease the permeability of the mix.

Also of interest are rheology modifying agent admixtures. Rheology modifying agents may be used to increase the viscosity of the compositions. Suitable examples of rheology modifier include firmed silica, colloidal silica, hydroxyethyl cellulose, starch, hydroxypropyl cellulose, fly ash (as defined in ASTM C618), mineral oils (such as light naphthenic), clay such as hectorite clay, polyoxyalkylenes, polysaccharides, natural gums, or mixtures thereof. Some of the mineral extenders such as, but not limited to, sepiolite clay are rheology modifying agents.

Also of interest are shrinkage compensation admixtures. TETRAGUARD® is an example of a shrinkage reducing agent and is available from BASF Admixtures Inc. of Cleveland, Ohio. Bacterial and fungal growth on or in hardened product may be partially controlled through the use of fungicidal and germicidal admixtures. The materials for these purposes include, but are not limited to, polyhalogenated phenols, dialdrin emulsions, and copper compounds. Also of interest in some embodiments is workability improving admixtures. Entrained air, which acts like a lubricant, can be used as a workability improving agent. Other workability agents are water reducers and certain finely divided admixtures.

In some embodiments, the compositions of the invention are employed with reinforced material such as fibers, e.g., where fiber-reinforced product is desirable. Fibers can be made of zirconia containing materials, aluminum, glass, steel, carbon, ceramic, grass, bamboo, wood, fiberglass, or synthetic materials, e.g., polypropylene, polycarbonate, polyvinyl chloride, polyvinyl alcohol, nylon, polyethylene, polyester, rayon, high-strength aramid, (i.e. Kevlar®), or mixtures thereof. The reinforced material is described in U.S. patent application Ser. No. 13/560,246, filed Jul. 27, 2012, which is incorporated herein in its entirety in the present disclosure.

The components of the compositions of the invention can be combined using any suitable protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

II. Systems

In one aspect, there is provided a system comprising a processor configured for processing the treatment or solvation of calcium carbide residue or of the carbide lime or slag with a weak base and ammonia to make an aqueous solution comprising calcium salt and solids; a reactor configured to treat the aqueous solution comprising calcium salt and optionally solids with carbon dioxide from an industrial process to make a precipitation material comprising vaterite or PCC and a supernatant comprising aqueous solution of the weak base; and a recovering system to recover the weak base from the aqueous solution to recycle back to the processor. The recovering system is the system configured to carry out thermal decomposition, reverse osmosis, multi-stage flash, multi-effect distillation, vapor recompression, distillation, and combinations thereof.

The methods and systems of the invention may be carried out at land (e.g., at a location where a suitable carbide lime or slag-containing source is present, or is easily and economically transported in), at sea, or in the ocean. In some embodiments, the methods and systems of the invention are carried out near the acetylene production plant that has a surplus of carbide lime. In some embodiments, the methods and systems of the invention are carried out near the landfill that has a surplus of carbide lime. In some embodiments, the methods and systems of the invention are integrated with the acetylene production plant such that the carbide lime obtained from acetylene production is used simultaneously in the production of the carbonate containing precipitation material comprising stable or reactive vaterite or PCC.

Aspects of the invention include systems, including processing plants or factories, for practicing the methods as described herein. Systems of the invention may have any configuration that enables practice of the particular production method of interest. In some embodiments, the system is configured to produce the precipitation material in excess of 1 ton per day. In some embodiments, the system is configured to produce the precipitation material in excess of 10 tons per day. In some embodiments, the system is configured to produce the precipitation material in excess of 100 tons per day. In some embodiments, the system is configured to produce the precipitation material in excess of 1000 tons per day. In some embodiments, the system is configured to produce carbonate-containing precipitation material in excess of 10,000 tons per day.

In certain embodiments, the systems include a source of carbide lime or a source of carbide lime-containing aqueous solution or a source for slag such as a structure having an input for the aqueous solution. For example, the systems may include a pipeline or analogous feed of carbide lime-containing aqueous solution, wherein the aqueous solution is brine, seawater, or freshwater. The system further includes a source of $CO_2$, as well as components for combining these sources with water (optionally an aqueous solution such as water, brine or seawater) before the precipitation reactor or in the precipitation reactor. As such, the precipitation system may include a separate source of $CO_2$, for example, wherein the system is configured to be employed in embodiments where the aqueous solution of carbide lime and/or supernatant is contacted with a carbon dioxide source at some time during the process. This source may be any of those described herein (e.g., a waste feed from an industrial power plant), gas contact being effected by, for example, a gas-liquid contactor such as that described in U.S. Provisional Patent Application 61/178,475, filed 14 May 2009, which is hereby incorporated by reference in its entirety. In some embodiments, the gas-liquid contactor is configured to contact enough $CO_2$ to produce precipitation material in excess of 1, 10, 100, 1,000, or 10,000 tons per day.

The systems further include a precipitation reactor that subjects the water introduced to the precipitation reactor to carbonate compound precipitation conditions (as described herein) and produces precipitation material and supernatant. In some embodiments, the precipitation reactor is configured to hold water sufficient to produce precipitation material in excess of 1, 10, 100, 1,000, or 10,000 tons per day. The precipitation reactor may also be configured to include any of a number of different elements such as temperature modulation elements (e.g., configured to heat the water to a desired temperature), chemical additive elements (e.g., configured for introducing additives etc. into the precipitation reaction mixture), electrolysis elements (e.g., cathodes, anodes, etc.), computer automation, and the like.

A gaseous waste stream may be provided from an industrial plant to the site of precipitation in any convenient manner that conveys the gaseous waste stream from the industrial plant to the precipitation plant. In some embodiments, the gaseous waste stream is provided with a gas conveyer (e.g., a duct) that runs from a site of the industrial plant (e.g., an industrial plant flue) to one or more locations of the precipitation site. The source of the gaseous waste stream may be a distal location relative to the site of precipitation such that the source of the gaseous waste stream is a location that is 1 mile or more, such as 10 miles or more, including 100 miles or more, from the precipitation location. For example, the gaseous waste stream may have been transported to the site of precipitation from a remote industrial plant via a $CO_2$ gas conveyance system (e.g., a pipeline). The industrial plant generated $CO_2$ containing gas may or may not be processed (e.g., remove other components) before it reaches the precipitation site (i.e., the site in which precipitation and/or production of aggregate takes place). In yet other instances, the gaseous waste stream source is proximal to the precipitation site. For example, the precipitation site is integrated with the gaseous waste stream source, such as a power plant that integrates a precipitation reactor for precipitation of precipitation material that may be used to produce the products.

As indicated above, the gaseous waste stream may be one that is obtained from a flue or analogous structure of an industrial plant. In these embodiments, a line (e.g., duct) is connected to the flue so that gas leaves the flue through the line and is conveyed to the appropriate location(s) of a precipitation system. Depending upon the particular configuration of the precipitation system at the point at which the gaseous waste stream is employed, the location of the source from which the gaseous waste stream is obtained may vary (e.g., to provide a waste stream that has the appropriate or desired temperature). As such, in certain embodiments, where a gaseous waste stream having a temperature ranging for 0° C. to 1800° C., such as 60° C. to 700° C., is desired, the flue gas may be obtained at the exit point of the boiler or gas turbine, the kiln, or at any point of the power plant or stack, that provides the desired temperature. Where desired, the flue gas is maintained at a temperature above the dew point (e.g., 125° C.) in order to avoid condensation and related complications. If it is not possible to maintain the temperature above the dew point, steps may be taken to reduce the adverse impact of condensation (e.g., employing ducting that is stainless steel, fluorocarbon (such as poly (tetrafluoroethylene) lined, diluted with water, and pH controlled, etc.) so the duct does not rapidly deteriorate.

Where the saltwater source that is processed by the system to produce the carbonate compound composition is seawater, the input is in fluid communication with a source of sea water, e.g., such as where the input is a pipeline or feed from ocean water to a land based system or a inlet port in the hull of ship, e.g., where the system is part of a ship, e.g., in an ocean based system.

The methods and systems of the invention may also include one or more detectors configured for monitoring the source of aqueous medium or the source of carbon dioxide (not illustrated in figures). Monitoring may include, but is not limited to, collecting data about the pressure, temperature and composition of the water or the carbon dioxide gas. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyers, etc.), and devices for determining chemical makeup of the water or the carbon dioxide gas (e.g, IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, detectors may also include a computer interface which is configured to provide a user with the collected data about the aqueous medium, divalent cation solution, and/or the carbon dioxide gas. For example, a detector may determine the internal pressure of the aqueous medium, divalent cation solution, and/or the carbon dioxide gas and the computer interface may provide a summary of the changes in the internal pressure within the aqueous medium, divalent cation solution, and/or the carbon dioxide gas over time. In some embodiments, the summary may be stored as a computer readable data file or may be printed out as a user readable document.

In some embodiments, the detector may be a monitoring device such that it can collect real-time data (e.g., internal pressure, temperature, etc.) about the aqueous medium, divalent cation solution, and/or the carbon dioxide gas. In other embodiments, the detector may be one or more detectors configured to determine the parameters of the aqueous medium, divalent cation solution, and/or the carbon dioxide gas at regular intervals, e.g., determining the composition every 1 minute, every 5 minutes, every 10 minutes, every 30 minutes, every 60 minutes, every 100 minutes, every 200 minutes, every 500 minutes, or some other interval.

The system further includes a liquid-separator for separating carbonate-containing precipitation material from the reaction mixture from which it was produced. As detailed in U.S. Provisional Patent Application 61/170,086, filed 16 Apr. 2009, which is herein incorporate by reference, liquid-solid separators such as Epuramat's Extrem-Separator ("ExSep") liquid-solid separator, Xerox PARC's spiral concentrator, or a modification of either of Epuramat's ExSep or Xerox PARC's spiral concentrator, is useful for separation of the precipitation material from the precipitation reaction mixture. In certain embodiments, the separator is a drying station for drying the precipitated carbonate mineral composition produced by the carbonate mineral precipitation station. Depending on the particular drying protocol of the system, the drying station may include a filtration element, freeze drying structure, spray drying structure, etc., as described herein.

In certain embodiments, the system may further include a station for preparing a building material, such as cement or aggregate, from the precipitate. See e.g., U.S. patent application Ser. No. 12/126,776 titled "Hydraulic Cements Comprising Carbonate Compounds Compositions" and filed on May 23, 2008 and U.S. Provisional Patent Application Ser. No. 61/056,972 titled "CO2 Sequestering Aggregate, and Methods of Making and Using the Same," filed on May 23, 2008, the disclosures of which applications are herein incorporated by reference. Other materials such as formed building materials and/or non-cementitious materials may also be formed from the precipitate and appropriate station may be used for preparing the same.

As indicated above, the system may be present on land or sea. For example, the system may be land-based system that is in a coastal region, e.g., close to a source of seawater, or even an interior location, where water is piped into the system from a salt-water source, e.g., ocean. Alternatively, the system is a water based system, i.e., a system that is present on or in water. Such a system may be present on a boat, ocean based platform etc., as desired.

For example, coal is burned in steam boiler, which produces steam to power a turbine generator and produce electricity. The burning of the coal produces flue gas, which contains $CO_2$, SOx, NOx, Hg, etc. as well as fly ash. In this embodiment, the coal utilized may be a high-sulfur sub-bituminous coal, which is inexpensive to obtain but which produces larger quantities of SOx and other pollutants. The burning of the coal also produces bottom ash, which may be sent to a landfill or used as a low-value aggregate. The flue gas may or may not run through a separation device, generally an electrostatic precipitator, which may result in removal of fly ash from the flue gas. Depending on the manner of combustion and the type of coal, fly ash may find beneficial use in concrete or is land filled. Flue gas, carbide lime (after purification with weak base), water and in some embodiments, optionally additional alkali source and/or proton removing agent are charged into reactor, wherein a carbonate mineral precipitation process takes place, producing slurry.

Slurry is pumped via pump to drying system, which in some embodiments includes a filtration step followed by spray drying. The water separated from the drying system is discharged or is recirculated to the reactor. The resultant solid or powder from drying system is utilized as cement or aggregate to produce building materials, effectively sequestering the $CO_2$, SOx, and, in some embodiments, other pollutants such as mercury and/or NOx into the built environment. The solid or powder may also be used as a PCC filler in non-cementitious products such as paper, plastic, paint etc. The solid or powder may also be used in forming formed building materials, such as drywall, cement boards, etc.

In some embodiments, the systems of the invention may include a control station, configured to control the amount of the carbon dioxide and/or the amount of carbide lime conveyed to the precipitator or the charger; the amount of the precipitate conveyed to the separator; the amount of the precipitate conveyed to the drying station; and/or the amount of the precipitate conveyed to the refining station. A control station may include a set of valves or multi-valve systems which are manually, mechanically or digitally controlled, or may employ any other convenient flow regulator protocol. In some instances, the control station may include a computer interface, (where regulation is computer-assisted or is entirely controlled by computer) configured to provide a user with input and output parameters to control the amount, as described above.

III. Products

The invention provides methods and systems for utilizing carbide lime or slag to produce carbonate-containing compositions from $CO_2$, wherein the $CO_2$ may be from a variety of different sources (e.g., an industrial waste by-product such as a gaseous waste stream produced by a power plant during the combustion of carbon-based fuel). As such, the invention provides for removing or separating $CO_2$ from a gaseous waste source of $CO_2$, and fixing the $CO_2$ into a non-gaseous, storage-stable form (e.g., materials for the construction of structures such as buildings and infrastructure, as well as the structures themselves or formed building materials such as drywall, or non-cementitious materials such as paper, paint, plastic, etc. or artificial reefs) such that the $CO_2$ cannot escape into the atmosphere.

Building Material

The "building material" used herein includes material used in construction. In one aspect, there is provided a structure or a building material comprising the set and hardened form of the carbonate precipitation material e.g. where the reactive vaterite has converted to aragonite or PCC that sets and hardens. The product containing the aragonite form of the precipitate shows one or more unexpected properties, including but not limited to, high compressive strength, high porosity (low density or light weight), neutral pH (useful as artificial reef described below), microstructure network, etc.

Examples of such structures or the building materials include, but are not limited to, building, driveway, foundation, kitchen slab, furniture, pavement, road, bridges, motorway, overpass, parking structure, brick, block, wall, footing for a gate, fence, or pole, and combination thereof. Since these structures or building materials comprise and/or are produced from the compositions of the invention, they may include markers or components that identify them as being obtained from carbon dioxide of fossil fuel origin (e.g., $\delta^{13}C$ vales) and/or being obtained from water having trace amounts of various elements present in the initial salt water source, and/or being obtained from carbide lime, as described herein. For example, where the mineral component of the cement component of the concrete is one that has been produced from carbide lime, the set product may contain a carbide lime marker profile of different elements in identifying amounts, such as magnesium, potassium, sulfur, boron, sodium, and chloride, etc.

Formed Building Material

The "formed building material" used herein includes materials shaped (e.g., molded, cast, cut, or otherwise produced) into structures with defined physical shape. The formed building material may be a pre-cast building material, such as, a pre-cast cement or concrete product. The formed building materials and the methods of making and using the formed building materials are described in U.S. application Ser. No. 12/571,398, filed Sep. 30, 2009, which is incorporated herein by reference in its entirety. The formed building materials of the invention may vary greatly and include materials shaped (e.g., molded, cast, cut, or otherwise produced) into structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that the composition of the invention is employed in making such materials.

In one aspect, there is provided a formed building material comprising the set and hardened form of the composition or the precipitation material of the invention where the reactive vaterite has converted to aragonite, or the PCC that has set and hardened described herein.

In some embodiments, the formed building materials made from the composition of the invention have a compressive strength or the flexural strength of at least 3 MPa, at least 10 MPa, or at least 14 MPa, or between 3-30 MPa, or between about 14-100 MPa, or between about 14-45 MPa; or the compressive strength of the composition of the invention after setting, and hardening, as described herein. In some embodiments, the formed building materials made from the composition of the invention have a $\delta^{13}C$ of less than −12‰; or between −12‰ to −30‰; or less than −13‰; or less than −14‰; or less than −15‰; or from −15‰ to −80‰; or the $\delta^{13}C$ of the composition of the invention, as described herein.

Examples of the formed building materials that can be produced by the foregoing methods, include, but not limited to, masonry units, for example only, bricks, blocks, and tiles including, but not limited to, ceiling tiles; construction panels, for example only, cement board (boards traditionally made from cement such as fiber cement board) and/or drywall (boards traditionally made from gypsum); conduits; basins; beam; column, slab; acoustic barrier; insulation material; or combinations thereof. Construction panels are formed building materials employed in a broad sense to refer to any non-load-bearing structural element that are characterized such that their length and width are substantially greater than their thickness. As such the panel may be a plank, a board, shingles, and/or tiles. Exemplary construction panels formed from the compositions of the invention include cement boards and/or drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm.

In some embodiments, the cement board and/or the drywall may be used in making different types of boards such as, but not limited to, paper-faced board (e.g. surface reinforcement with cellulose fiber), fiberglass-faced or glass mat-faced board (e.g. surface reinforcement with glass fiber mat), fiberglass mesh reinforced board (e.g. surface reinforcement with glass mesh), and/or fiber-reinforced board (e.g. cement reinforcement with cellulose, glass, fiber etc.). These boards may be used in various applications including, but not limited to, sidings such as, fiber-cement sidings, roofing, soffit, sheathing, cladding, decking, ceiling, shaft liner, wall board, backer, trim, frieze, shingle, and fascia, and/or underlayment.

Table I below shows various combinations of the cement boards and drywall in making various boards products that can be used in various applications. All of such combination are well within the scope of the invention and represent individual embodiments. For example, the drywall product made from the composition of the invention may be formed as a fiber-reinforced board which may be used in one or more of the applications, including but not limited to, sidings such as, fiber-cement sidings, roofing, soffit, sheathing, cladding, decking, ceiling, shaft liner, wall board, backer, trim, frieze, shingle, and fascia, and/or underlayment.

TABLE I

| | Construction panel | | | | | |
|---|---|---|---|---|---|---|
| | Drywall | | | | Cement board | |
| Applications | paper-faced board | fiber-glass-faced or glass mat-faced board | fiber-glass mesh reinforced board | fiber-reinforced board | fiberglass mesh reinforced board | fiber-reinforced board |
| fiber-cement sidings | X | X | X | X | X | X |
| roofing | X | X | X | X | X | X |
| soffit | X | X | X | X | X | X |
| sheathing | X | X | X | X | X | X |
| cladding | X | X | X | X | X | X |
| decking | X | X | X | X | X | X |
| ceiling | X | X | X | X | X | X |
| shaft liner | X | X | X | X | X | X |
| wall board | X | X | X | X | X | X |
| backer | X | X | X | X | X | X |
| underlayment | X | X | X | X | X | X |

The cement boards traditionally are made from cement such as Ordinary Portland cement (OPC), magnesium oxide cement and/or calcium silicate cement. The cement boards made by the methods of the invention are made from the carbonate precipitation material that partially or wholly replaces the traditional cement in the board. In some embodiments, the cement boards formed by the methods of the invention may comprise construction panels prepared as a combination of aragonitic cement (setting and hardening when vaterite transforms to aragonite) and fiber and/or fiberglass and may possess additional fiber and/or fiberglass reinforcement at both faces of the board.

The cement boards are formed building materials which in some embodiments, are used as backer boards for ceramics that may be employed behind bathroom tiles, kitchen counters, backsplashes, etc. and may have lengths ranging from 100 to 200 cm, such as 125 to 175 cm, e.g., 150 to 160 cm; a breadth ranging from 75 to 100 cm, such as 80 to 100 cm, e.g., 90 to 95 cm, and a thickness ranging from 5 to 25 mm, e.g., 5 to 15 mm, including 5 to 10 mm. Cement boards of the invention may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments of the invention, cement boards may be employed in environments having extensive exposure to moisture (e.g., commercial saunas). The maximum water absorption of the cement boards of the invention may vary, ranging from 5 to 15% by weight, including 8 to 10%, such as 9%. Cement boards formed from the compositions of the invention may also undergo moisture movement (expansion or contraction) due to the absorption or loss of water to its environment. The dimensional stability (i.e., linear shrinkage or expansion) due to moisture movement may vary, in certain instances ranging from 0.035 to 0.1%, including 0.04 to 0.08%, such as 0.05 to 0.06%. The composition of the invention may be used to produce the desired shape and size to form a cement board. In addition, a variety of further components may be added to the cement boards which include, but are not limited to, plasticizers, clay, foaming agents, accelerators, retarders and air entrainment additives. The composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards. In some instances, the resultant composition may also be foamed using mechanically or chemically introduced gases prior to being shaped or while the composition is setting in order to form a lightweight cement board. The shaped composition is then allowed to set and further cured in an environment with a controlled temperature and humidity. The cement boards formed from the compositions of the invention then may be covered in a fiberglass mat on both faces of the board. Where desired, the cement boards formed from the compositions of the invention may also be prepared using chemical admixtures such that they possess increased fire, water, and frost resistance as well as resistance to damage by bio-degradation and corrosion. The cement board may also be combined with components such as fibers, dispersed glass fibers, which may impart improved durability, increased flexural strength, and a smoother surface.

Another type of construction panel formed from the compositions of the invention is backer board. The backer board may be used for the construction of interior, and/or exterior floors, walls and ceilings. In the embodiments of the invention, the backer board is made partially or wholly from the carbonate precipitation material.

Another type of construction panel formed from the compositions of the invention is drywall. The "drywall" as used herein, includes board that is used for construction of interior, and/or exterior floors, walls and ceilings. Traditionally, drywall is made from gypsum (called paper-faced board). In the embodiments of the invention, the drywall is made partially or wholly from the carbonate precipitation material thereby replacing gypsum from the drywall product. In some embodiments, the drywall formed by the methods of the invention may comprise construction panels prepared as a combination of aragonitic cement (setting and hardening when vaterite transforms to aragonite) and cellulose, fiber and/or fiberglass and may possess additional paper, fiber, fiberglass mesh and/or fiberglass mat reinforcement at both faces of the board. Various processes for making the drywall product are well known in the art and are well within the scope of the invention. Some examples include, but not limited to, wet process, semi dry process, extrusion process, Wonderborad® process, etc., that have been described herein.

The inner core of drywall of the invention may include at least some amount of or made wholly from the aragonitic precipitation material (vaterite transformed to aragonite) of the invention. In some embodiments, the drywall may be panels made solely from the compositions of the invention without the need for a paper liner around the core. In one aspect, there is provided a drywall product comprising aragonite, wherein the aragonite has $\delta^{13}C$ value between −12‰ to −35‰, wherein the density of the drywall product is between 0.4-1 g/cm$^3$ or between 0.4-0.8 g/cm$^3$, wherein the porosity of the drywall is between 50-90 vol % or between 75-90 vol %, and wherein the compressive strength of the drywall product is between 200-2500 psi or between 200-2000 psi or between 200-1000 psi.

In some embodiments, the drywall is panel made of a paper liner wrapped around an inner core. For example, in some embodiments, during the process of making the drywall product from the precipitation material, the slurry of the precipitation material comprising vaterite is poured over a sheet of paper. Another sheet of paper is then put on top of the precipitation material such that the precipitation material is flanked by the paper on both sides (the resultant composition sandwiched between two sheets of outer material, e.g., heavy paper or fiberglass mats). The vaterite in the precipitation material is then transformed to aragonite (using additives and/or heat) which then sets and hardens. When the core sets and is dried in a large drying chamber, the sandwich becomes rigid and strong enough for use as a building material. The drywall sheets are then cut and separated. In some embodiments, the methods of the invention are also used to make the paper from the precipitation material of the invention. The paper is then used to make the paper liner for the drywall product also made from the precipitation material of the invention. Without being limited by any theory, it is contemplated that the aragonitic microstructure of the paper made from the precipitation material of the invention, may provide aragonite seeding to the poured precipitation material and may lead to greater bonding and adhesion of the paper with the material as well as may cause facilitation of the transformation of the vaterite to aragonite. The formation of the paper from the reactive vaterite is being described in detail in U.S Pat. No. 9,133,581, issued Sep. 15, 2015, which is incorporated herein by reference in its entirety in the present disclosure.

The dimensions of the drywall building materials of the invention may vary, in certain instances ranging from 100 to 200 cm, such as 125 to 175 cm, e.g., 150 to 160 cm in length; ranging from 75 to 100 cm, such as 80 to 100 cm, e.g., 90 to 95 cm in breadth, and ranging from 5 to 50 mm, e.g., 5 to 30 mm, including 10 to 25 mm in thickness. The flexural and compressive strengths of drywall provided by the invention are equal to or higher than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. The maximum water absorption of drywall of the invention may vary, ranging from 2 to 10% by mass, including 4 to 8%, such as 5%. In certain embodiments, the inner core may be analogous to a conventional drywall core which is made primarily from gypsum plaster (the semi-hydrous form of calcium sulfate ($CaSO_4 \cdot \frac{1}{2}H_2O$), with at least a portion of or whole of the gypsum component replaced with the aragonitic material of the invention. In addition, the core may include a variety of further components, such as, but not limited to, fibers (e.g., paper and/or fiberglass), clay, plasticizers, foaming agents, accelerators, e.g., potash, retarders, e.g., EDTA or other chelators, various additives that may increase mildew and fire resistance (e.g., fiberglass or vermiculite), and may reduce density by increasing porosity.

In some embodiments, the formed building materials such as, the construction panels such as, but not limited to, cement boards and drywall (as shown in table I above) produced by the methods described herein, have low density and high porosity making them suitable for lightweight and insulation applications. The high porosity and light weight of the formed building materials such as construction panels may be due to the development of the aragonitic microstructure when vaterite transforms to aragonite. The transformation of vaterite during dissolution/re-precipitation process may lead to micro porosity generation while at the same time the voids created between the aragonitic crystals formed may provide nano porosity thereby leading to highly porous and light weight structure. Certain admixtures may be added during the transformation process such as, but not limited to, foaming agents, rheology modifiers and mineral extenders, such as, but not limited to, clay, starch, etc. which may add to the porosity in the product as the foaming agent may entrain air in the mixture and lower the overall density and mineral extender such as sepiolite clay may increase the viscosity of the mixture thereby preventing segregation of the precipitation material and water (as illustrated in examples). In some embodiments, the methods provided herein produce formed building material, such as drywall or cement boards that has a porosity of between 20-90%, or between 20-80%, or between 20-60%, or between 20-50%, or between 20-40%, or between 30-90%, or between 30-80%, or between 30-60%, or between 40-90%, or between 40-80%, or between 40-60%, or between 50-90%, or between 50-75%, or between 60-90%, or between 70-90%, or between 75-90%, or between 80-90%, by volume.

One of the applications of the cement board or drywall is fiber cement siding. Fiber-cement sidings formed by the methods of the invention comprise construction panels prepared as a combination of aragonitic cement, aggregate, interwoven cellulose, and/or polymeric fibers and may possess a texture and flexibility that resembles wood. Fiber-cement sidings formed from the compositions of the invention are formed building materials used to cover the exterior or roofs of buildings and include, but are not limited to, building sheets, roof panels, ceiling panels, eternits, and the like. They may also find use as a substitute for timber fascias and barge boards in high fire areas. Fiber-cement sidings may have dimensions that vary, ranging from 200 to 400 cm in length, e.g., 250 cm and 50 to 150 cm in width, e.g., 100 cm and a thickness ranging from 4 to 20 mm, e.g., 5 to 15 mm, including 10 mm. Fiber-cement sidings formed from the compositions of the invention may possess physical and mechanical properties that vary. In some embodiments, the flexural strength may range between 0.5 to 5 MPa, including 1 to 3 MPa, such as 2 MPa. The compressive strengths may also vary, in some instances ranging from 2 to 25 MPa, including 10 to 15 MPa, such as 10 to 12 MPa. In some embodiments of the invention, fiber-cement sidings may be employed on buildings that are subject to varying weather conditions, in some embodiments ranging from extremely arid to wet (i.e., low to high levels of humidity). Accordingly, the maximum water absorption of the fiber-cement sidings of the invention may vary, ranging from 10 to 25% by mass, including 10 to 20%, such as 12 to 15%. The dimensional stability (i.e., linear shrinkage or expansion) due to moisture movement may vary, in certain instances ranging from 0.05 to 0.1%, including 0.07 to 0.09%. The composition of the invention may be used to produce the desired shape and size to form a fiber-cement siding. In addition, a variety of further components may be added to the fiber-cement sidings which include, but not limited to, cellulose, fibers, plasticizers, foaming agents, accelerators, retarders and air entrainment additives. The composition is then poured into sheet molds or a roller is used to form sheets of a desired thickness. The shaped composition may be further compacted by roller compaction, hydraulic pressure, vibrational compaction, or resonant shock compaction. The sheets are then cut to the desired dimensions of the fiber-cement sidings. In some instances, the resultant composition may also be foamed using mechanically or chemically introduced gases prior to being shaped or while the composition is setting in order to form a lightweight fiber-cement siding. The shaped composition is then allowed to set and further cured in an environment with a controlled temperature and humidity. The fiber-cement sidings of the invention may then be covered with a polymeric film, enamel or paint. Where desired, the fiber-cement sidings formed from the compositions of the invention may also be prepared using chemical admixtures such that they possess increased fire, water, and frost resistance as well as resistance to damage by bio-degradation and corrosion.

In some embodiments, the formed building materials are masonry units. Masonry units are formed building materials used in the construction of load-bearing and non-load-bearing structures that are generally assembled using mortar, grout, and the like. Exemplary masonry units formed from the compositions of the invention include bricks, blocks, and tiles. Bricks and blocks of the invention are polygonal structures possessing linear dimensions. Any unit with dimensions (mm) between 337.5×225×112.5 to 2000×1000×500 (length×width×depth) is termed a "block." Structural units with dimensions (mm) exceeding 2000×1000×500 (length×width×depth) are termed "slabs." Tiles refer to masonry units that possess the same dimensions as bricks or blocks, but may vary considerably in shape, i.e., may not be polygonal (e.g., hacienda-style roof tiles). One type of masonry unit provided by the invention is a brick, which refers to a structural unit of material used in masonry construction, generally laid using mortar. Bricks may vary in grade, class, color, texture, size, weight and can be solid, cellular, perforated, frogged, or hollow. Bricks formed from the compositions of the invention may include, but are not limited to, building brick, facing brick, load bearing brick, engineering brick, thin veneer brick, paving brick, glazed brick, firebox brick, chemical resistant brick, sewer and manhole brick, industrial floor brick, etc. The bricks may also vary in frost resistance (i.e., frost resistant, moderately frost resistant or non frost resistant), which relates to the durability of bricks in conditions where exposure to water may result in different levels of freezing and thawing. The compressive strength of bricks formed from the compositions of the invention may range, in certain instances, from 5 to 100 MPa; or 20-100 MPa; or 50-100 MPa; or 80-100 MPa; or 20-80 MPa; or 20-40 MPa; or 60-80 MPa. The flexural strength of bricks formed from the compositions of the invention may vary, ranging from 0.5 to 10 MPa, including 2 to 7 MPa, such as 2 to 5 MPa. The composition of the invention may be molded, extruded, or sculpted into the desired shape and size to form a brick. The shaped composition is then dried and further hardened by hydraulic pressure, autoclave or fired in a kiln at temperatures ranging between 900° to 1200° C., such as 900° to 1100° C. and including 1000° C. Another type of masonry unit provided by the invention is blocks, (e.g., concrete, cement, foundation, etc.). Blocks are distinct from bricks based on their structural dimensions. Blocks formed from the compositions of the invention may vary in color, texture, size, and weight and can be solid, cellular, and hollow or employ insulation (e.g., expanded polystyrene foam) in the block void volume. Blocks may be load-bearing, non-load-bearing or veneer (i.e., decorative) blocks. The compressive strength of blocks may vary, in certain instances ranging from 5 to 100 MPa, including 15 to 75 MPa, such as 20 to 40 MPa. The flexural strength of blocks formed from the compositions of the invention may also vary, ranging from 0.5 to 15 MPa, including 2 to 10 MPa, such as 4 to 6 MPa. The composition of the invention may be molded, extruded, or sculpted into the desired shape and size to form a block. The shaped composition may be further compacted by roller compaction, hydraulic pressure, vibrational compaction, or resonant shock compaction. Another type of building material provided by the invention is a tile. Tiles formed from the compositions of the invention refer to non-load-bearing building materials that are commonly employed on roofs, ceilings, and to pave exterior and interior floors of commercial and residential structures. The tile may also be used as a ceiling tile. In some embodiments, there is provide a method of forming ceiling tile, comprising a) contacting an aqueous solution comprising carbide lime with carbon dioxide from an industrial process under one or more precipitation conditions; b) producing a precipitation material comprising reactive vaterite; c) setting and hardening the precipitation material by transforming the reactive vaterite to aragonite, and d) forming the ceiling tile.

Some examples where tiles may be employed include, but are not limited to, the roofs of commercial and residential buildings, decorative patios, bathrooms, saunas, kitchens, building foyer, driveways, pool decks, porches, walkways, sidewalks, ceiling, and the like. Tiles may take on many forms depending on their intended use and/or intended geographical location of use, varying in shape, size, weight, and may be solid, webbed, cellular or hollow. The compressive strengths of tiles formed from the compositions of the invention may also vary, in certain instances ranging from 5 to 75 MPa, including 15 to 40 MPa, such as 25 MPa. The flexural strength of tiles formed from the compositions of the invention may vary, ranging from 0.5 to 7.5 MPa, including 2 to 5 MPa, such as 2.5 MPa. As such, the composition of the invention may be molded or cast into the desired tile shape and size. The shaped composition may be further compacted by roller compaction, hydraulic pressure, vibrational compaction, or resonant shock compaction. The resultant composition may also be poured out into sheets or a roller may be used to form sheets of a desired thickness. The sheets are then cut to the desired dimensions of the tiles. Tiles may be further polished, colored, textured, shot blasted, inlaid with decorative components and the like.

Another formed building material formed from the compositions of the invention is a conduit. Conduits are tubes or analogous structures configured to convey a gas or liquid, from one location to another. Conduits of the invention can include any of a number of different structures used in the conveyance of a liquid or gas that include, but are not limited to, pipes, culverts, box culverts, drainage channels and portals, inlet structures, intake towers, gate wells, outlet structures, and the like. Conduits of the invention may vary considerably in shape, which is generally determined by hydraulic design and installation conditions. Shapes of conduits of the invention may include, but are not limited to circular, rectangular, oblong, horseshoe, square, etc. In certain embodiments, conduits may be designed in order to support high internal pressure from water flow within the conduit. In yet other embodiments, conduits formed from the compositions of the invention may be designed to support high external loadings (e.g., earth loads, surface surcharge loads, vehicle loads, external hydrostatic pressures, etc.). Accordingly, the compressive strength of the walls of conduits of the invention may also vary, depending on the size and intended use of the conduit, in some instances ranging, from 5 to 75 MPa, such as 10 to 50 MPa, e.g., 15 to 40 MPa. In producing conduits of the invention, the composition after combining with water is poured into a mold in order to form the desired conduit shape and size. The shaped composition may be further compacted by roller compaction, hydraulic pressure, vibrational compaction, or resonant shock compaction. The shaped composition is further allowed to set and is cured in an environment with a controlled temperature and humidity. In addition, the conduits of the invention may include a variety of further components, such as, but not limited to, plasticizers, foaming agents, accelerators, retarders and air entrainment additives. Where desired, the further components may include chemical admixtures such that the conduits of the invention possess increased resistance to damage by bio-degradation, frost, water, fire and corrosion. In some embodiments, the conduits formed from the compositions of the invention may employ structural support components such as, but not limited to, cables, wires and mesh composed of steel, polymeric materials, ductile iron, aluminum or plastic.

Another formed building material formed from the compositions of the invention is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc. Basins may vary in shape, size, and volume capacity. Basins may be rectangular, circular, spherical, or any other shape depending on its intended use. In some embodiments, basins may possess a greater width than depth, becoming smaller toward the bottom. The dimensions of the basin may vary depending on the intended use of the structure (e.g., from holding a few gallons of liquid to several hundred or several thousand or more gallons of liquid). The wall thicknesses may vary considerably, ranging in certain instances from 0.5 to 25 cm or thicker, such as 1 to 15 cm, e.g., 1 to 10 cm. Accordingly, the compressive strength may also vary considerably, depending on the size and intended use of the basin, in some instances ranging, from 5 to 60 MPa, such as 10 to 50 MPa, e.g., 15 to 40 MPa. In some embodiments, the basin may be designed to support high external loadings (e.g., earth loads, surface surcharge loads, vehicle loads, etc.). In certain other embodiments, the basins may be employed with various coatings or liners (e.g., polymeric), and may be configured so that they may be combined with conveyance elements (e.g., drainage pipe). In other embodiments, basins may be configured so that they may be connected to other basins so that they may form a connected series of basins. In producing basins, the composition after combining with water may be poured into a mold to form the desired basin shape and size. The shaped composition may be further compacted by roller compaction, hydraulic pressure, vibrational compaction, or resonant shock compaction. The basins may also be prepared by pouring the composition into sheet molds and the basins further assembled by combining the sheets together to form basins with varying dimensions (e.g., polygonal basins, rhomboidal basins, etc.). In some instances, the resultant composition may also be foamed using mechanically or chemically introduced gases prior to being shaped or while the composition is setting in order to form a lightweight basin structure. The shaped composition is further allowed to set and is cured in an environment with a controlled temperature and humidity. In addition, the basins formed from the compositions of the invention may include a variety of further components, such as, but not limited to, plasticizers, foaming agents, accelerators, retarders and air entrainment additives. Where desired, the further components may include chemical admixtures such that the basins of the invention possess increased resistance to damage by bio-degradation, frost, water, fire and corrosion. In some embodiments, the basins of the invention may employ structural support components such as, but not limited to, cables, wires and mesh composed of steel, polymeric materials, ductile iron, aluminum or plastic.

Another formed building material formed from the compositions of the invention is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams of the invention may also be horizontal load-bearing units, which include, but are not limited to joists, lintels, archways and cantilevers. Beams generally have a much longer length than their longest cross-sectional dimension, where the length of the beam may be 5-fold or more, 10-fold or more, 25-fold or more, longer than the longest cross-sectional dimension. Beams formed from the compositions of the invention may vary in their mechanical and physical properties. For example, unreinforced concrete beams may possess flexural capacities that vary, ranging from 2 to 25 MPa, including 5 to 15 MPa, such as 7 to 12 MPa and compressive strengths that range from 10 to 75 MPa, including 20 to 60 MPa, such as 40 MPa. Structurally reinforced concrete beams may possess considerably larger flexural capacities, ranging from 15 to 75 MPa, including as 25 to 50 MPa, such as 30 to 40 MPa and compressive strengths that range from 35 to 150 MPa, including 50 to 125 MPa, such as 75 to 100 MPa. The beams formed from the compositions of the invention may be internal or external, and may be symmetrically loaded or asymmetrically loaded.

In some embodiments, beams may be composite, wherein it acts compositely with other structural units by the introduction of appropriate interface shear mechanisms. In other embodiments, beams may be non-composite, wherein it utilizes the properties of the basic beam alone. In producing beams of the invention, the composition of the invention after mixing with water may be poured into a beam mold or cast around a correlated steel reinforcing beam structure (e.g., steel rebar). In some embodiments, the steel reinforcement is pretensioned prior to casting the composition around the steel framework. In other embodiments, beams of the invention may be cast with a steel reinforcing cage that is mechanically anchored to the concrete beam. The beams of the invention may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the beams of the invention may include a variety of further components, such as but not limited to, plasticizers, foaming agents, accelerators, retarders and air entrainment additives. Where desired, the further components may include chemical admixtures such that the beams of the invention possess increased resistance to damage by bio-degradation, frost, water, fire and corrosion.

Another formed building material formed from the compositions of the invention is a column, which, in a broad sense, refers to a vertical load-bearing structure that carries loads chiefly through axial compression and includes structural elements such as compression members. Other vertical compression members of the invention may include, but are not limited to pillars, piers, pedestals, or posts. Columns formed from the compositions of the invention may be rigid, upright supports, composed of relatively few pieces. Columns may also be decorative pillars having a cylindrical or polygonal, smooth or fluted, tapered or straight shaft with a capital and usually a base, among other configurations. The capital and base of the column may have a similar shape as the column or may be different. Any combination of shapes for the capital and base on a column are possible. Polygonal columns formed from the compositions of the invention possess a width that is not more than four times its thickness. Columns formed from the compositions of the invention may be constructed such that they are solid, hollow (e.g., decorative columns), reinforcement filled, or any combination thereof. Columns can be short columns (i.e., columns where strength is governed by construction components and the geometry of its cross section) or slender columns (i.e., cross-sectional dimensions that are less than 5 times its length). The dimensions of the column may vary greatly depending on the intended use of the structure, e.g., from being less than a single story high, to several stories high or more, and having a corresponding width. Columns may vary in their mechanical and physical properties. Properties such as compressive and flexural strengths may vary depending on the design and intended use of the column. For example, unreinforced concrete columns may possess flexural strengths that range from 2 to 20 MPa, including 5 to 15 MPa, such as 7 to 12 MPa and compressive strengths that range from 10 to 100 MPa, including 25 to 75 MPa, such as 50 MPa. Structurally reinforced concrete columns of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In some embodiments, columns may be composite, wherein it may act compositely with other structural units by the introduction of interfacial shear mechanisms. In other embodiments, columns may be non-composite, wherein it utilizes the properties of the basic column alone. In producing columns of the invention, the composition after combination with water may be poured into a column form or cast around a correlated steel reinforcing column structure (e.g., steel rebar). In some embodiments, the steel reinforcement is pre-tensioned prior to casting the composition around the steel framework. In other embodiments, columns of the invention may be cast with a steel reinforcing cage that is mechanically anchored to the concrete column. The columns of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the columns of the invention may include a variety of additional components, such as but not limited to, plasticizers, foaming agents, accelerators, retarders and air entrainment additives. Where desired, these additional components may include chemical admixtures such that the columns of the invention possess increased resistance to damage by bio-degradation, frost, water, fire and corrosion.

Another formed building material formed from the compositions of the invention is a concrete slab. Concrete slabs are those building materials used in the construction of prefabricated foundations, floors and wall panels. In some instances, a concrete slab may be employed as a floor unit (e.g., hollow plank unit or double tee design). In other instances, a precast concrete slab may be a shallow precast plank used as a foundation for in-situ concrete formwork. Wall panels are, in a broad sense, vertical load-bearing members of a building that are polygonal and possess a width that is more than four times its thickness. Precast concrete foundation, floors and wall panels may vary considerably in dimension depending on the intended use of the precast concrete slab (e.g., one or two storey building). As such, precast concrete slabs may have dimensions which range from 1 to 10 m in length or longer, including 3 to 8 m, such as 5 to 6 m; height that ranges from 1 to 10 m or taller, including 4 to 10 m, such as 4 to 5 m; and a thickness that may range from 0.005 to 0.25 m or thicker, including 0.1 to 0.2 m such as 0.1 to 0.15 m. Formed building materials such as slabs, and structures made therefrom, may be thicker than corresponding structures that lack components of the composition of the invention. In addition, structures made from amorphous building materials formed from the composition of the invention may be thicker than corresponding structures that are not formed from the composition of the invention.

In some embodiments, thickness of formed building materials or related structures is increased by 1.5 fold or more, 2-fold or more, or 5-fold or more. Concrete slabs formed from the compositions of the invention may vary in their mechanical and physical properties depending on their intended use. For example, a prefabricated slab that is employed in a floor unit may possess larger flexural strengths and lesser compressive strengths than a slab that is employed as a load-bearing wall. For example, unreinforced concrete slabs may possess flexural strengths that vary, ranging from 2 to 25 MPa, including 5 to 15 MPa, such as 7 to 12 MPa and compressive strengths that range from 10 to 100 MPa, including 25 to 75 MPa, such as 50 MPa. Structurally reinforced concrete slabs of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In producing concrete slabs, the composition after combination with water may be poured into a slab mold or cast around a correlated steel reinforcing structure (e.g., steel rebar). In some embodiments, the steel reinforcement is pretensioned prior to casting the composition around the steel framework. In other embodiments, slabs of the invention may be cast with a steel reinforcing cage that is mechanically anchored to the concrete slab. In some embodiments, the concrete slabs of the invention may improve its structural capacity by casting a second, supportive concrete layer that is mechanically anchored to the previously precast concrete slab. The slabs formed from the compositions of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the slabs of the invention may include a variety of further components, such as but not limited to, plasticizers, foaming agents, accelerators, retarders and air entrainment additives. Where desired, the further components may include chemical admixtures such that the slabs formed from the compositions of the invention possess increased resistance to damage by bio-degradation, frost, water, fire and corrosion.

Another formed building material formed from the compositions of the invention is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc. Acoustic barriers formed from the compositions of the invention may widely vary in size and shape. Acoustic barriers may be polygonal, circular, or any other shape depending on its intended use. Acoustic barrier may be employed in the attenuation of sound from highways, roadways, bridges, industrial facilities, power plants, loading docks, public transportation stations, military facilities, gun ranges, housing complexes, entertainment venues (e.g., stadiums, concert halls) and the like. Acoustic barriers may also be employed for sound insulation for the interior of homes, music studios, movie theaters, classrooms, etc. The acoustic barriers formed from the compositions of the invention may have dimensions that vary greatly depending on its intended use, ranging from 0.5 to 10 m in length or longer, e.g., 5 m and 0.1 to 10 m in height/width or wider, e.g., 5 m and a thickness ranging from 10 to 100 cm, or thicker e.g., 25 to 50 cm, including 40 cm. Where desired, the acoustic barrier may be employed with various coatings or liners (e.g., polymeric), and may be configured for easy joining with each other or pillars separating additional acoustic barriers to produce long acoustic barrier structures made up of multiple acoustic barriers of the invention. In some embodiments, acoustic barriers formed from the compositions of the invention may employ sound absorptive material (e.g., wood shavings, textile fibers, glass wool, rock wool, polymeric foam, vermiculite, etc.) in addition to a structurally reinforcing framework. In some embodiments, acoustic barriers may be used as noise-reduction barriers in an outdoor environment (e.g., along a highway, near an airport, etc.) and may be employed with structural support components (e.g., columns, posts, beams, etc.). In producing acoustic barriers of the invention, the composition of the invention after combination with water is poured into a mold to form the desired acoustic barrier shape and size. Also the composition may be poured out into a sheet mold or a roller may be used to form sheets of a desired thickness. The shaped composition may be further compacted by roller compaction, hydraulic pressure, vibrational compaction, or resonant shock compaction. The sheets are then cut to the desired dimensions of the acoustic barriers. In some instances, the resultant composition may also be foamed using mechanically or chemically introduced gases prior to being shaped or while the composition is setting in order to form a lightweight acoustic panel structure. The shaped composition is further allowed to set and is cured in an environment with a controlled temperature and humidity. In addition, the acoustic barriers of the invention may include a variety of further components, such as but not limited to, plasticizers, foaming agents, accelerators, retarders and air entrainment additives. Where desired, the further components may include chemical admixtures such that they possess increased resistance to damage by bio-degradation, frost, water, fire and corrosion. In some embodiments, the acoustic barriers of the invention may employ structural support components such as, but not limited to, cables, wires and mesh composed of steel, ductile iron, polymeric fibers, aluminum or plastic.

Another formed building material formed from the compositions of the invention is an insulation material, which refers to a material used to attenuate or inhibit the conduction of heat. Insulation may also include those materials that reduce or inhibit radiant transmission of heat. Insulation material may consist of one or more of the following constituents: a cementitious forming material, a dispersing agent, an air entraining agent, inert densifying particulate, a mixture of ionic and non-ionic surfactants, plasticizers, accelerators, lightweight aggregate, organic and inorganic binding agents and glass particles. In certain embodiments of the invention, an amount of cementitious forming material may be replaced by the above described composition of the invention. Binding compositions for the insulation material of the invention include a component selected from the group consisting of carbides, Gypsum powder, Blakite, nitrides, calcium carbonate, oxides, titanates, sulfides, zinc selenide, zinc telluride, inorganic siloxane compound and their mixtures thereof. In certain embodiments of the invention, an amount of the binding composition may be replaced by the above described composition of the invention. Where desired, insulation material of the invention may also be prepared using a chemical admixture or any other convenient protocol such that they are resistant to damage by termites, insects, bacteria, fungus. Etc. Insulation materials of the invention may be prepared using any convenient protocol such that they are freeze/thaw, rain and fire resistant. Insulation material of the invention may be prepared in accordance with traditional manufacturing protocols for such materials, with the exception that the composition of the invention is employed. In producing the insulation materials of the invention, an amount of the composition of the invention may be combined with water and other components of the insulation material, which may include, but are not limited to a dispersing agent, an air entraining agent, inert densifying particulate, a mixture of ionic and non-ionic surfactants, plasticizers, accelerators, lightweight aggregate, organic and inorganic binding agents and glass particles. The resultant insulation material may then be molded into the desired shape (e.g., wall panel) or poured into the void space of concrete masonry units, flooring units, roof decks or cast around pipes, conduits and basins.

In some embodiments, the other formed building materials such as pre-cast concrete products include, but not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utillity protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls; roofing tiles; pavers; community retaining wall; res. retaining wall; modular block systems; and segmental retaining walls.

Non-Cementitious Compositions

In some embodiments, the methods described herein include making other products from the precipitated material of the invention including, but not limited to, non-cementitious compositions including paper, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such compositions have been described in U.S. Pat. No. 7,829,053, issued Nov. 9, 2010, which is incorporated herein by reference in its entirety. The formation of the non-cementitious materials from the reactive vaterite is being described in U.S. Pat. No. 9133,581, issued Sep. 15, 2015, which is incorporated herein by reference in its entirety.

Artificial Marine Structures

In some embodiments, the methods described herein include making artificial marine structures from the precipitated material of the invention including, but not limited to, artificial corals and reefs. In some embodiments, the artificial structures can be used in the aquariums or sea. In some embodiments, these products are made from the precipitated material comprising reactive vaterite that transforms to aragonite after setting and hardening. The aragonitic cement provides neutral or close to neutral pH which may be conducive for maintenance and growth of marine life. The aragonitic reefs may provide suitable habitat for marine species. In some embodiments, there is provided an artificial reef comprising aragonite, wherein the aragonite has $\delta^{13}C$ value between −12‰ to −35‰. In some embodiments, the density of the artificial reef is between 0.4-1.8 $g/cm^3$, wherein the porosity of the artificial reef is between 50-90 vol %. In some embodiments, the compressive strength of the artificial reef is between 200-3000 psi.

IV. Utility

Compositions of the invention find use in a variety of different applications, as reviewed above. The subject methods and systems find use in $CO_2$ sequestration, particularly via sequestration in a variety of diverse man-made products. The $CO_2$ sequestering includes the removal or segregation of $CO_2$ from a gaseous stream, such as a gaseous waste stream, and fixating it into a stable non-gaseous form so that the $CO_2$ cannot escape into the atmosphere. The $CO_2$ sequestration includes the placement of $CO_2$ into a storage stable form, where the $CO_2$ is fixed at least during the useful life of the composition. As such, sequestering of $CO_2$ according to methods of the invention results in prevention of $CO_2$ gas from entering the atmosphere and long term storage of $CO_2$ in a manner that $CO_2$ does not become part of the atmosphere.

V. Packages

In one aspect, there is provided a package including the composition of the invention. In some embodiments, there is provided a package including a composition formed from the precipitation material of the invention. In some embodiments, there is provided a package including a product, such as but not limited to, building material, a formed building material, an artificial reef, and/or non-cementitious product formed from the precipitation material of the invention. The package further includes a packaging material that is adapted to contain the composition or the products. The package may contain one or more of such packaging materials. The packaging material includes, but is not limited to, metal container; sacks; bags such as, but not limited to, paper bags or plastic bags; boxes; silo such as, but not limited to, tower silo, bunker silo, bag silo, low level mobile silo, or static upright silo; and bins. It is understood that any container that can be used for carrying or storing the composition or the products made from the compositions of the invention is well within the scope of the invention. In some embodiments, these packages are portable. In some embodiments, these packages and/or packaging materials are disposable or recyclable. The packaging material are further adapted to store and/or preserve the composition or the products made from the composition of the invention for longer than few months to few years. In some embodiments, the packaging materials are further adapted to store and/or preserve the composition or the products made from the compositions of the invention for longer than 1 week, or longer than 1 month, or longer than 2 months, or longer than 5 months, or longer than 1 year, or longer than 2 years, or longer than 5 years, or longer than 10 years, or between 1 week to 1 year, or between 1 month to 1 year, or between 1 month to 5 years, or between 1 week to 10 years.

The following examples are put forth so as to provide those of ordinary skill in the art with a complete disclosure and description of how to make and use the invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

The following analytical instrumentations were used to characterize the precipitation material.

Materials and Methods

Coulometer: Liquid and solid carbon-containing samples were acidified with 2.0 N perchloric acid ($HClO_4$) to evolve carbon dioxide gas into a carrier gas stream, and subsequently scrubbed with 3% w/v silver nitrate at pH 3.0 to remove any evolved sulfur gasses prior to analysis by an inorganic carbon coulometer (UIC Inc, model CM5015). For example, samples of cement are heated after addition of percholoric acid with a heated block to aid digestion of the sample.

Brunauer-Emmett-Teller ("BET") Specific Surface Area: Specific surface area (SSA) measurement was by surface absorption with dinitrogen (BET method). SSA of dry samples was measured with a Micromeritics Tristar™ II 3020 Specific Surface Area and Porosity Analyzer after preparing the sample with a Flowprep™ 060 sample degas system. Briefly, sample preparation involved degassing approximately 1.0 g of dry sample at an elevated temperature while exposed to a stream of dinitrogen gas to remove residual water vapor and other adsorbents from the sample surfaces. The purge gas in the sample holder was subsequently evacuated and the sample cooled before being exposed to dinitrogen gas at a series of increasing pressures (related to adsorption film thickness). After the surface was blanketed, the dinitrogen was released from the surface of the particles by systematic reduction of the pressure in the sample holder. The desorbed gas was measured and translated to a total surface area measurement.

Particle Size Analysis ("PSA"): Particle size analysis and distribution were measured using static light scattering. Dry particles were suspended in isopropyl alcohol and analyzed using a Horiba Particle Size Distribution Analyzer (Model LA-950V2) in dual wavelength/laser configuration. Mie scattering theory was used to calculate the population of particles as a function of size fraction, from 0.1 mm to 1000 mm.

Powder X-ray Diffraction ("XRD"): Powder X-ray diffraction was undertaken with a Rigaku Miniflex™ (Rigaku) to identify crystalline phases and estimate mass fraction of different identifiable sample phases. Dry, solid samples were hand-ground to a fine powder and loaded on sample holders. The X-ray source was a copper anode (Cu kα), powered at 30 kV and 15 mA. The X-ray scan was run over 5-90 °2θ, at a scan rate of 2 °2θ per min, and a step size of 0.01 °2θ per step. The X-ray diffraction profile was analyzed by Rietveld refinement using the X-ray diffraction pattern analysis software Jade™ (version 9, Materials Data Inc. (MDI)).

Fourier Transform Infrared ("FT-IR") Spectroscopy: FT-IR analyses were performed on a Nicolet 380 equipped with the Smart Diffuse Reflectance module. All samples were weighed to 3.5±0.5 mg and hand ground with 0.5 g KBr and subsequently pressed and leveled before being inserted into the FT-IR for a 5-minute nitrogen purge. Spectra were recorded in the range 400-4000 $cm^{-1}$.

Scanning Electron Microscopy ("SEM"): SEM was performed using a Hitachi™-1000 tungsten filament tabletop microscope using a fixed acceleration voltage of 15 kV at a working pressure of 30-65 Pa, and a single BSE semiconductor detector. Solid samples were fixed to the stage using a carbon-based adhesive; wet samples were vacuum dried to a graphite stage prior to analysis.

Example 1

Purification of Carbide Lime, Formation and Transformation of the Precipitation Material 1.88 kg of $NH_4Cl$ was dissolved into 20.0 L of tap water. 1.18 kg of carbide lime (~85% $Ca(OH)_2$) was added to the solution, and mixed for 2 hours. The resultant mixture was vacuum filtered to remove the insoluble impurities. The clear filtrate was transferred to an airtight, collapsible bag. The bag was submersed in a water bath, which preheated the solution to 35° C. The carbonation reactor was an acrylic cylinder, equipped with baffles, gas diffuser, pH electrode, thermocouple, turbine impeller, and inlet and outlet ports for liquid, gases and slurry. Mass flow controllers proportioned a $N_2$—$CO_2$ inlet gas blend. During startup, 1 L of the solution in the bag was pumped into the reactor. The mixer was stirred while a $CO_2$ and $N_2$ gas blend was introduced through the gas diffuser. A computer automated control loop controlled the continuous inlet flow of fresh reactant solution maintaining the pH at 7.5. The resultant reactive vaterite slurry was continuously collected into a holding container. The slurry was vacuum filtered in batches every 20 minutes, rinsing with water per batch. The reactive vaterite filter cake was oven dried at 100° C. The cake showed 100% vaterite with a PSA Mean (STDV): 19.21 μm (7.81 μm). The clear filtrate containing regenerated $NH_4Cl$ was recycled in subsequent experiments.

The dried reactive vaterite solid was mixed into a paste at 0.38 water to solids ratio using a solution containing 2% $MgCl_2$ and 2% $SrCl_2$ (percent by weight of $Mg^{2+}$ and $Sr^{2+}$). The XRD of the paste after 1 day showed 99.9% aragonite (vaterite fully converted to aragonite). The pastes were cast into 2"×2"×2" cubes, which set and hardened in a humidity chamber set to 60° C. and 80% of relative humidity for 7 days. The cemented cubes were dried in a 100° C. oven. Destructive testing determined the compressive strength of the cubes to be 4600 psi (~31 MPa).

Example 2

Purification of the Carbide Lime and Formation of the Precipitation Material 35.05 g of glycine ($NH_2CH_3COOH$) was dissolved into 1000 g of deionized water. 17.30 g calcium hydroxide ($Ca(OH)_2$) was added to the solution. The mixture was stirred for 30 minutes. The mixture was vacuum filtered through Whatman 1 filter paper. The pH of the resulting filtrate was 10.87 at a temperature of 21.5° C. The filtrate was transferred to a 1 liter (4.5" inner diameter), baffled batch reactor vessel. The filtrate was mixed with a 1.5" diameter rushton impeller at 2500 rpm, while a gas mixture comprised of 1 slpm carbon dioxide ($CO_2$) and 2 slpm nitrogen ($N_2$) was bubbled through the reactor. Mixing and gas bubbling was stopped when the pH reached 7.5, which occurred after 11 minutes and 25 seconds. The resulting slurry was vacuum filtered through Whatman 1 filter paper. The solid filter cake was oven dried at 100° C. overnight. 15.52 g of dried solids were recovered. The solids showed following analytical results: XRD: 97.6 wt % vaterite, 2.4% calcite.

Example 3

Effect of Admixtures to Make Aragonitic Precipitation Material with Low Density and High Porosity In this experiment, admixtures were added to the precipitation material comprising reactive vaterite to form low density and high porosity aragonitic microstructure suitable for lightweight and insulation applications such as drywall and ceiling tile etc.

The calcium carbonate cement was produced by capturing $CO_2$ from flue gas. In the process, raw flue gas from a natural gas power plant containing $CO_2$ was contacted with an aqueous alkaline solution in an absorber, forming a carbonated solution. The carbonated solution was then contacted with an aqueous $CaCl_2$ solution with $NaSO_4$ added as a stabilizer, resulting in the precipitation of metastable $CaCO_3$ in the form of vaterite, which was subsequently dewatered and dried yielding the final carbonate precipitation material powder. The carbonate precipitation material showed 83% by weight vaterite and 17% by weight calcite. The mean particle size of the powder was 21.4 microns and standard deviation was 7.4 microns. Characterization of the powder in terms of composition is shown in Table 1 below.

TABLE 1

| Oxide | Amount in Sample (weight %) |
| --- | --- |
| $SiO_2$ | 0.2 |
| CaO | 54.5 |
| MgO | 0.4 |
| SrO | 0.1 |
| $SO_3$ | 0.5 |
| LOI* | 44.3 |
| Moisture | 0.9 |

*LOI is mass lost on ignition to 950° C.

Figure 4:
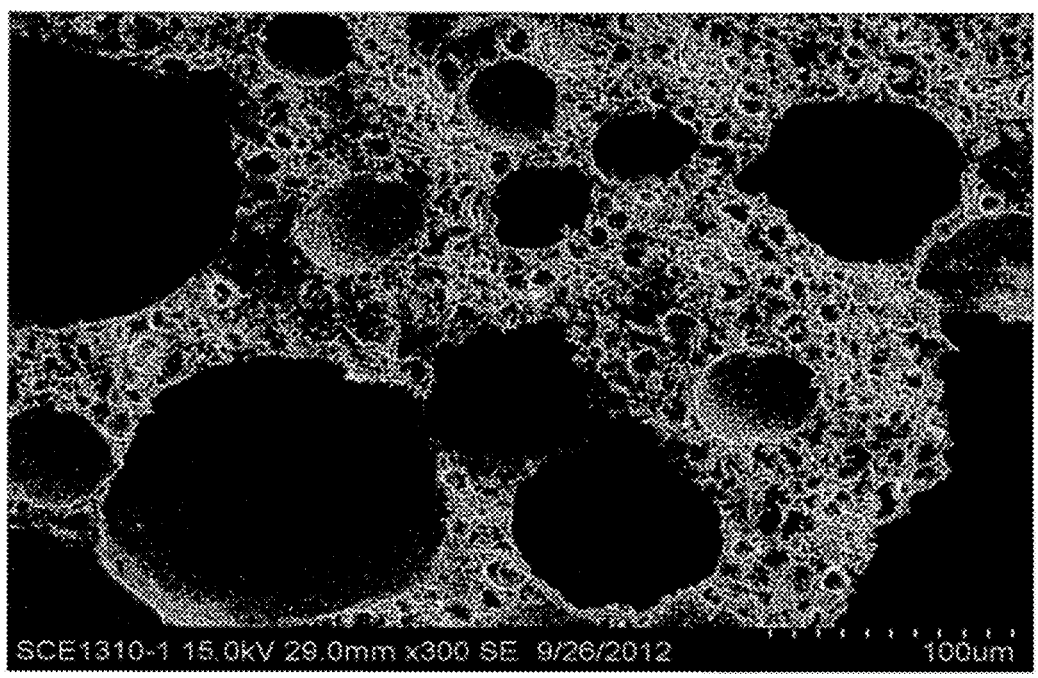
FIG. 4 is a scanned electron microscopy (SEM) image of solidified calcium carbonate cement microstructure obtained by adding foaming agent, as described in Example 3.

The calcium carbonate cement paste formulations were prepared as listed in Table 2. Lightweight formulations (<1 g/cm$^3$) were achieved with the addition of (i) mineral extender (MA) (sepiolite clay) to increase the paste viscosity for allowing the use of higher water-to-cement ratios or (ii) foaming agent (FA) and starch to entrain large quantity of air in the matrix. The formulations with mineral extender were mixed with 0.5% $MgCl_2$ solution in a Hobart mixer for 5 mins while the formulations with foaming agent and starch were mixed with 0.5% $MgCl_2$ in a Hobart mixer until the required volume of entrained air was achieved. The mixed materials were then cast into 2×2×2 cubes and then cured in a 60° C., 100% RH chamber for 1 day. At 1 day of reaction, the test cubes had set with about 30% of the vaterite contained in the cement transformed to aragonite and were demolded and cured in $MgCl_2$ solution bath at 60° C. for 6 days. At 7 day of reaction, the majority of the vaterite contained in the cement had transformed to aragonite and the test cubes were dried in a 100° C. oven for 24 hours and stored at a 40° C. oven until testing. Results are listed in Table 2. FIG. 4 illustrates solidified calcium carbonate cement microstructure achieved by adding foaming agent (resulting density 0.4 g/cm$^3$), which shows three ranges of porosity (86 vol % porosity): macro porosity from air created by the foaming agent, micro porosity from the dissolved/transformed vaterite, and nano porosity from the voids between aragonite crystals.

The mineral extender prevented the calcium carbonate cement from segregation at high water-to-cement ratios (lower final density). The sepiolite clay significantly increased the viscosity of the mixed cement slurry at high water-to-cement ratios, thereby preventing segregation of the cement and water. The foaming agent (Cedapal 406) entrained significant amount of air in the system to lower the overall density. The porosity or density of the final product has an impact on its strength and thermal conductivity. For example, in a drywall application, a lightweight (e.g., <0.8 g/cm$^3$) and low thermal conductivity product may be preferred which may require incorporating large vol % of porosity in the product while maintain satisfactory strength (such as >200 psi).

Table 2 illustrates density of the calcium carbonate precipitation material after cementation (i.e. after vaterite transformation to aragonite). Following is a description of how each property was measured. Density and porosity were calculated with the dried test cubes weight and dimensions. Compressive strength of the dried test cubes was measured through a compression loading device at a controlled loading rate (200-400 lbs/sec) following ASTM C 109. Thermal conductivity was measured using a range of equipments with different mechanisms including: laser flash calorimeter (L; NETZSCH LFA457), guarded heat flow meter (G; TA DTC-300; ASTM 1530), transient plane source (T; ThermTest TPS 2500S), and modified transient plane source (M; C-THERM TCI). Flammability was measured using a cone calorimeter following ASTM E 1354.

TABLE 2

| | Baseline (1.25 g/cm$^3$) | 1.0 g/cm$^3$ | 0.75 g/cm$^3$ | 0.6 g/cm$^3$ | 0.6 g/cm$^3$ | 0.4 g/cm$^3$ | Gypsum Drywall (0.6-0.8 g/cm$^3$) |
| --- | --- | --- | --- | --- | --- | --- | --- |
| $CaCO_3$ cement (wt %) | 100 | 97 | 91 | 81 | 97 | 97 | ~95 ($CaSO_4$ $2H_2O$) |
| Additive types | N/A | MA | MA | MA | FA and Starch | FA and Starch | Starch and Chemical Admixtures |
| Additives dosage (wt %) | 0 | 3 | 9 | 19 | 3 | 3 | ~5 |
| Water/cement | 0.4 | 0.61 | 1.0 | 1.6 | 0.55 | 0.55 | ~0.95 |
| Porosity (vol. %) | 57 | 65 | 73 | 78 | 78 | 86 | 65-75 |
| Thermal Conductivity (W/m/K) | 0.33 (L) 0.57 (T) 0.52 (M) 0.48 (G) | 0.35 (M) | 0.18 (L) 0.25 (M) | 0.13 (L) | 0.25 (T) 0.17 (M) 0.22 (G) | 0.14 (T) 0.11 (M) 0.12 (G) | ~0.150 |

TABLE 2-continued

| | Baseline (1.25 g/cm³) | 1.0 g/cm³ | 0.75 g/cm³ | 0.6 g/cm³ | 0.6 g/cm³ | 0.4 g/cm³ | Gypsum Drywall (0.6-0.8 g/cm³) |
|---|---|---|---|---|---|---|---|
| Compressive strength (psi) | 4600 | 2500 | 1 200 | 600 | 600 | 200 | ~400 |

Example 4

Formation of Artificial Reef

The calcium carbonate cement was produced by capturing $CO_2$ from flue gas. In the process, raw flue gas from a natural gas power plant containing $CO_2$ was contacted with an aqueous alkaline solution in an absorber, forming a carbonated solution. The carbonated solution was then contacted with an aqueous $CaCl_2$ solution with $NaSO_4$ added as a stabilizer, resulting in the precipitation of metastable $CaCO_3$ in the form of vaterite, which was subsequently dewatered and dried yielding the final cement powder. The powder showed 83% vaterite and 17% calcite in the powder. The dried powder was then mixed with 0.5 wt % $MgCl_2$ solution at a water-to-cement ratios of 0.4 in a Hobart mixer for 5 mins. The mixed slurry was then cast into 2×2×2 cubes and then cured in a 60° C., 100% RH chamber for 7 days. After 7 days of reaction, all the vaterite contained in the cement had transformed to aragonite and the test cubes were dried in a 100° C. oven for 24 hours then cut into 2×2×0.5 triangular plates. The triangular plates were taken to a local aquarium store for coral transplantation. After the coral became stable, the triangular plates with corals were placed in a fish tank for display. The plates have been in the aquarium for about four months and show signs of growing corals on the plates.

Example 5

Effect of Temperature on the Formation of Reactive Vaterite

The precipitation material was formed by the process described in Example 1 at 50° C. precipitation temperature. The solids showed following analytical results: XRD: 76.7 wt % vaterite, 23.3% aragonite. The dried reactive vaterite solid was mixed into a paste at 1:1 water to solids ratio using a solution containing 0.5% and 1% $MgCl_2$ (percent by weight of $Mg^{2+}$). The XRD of the paste after 1 day showed 100% aragonite (vaterite fully converted to aragonite). It is contemplated that the aragonite acts as a seed for the transformation of the reactive vaterite to the aragonite.

Example 6

Effect of pH on the Formation of Reactive Vaterite

Materials and Conditions:
1-liter, 4.5" diameter, continuous stir tank reactor with baffles; 6-bladed rushton impeller, 1.5" diameter; mixing rate of 750 rpm; beginning temperature was ~20° C.

A gas feed was introduced through a gas diffuser through the bottom of the reactor. The gas feed was controlled by using mass flow controllers to blend 0.60 slpm $CO_2$ with 4.40 slpm $N_2$, for a mixture of 12% $CO_2$ (v/v) at 5.00 slpm total gas flow rate. Feed solution was prepared by dissolving 422.5 L of $NH_4Cl$ into 4.5 L of water. 225 g of $Ca(OH)_2$ was dissolved into this solution. The insoluble impurities were removed by filtration. The pH was ~9.9. A steady-state pH was maintained by a control loop between an inserted pH electrode and the feed pump. A PID control scheme was used to control the feed rate. A constant volume was maintained by removing excess fluid above the 1-liter mark in the reactor via peristaltic pump.

Procedure:

The reactor was prefilled with 800 mL of feed solution. The mixer was turned on and set to 750 rpm. The 12% $CO_2$ gas was introduced at a rate of 5.00 slpm. When the pH had decreased from it's initial value (9.9) to the set point (either 7.5 or 8.0), the control loop for feeding new fluid to the reactor, and maintaining the steady-state pH, was enabled. Outlet samples were periodically filtered, dried and analyzed by XRD to determine vaterite purity.

Figure 5:
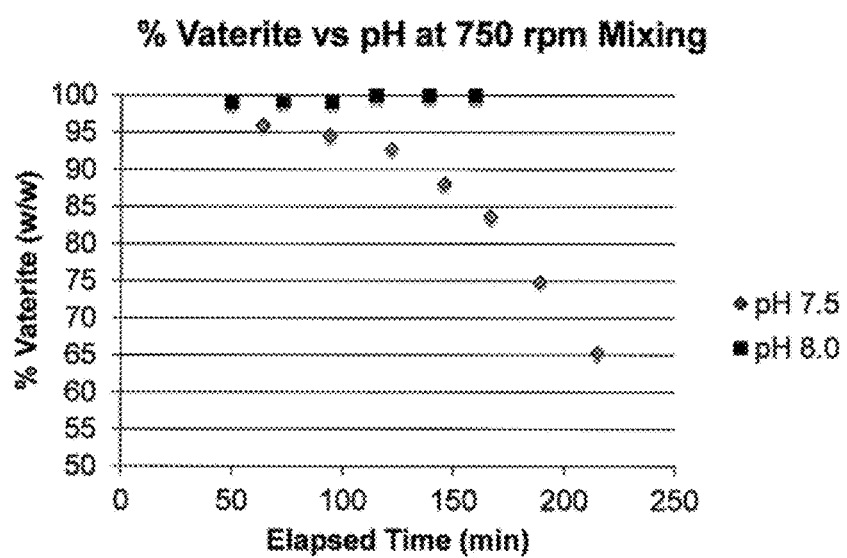
FIG. 5 is a graph illustrating the effect of pH on the formation of vaterite, as described in Example 6.

Observations:

As illustrated in FIG. 5, while initial samples from both conditions were relatively pure, with respect to vaterite, the lower pH (7.5) condition resulted in a continuing decrease in purity as operation continued while the higher pH (8.0) condition resulted in sustained vaterite purity.

| Data: Time (elapsed min): % Vaterite (%) |
|---|
| Condition 1, pH 7.5 |
| 64: 96.0 |
| 94: 94.6 |
| 122: 92.8 |
| 146: 88.1 |
| 167: 83.7 |
| 189: 74.9 |
| 215: 65.4 |
| Condition 2, pH 8.0 |
| 50: 99.1 |
| 73: 99.3 |
| 95: 99.2 |
| 115: 100 |
| 139: 100 |
| 160: 100 |

Example 7

Preparation of PCC from Carbide Lime Using Additives

Calcium carbonate with reduced particle size and improved whiteness was prepared using the method of dissolving carbide lime with ammonium chloride and sparging carbon dioxide into the resulting solution. To produce PCC the primary modifications of the method were 1) elimination of excess ammonium, 2) addition of stearate and citrate, and 3) termination of the reaction at high pH.

Briefly, a 0.7M solution of calcium hydroxide was prepared by mixing the carbide lime slurry (772 g) with a stoichiometric concentration of ammonium chloride (225 g)

in water (3 L). Elimination of the excess ammonia improved the whiteness of the calcium carbonate product by increasing the pH of the solution. The increased pH consequently reduced the solubility of iron. Soluble iron may be present as an impurity in the carbide lime or may result from corrosion of any parts used to store or transport the solution. The increased pH during the reaction can prevent the solubility of the iron in the solution thereby increasing the whiteness of the calcium carbonate product. Insoluble impurities are removed by filtration.

After removal of the insoluble impurities, sodium citrate (2 g/L) and sodium stearate (0.5 g/L) were added to the solution. The solution (1 L) was then transferred to a continuous stirred tank reactor and heated to a desired temperature (40° C.). Precipitation was initiated by sparging 12% carbon dioxide (10 slpm) under mixing (750 rpm). The reaction was terminated when the pH dropped from approximately 11.5 to 9.5 (8-11 min). The final product was filtered and rinsed with water followed by isopropanol and allowed to dry in a convection oven (−100° C.).

Figure 6:
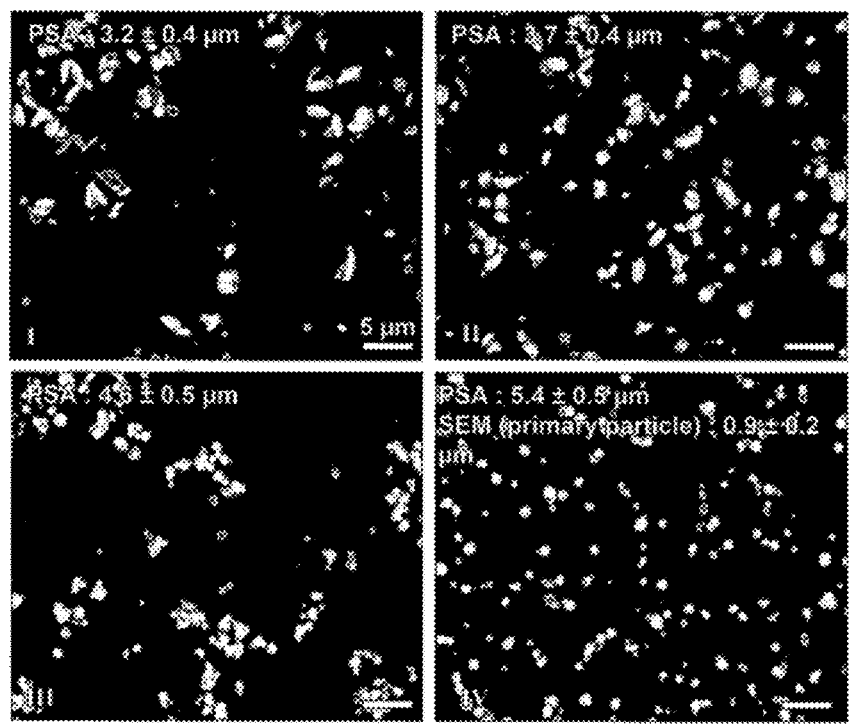
FIG. 6 is SEM image of calcium carbonate formed using different additives, as described in Example 7.

SEM imaging showed that the addition of citrate resulted in a decrease in particle size while stearate acted to reduce agglomeration of the primary particles (FIG. 6). FIG. 6 illustrates SEM images of calcium carbonate prepared in the absence of additives (I), with the addition of 0.5 g/L sodium stearate (II), 2 g/L sodium citrate (III), and both citrate and stearate (IV). The final particle size was approximately 1 μm as measured by SEM and the agglomerate size was approximately 6 μm as measured by laser diffraction (PSA).

Figure 7:
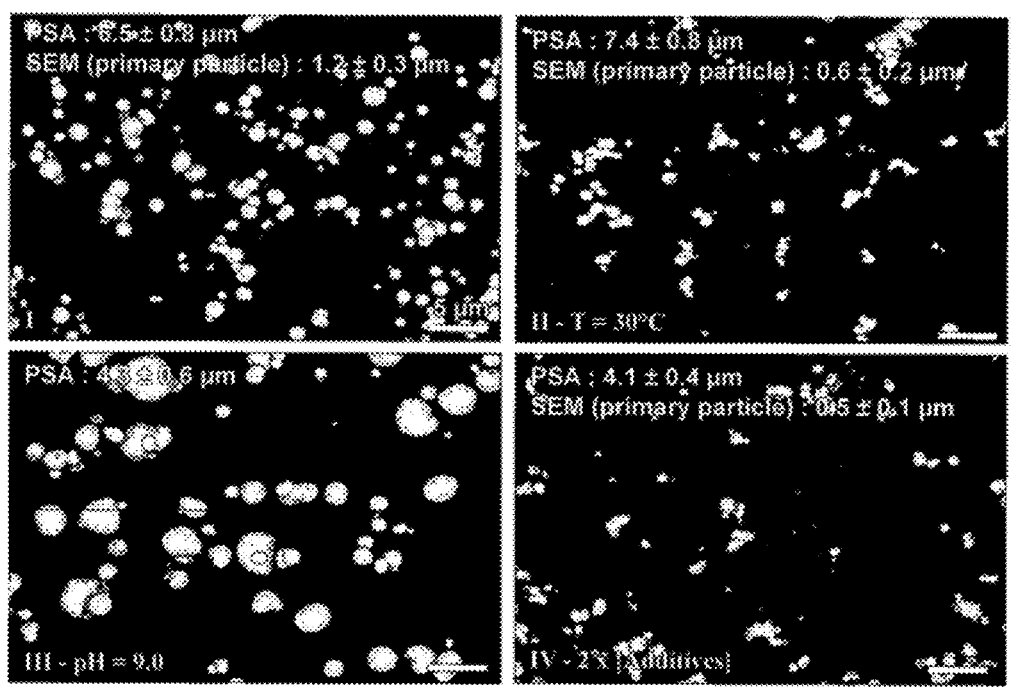
FIG. 7 is SEM image of calcium carbonate formed using different conditions, as described in Example 7.

SEM imaging also suggested that the primary particle size could be further reduced by increasing the concentration of the additives, increasing the final pH, or reducing the reaction temperature (FIG. 7). SEM images of calcium carbonate prepared in the presence of citrate and stearate under the standard condition described above (I), at 30° C. (II), at final pH of 9.0 (III), and with double the concentration of additives (IV).

Under the conditions described above the final product was vaterite and the measured whiteness was 95-97.

Example 8

Calcium Carbonate Precipitate from Slag

The slag was first ground (shatterbox) and sieved to a desired particle size range of <0.5 mm. Calcium was extracted from the slag by suspension of the ground material in an aqueous solution of ammonium chloride under several conditions (100-600 g/L of slag, 1.75-5M $NH_4Cl$) for 30 min-20 h. The undissloved slag was removed from the solution by vacuum filtration. Using basic oxygen furnace slag, the yield of extracted calcium was 200-900 mM and the extraction efficiency was 10-30%. Initial results indicated that higher yields and extraction efficiencies were reached with higher ammonium chloride concentrations and smaller particle sizes of the slag. Higher mass loadings of slag resulted in higher calcium extraction yields but lower extraction efficiencies.

Continuous vaterite precipitation was performed using the same procedure that was optimized for precipitation from carbide lime as shown in Examples 1 and 6 herein. Briefly, 12% $CO_2$ was sparged into the calcium extract solution (10 slpm, 35-40° C.) in a continuous stirred reactor. The pH was maintained at 7.5-8.5 by continuous flow of the alkaline extract solution into the reactor and the $Ca^{2+}$ depleted solution/solid product out of the reactor. The calcium carbonate product was dewatered by vacuum filtration and dried in a convection oven. The resulting precipitates had high vaterite purity and paste studies demonstrated high reactivity of the vaterite to transform to aragonite.

Example 9

Calcium Depleted Solid from Slag as a Cement Substitute

This experiment describes the application of Ca-depleted steel slag as a Portland cement substitute. Calcium was extracted from the steel slag using the ammonium based pH-swing process. Suspension of ground steel slag for 20 h in an aqueous solution of ammonium chloride (300 g/L, 3M $NH_4Cl$) led to a 30% reduction in the calcium content. The influence of calcium depletion on the cementitious and/or pozzolonic properties of steel slag was determined by replacement of 20 and 40 wt % Portland cement with pre- and post-extraction slag. Compressive strength measurements of the blended and pure Portland cement were performed after 1, 8, 28, (90) days curing. Results indicated that the removal of calcium from steel slag improved the cementitous and/or pozzolonic properties leading to higher compressive strengths as compared to unprocessed slag. Table 3 below illustrates the compressive strengths of blended Portland cements relative to pure Portland cement after 1, 8, and 28 days curing.

TABLE 3

Compressive strengths (psi) of pure and blended Portland cement

| Days Cured | Pure Portland cement | 20 wt % Pre-extraction slag | 20 wt % Post-extraction slag | 40 wt % Pre-extraction slag | 40 wt % Post-extraction slag |
| --- | --- | --- | --- | --- | --- |
| 1 | 2215 | 1500 | 1840 | 785 | 1000 |
| 8 | 5040 | 3480 | 4360 | 2210 | 2770 |
| 28 | 6535 | 4880 | 5590 | 3065 | 3500 |

Example 10

Thermal Removal of Ammonium Chloride from Precipitate

A sample of reactive vaterite was obtained using the previously described method in Example 1. The sample was analyzed by X-ray diffraction (XRD) and ion chromatography (IC) to determine the vaterite, ammonium ($NH_4^+$) and chloride ($Cl^-$) content of the untreated samples. Rietveld refinement of the diffraction pattern determined the initial samples to be 97 wt % vaterite and 3% calcite. The ammonium chloride ($NH_4Cl$) impurity was below the detection limit of the instrument. IC analysis of the initial samples, following acid digestion, determined the $NH_4^+$ concentration to be 0.364 wt % and the $Cl^-$ concentration to be 0.628 wt %.

A muffle furnace was preheated to a temperature of 300° C. A 0.2" thick layer of the impure reactive vaterite powder was placed into an open-top aluminum dish. The filled container was placed into the preheated muffle furnace. After 50 minutes, the aluminum dish was removed from the furnace and allowed to cool at 20° C.

After cooling, the samples were once again analyzed by XRD and IC. The vaterite content determination remained unchanged at 97 wt %. The IC determinations demonstrated that the $NH_4^+$ and $Cl^-$ concentrations had been reduced to 0.137 and 0.082 wt %, respectively. Subsequent paste testing (as described in Example 1) indicated that the product was still reactive vaterite.

The same experiment was performed at a thermal treatment temperature of 380° C. XRD determined that the vaterite content of the original sample had completely converted to calcite, resulting in a non-reactive product. The IC determinations demonstrated that the $NH_4^+$ and $Cl^-$ concentrations had been reduced to 0 (non-detectable) and 0.046 wt %, respectively. Table 4 below illustrates the effect of temperature on the stability of reactive vaterite and the simultaneous removal of ammonium chloride.

TABLE 4

| Sample Condition | Temp (° C.) | Post Drying Heat Duration (min) | Vaterite by XRD (wt %) | [$NH_4^+$] by IC (wt %) | [$Cl^-$] by IC (wt %) |
| --- | --- | --- | --- | --- | --- |
| 1 (starting material) | 105 | 0 | 97 | 0.364 | 0.628 |
| 2 | 300 | 25 | 97 | 0.243 | 0.11 |
| 3 | 300 | 50 | 97 | 0.137 | 0.082 |
| 4 | 380 | 25 | 1 | 0.002 | 0.068 |
| 5 | 380 | 50 | 0 | 0 | 0.046 |

The above results demonstrate that while higher amounts of ammonium chloride impurities were removed at higher temperatures, reactive vaterite also had a tendency to undergo the solid phase recrystallization to a non-reactive calcite polymorph. Thus, optimum temperatures for thermal purification may lie between 300 and 380° C.

Example 11

Thermal Removal of Ammonium Chloride and Sulfur from Precipitate

A sample of reactive vaterite was obtained using the previously described method in Example 1. A muffle furnace was preheated to a temperature of 340° C. A 0.2" thick layer of the reactive vaterite powder was placed into an open-top aluminum dish. The filled container was placed into the preheated muffle furnace. After 60 minutes, the aluminum dish was removed from the furnace and allowed to cool at 20° C. During the thermal treatment, the gas in the headspace of the furnace was continuously analyzed by a flue gas analyzer (Testo 350-XL) equipped with $H_2S$ and $SO_2$ sensing modules. The instrument sampled the headspace at a rate of 1.2 L/min. The replacement gas for the furnace was pulled from ambient air. During the first 20 minutes of heating, $H_2S$ concentrations were found to be between 0.1-0.4 ppm (vol). For the rest of the duration, the $H_2S$ concentration was below the reporting limit of the device (0.1 ppm). $SO_2$ was not detected during the treatment. Example 10 as well as the experiment below demonstrates that under similar conditions, the vaterite in the sample remains unchanged.

In another experiment, a sample of reactive vaterite was obtained using the previously described method in Example 1. The sample was analyzed by X-ray diffraction (XRD) and ion chromatography (IC) to determine the vaterite, ammonium ($NH_4^+$) and chloride ($Cl^-$) content of the untreated samples. Rietveld refinement of the diffraction pattern determined the initial samples to be 100 wt % vaterite. IC analysis of the initial samples, following acid digestion, determined the $NH_4^+$ concentration to be 0.531 wt % and the $Cl^-$ concentration to be 0.928 wt %. A muffle furnace was preheated to a temperature of between 330-340° C. A 0.2" thick layer of the reactive vaterite powder was placed into an open-top aluminum dish. The filled container was placed into the preheated muffle furnace. After 60 minutes, the aluminum dish was removed from the furnace and allowed to cool at 20° C. The samples were again analyzed by XRD and IC. The vaterite content determination remained substantially unchanged. The IC determinations demonstrated that the $NH_4^+$ and $Cl^-$ concentrations had been reduced. Subsequent paste testing (as described in Example 1) indicated that the product was still reactive vaterite. Table 5 below illustrates the effect of temperature on the stability of reactive vaterite and the simultaneous removal of ammonium chloride.

TABLE 5

| Sample Condition | Temp (° C.) | Post Drying Heat Duration (min) | Vaterite by XRD (% wt) | [$NH_4^+$] by IC (wt %) | [$Cl^-$] by IC (wt %) |
| --- | --- | --- | --- | --- | --- |
| 1 (starting material) | 105 | 0 | 100 | 0.531 | 0.928 |
| 2 | 330 | 25 | 98 | 0.148 | 0.072 |
| 3 | 330 | 50 | 97 | 0.151 | 0.092 |
| 4 | 340 | 25 | 98 | 0.154 | 0.063 |
| 5 | 340 | 50 | 98 | 0.156 | 0.05 |

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:
1. A method comprising:
 a) treating a slag solid or carbide lime suspension with an ammonium salt in water to produce an aqueous solution comprising calcium salt, ammonium salt, and solids;
 b) contacting the aqueous solution with carbon dioxide from an industrial process under one or more precipitation conditions to produce a precipitation material comprising calcium carbonate and a supernatant aque- ous solution wherein the precipitation material and the supernatant aqueous solution comprise residual ammonium salt; and c) removing and optionally recovering ammonia and/or ammonium salt using one or more steps of (i) recovering a gas exhaust stream comprising ammonia during the treating and/or the contacting step; (ii) recovering the residual ammonium salt from the supernatant aqueous solution; and (iii) removing and optionally recovering the residual ammonium salt from the precipitation material;

wherein the method further comprises separating the solids from the aqueous solution before the contacting step and adding the separated solids to the precipitation material as a filler.

2. The method of claim 1, wherein the ammonium salt is ammonium chloride, ammonium sulfate, ammonium nitrate, or combinations thereof.

3. The method of claim 2, wherein molar ratio of the ammonium salt:slag solid or ammonium salt:carbide lime suspension is between about 0.5:1 to 2:1.

4. The method of claim 1, wherein the treating step further comprises adding anhydrous ammonia or an aqueous solution of ammonia.

5. The method of claim 1, further comprising dewatering the precipitation material after step b) to separate the precipitate from the supernatant aqueous solution.

6. The method of claim 1, wherein the residual ammonium salt is ammonium chloride, ammonium sulfate, ammonium sulfite, ammonium hydrosulfide, ammonium thiosulfate, or combinations thereof.

7. The method of claim 1, further comprising recovering the residual ammonium salt from the supernatant aqueous solution using recovery process selected from the group consisting of thermal decomposition, pH adjustment, reverse osmosis, multi-stage flash, multi-effect distillation, vapor recompression, distillation, and combinations thereof.

8. The method of claim 7, further comprising recycling the recovered residual ammonium salt back to the treating step of the process, the contacting step of the process, or combination thereof.

9. The method of claim 1, wherein the step of recovering the gas exhaust stream comprising ammonia comprises subjecting the gas exhaust stream comprising ammonia to a scrubbing process wherein the scrubbing process comprises scrubbing the gas exhaust stream comprising ammonia with the carbon dioxide from the industrial process and water to produce a solution of ammonia.

10. The method of claim 9, wherein the solution of ammonia comprises carbamate which is optionally recycled back to the contacting step.

11. The method of claim 1, wherein the step (iii) of removing and optionally recovering the residual ammonium salt from the precipitation material comprises heating the precipitation material between about 300-360° C. to evaporate the ammonium salt from the precipitation material with optional recovery by condensation of the ammonium salt.

12. The method of claim 11, wherein the calcium carbonate comprises reactive vaterite which stays in the precipitation material as reactive vaterite after heating in step (iii).

13. The method of claim 12, wherein the heating of the precipitation material between about 300-360° C. is for more than about 10 minutes or between about 10-60 minutes.

14. The method of claim 11, wherein the ammonium salt evaporates from the precipitation material in a form comprising ammonia gas, hydrogen sulfide gas, sulfur dioxide gas, hydrogen chloride gas, chlorine gas, or combinations thereof.

15. The method of claim 11, wherein the aqueous solution, the supernatant solution, the precipitation material, or combinations thereof, further comprises sulfur compound and the step (iii) further comprises removing the sulfur compound in a form comprising hydrogen sulfide and/or sulfur dioxide gas from the precipitation material.

16. The method of claim 12, further comprising after step (iii) adding water to the precipitation material comprising reactive vaterite and transforming the vaterite to aragonite wherein the aragonite sets and hardens to form cement or cementitious product.

17. The method of claim 16, wherein the cementitious product is a formed building material selected from masonry unit, construction panel, conduit, basin, beam, column, slab, acoustic barrier, insulation material, and combinations thereof.

18. The method of claim 1, wherein the solids comprise carbon, silica, or combination thereof.

19. The method of claim 1, wherein the solids are between 1-40 wt % in the aqueous solution, in the precipitation material, or combination thereof.

20. The method of claim 1, wherein the one or more precipitation conditions are selected from temperature, pH, pressure, ion ratio, precipitation rate, presence of additive, presence of ionic species, concentration of additive and ionic species, stirring, residence time, mixing rate, forms of agitation, presence of seed crystal, catalyst, membrane, or substrate, dewatering, drying, ball milling, and combinations thereof.

21. The method of claim 1, wherein the one or more precipitation conditions that favor formation of the calcium carbonate comprise a pH of between 7-8.5 of the aqueous solution, temperature of the solution between 20-45° C., residence time of between 15-60 minutes, or combinations thereof.

* * * * *